US007810021B2

(12) United States Patent
Paxson

(10) Patent No.: US 7,810,021 B2
(45) Date of Patent: Oct. 5, 2010

(54) APPARATUS AND METHOD FOR CREATING LITERARY MACRAMÉS

(76) Inventor: Dana W. Paxson, 129 Glen Haven Rd., Rochester, NY (US) 14609

( * ) Notice: Subject to any disclaimer, the term of this patent is extended or adjusted under 35 U.S.C. 154(b) by 1230 days.

(21) Appl. No.: 11/361,439

(22) Filed: Feb. 24, 2006

(65) Prior Publication Data

US 2007/0204211 A1 Aug. 30, 2007

(51) Int. Cl.
*G06F 17/00* (2006.01)
(52) U.S. Cl. .................. 715/205; 715/200; 715/206; 715/730
(58) Field of Classification Search ................. 715/205, 715/202, 206, 730
See application file for complete search history.

(56) References Cited

U.S. PATENT DOCUMENTS

| | | | | |
|---|---|---|---|---|
| 5,745,360 A * | 4/1998 | Leone et al. | ................ | 715/236 |
| 5,887,171 A * | 3/1999 | Tada et al. | ................ | 719/317 |
| 6,125,385 A * | 9/2000 | Wies et al. | ................ | 709/203 |
| 6,684,369 B1 * | 1/2004 | Bernardo et al. | ............ | 715/205 |
| 6,766,362 B1 * | 7/2004 | Miyasaka et al. | ........... | 709/219 |
| 7,290,205 B2 * | 10/2007 | Moncsko et al. | ............ | 715/208 |
| 7,426,687 B1 * | 9/2008 | Schultz et al. | .............. | 715/208 |
| 2003/0159566 A1 * | 8/2003 | Sater et al. | .................... | 84/615 |
| 2005/0149851 A1 * | 7/2005 | Mittal | ..................... | 715/501.1 |
| 2007/0136674 A2 * | 6/2007 | Schumacher et al. | ........ | 715/760 |

OTHER PUBLICATIONS

International Search Report and Written Opinion in corresponding PCT application (PCT/US07/62801).

* cited by examiner

*Primary Examiner*—Joshua D Campbell
*Assistant Examiner*—Christopher Bryant
(74) *Attorney, Agent, or Firm*—Thomas R. FitzGerald, Esq.; Hiscock & Barclay, LLP

(57) ABSTRACT

By the use of program scripts, databases, and other software elements, taking as input a set of text files making up a work of literature of substantial size, converting the files to an electronically-readable form, linking the files to each other to provide readers with a rich set of associations to be explored within the work, muting the presentation of the links in order to preserve the immersive character of the reading process, and simplifying the user browsing interface to limit distractions that vitiate the immersive reading experience. By the richness and simplicity of carefully-designed outputs, offering the author a new range of opportunities for engaging the reader, offering the publisher a new opportunity for succeeding in purveying electronic literature, and presenting the reader with an "electronic literary macramé": a new class of work permitting a level of immersive reading practice obtainable only in the world of electronic text.

42 Claims, 33 Drawing Sheets

97

601 — IT STOOPED PAINFULLY

Dana W. Paxson

© Dana W. Paxson 2005

1544 4D  602  600

A large corpse in a Novander Wye bodysuit lay face-down in a path in the deep grass, in a broad, dry patch of brown and black muddy earth. The sun had set. A brace of fehey came snuffling out of the root-mazes, in search of beetles or turkili for their young. They approached the face of the huge man, sniffed and nosed at the blood that had trickled from his mouth and dried. A long dried flow of brown led from an exit hole in the man's back down to the ground. Scissorflies, rasping their sixwings, scratched and pared at the brown stain.

When the face raised itself and the eyes opened, the fehey scuttled away. A hoarse, deep voice said, "I'm alive?" Then it said, "Who are you?" No one else was present.

Slowly the body clambered up to hands and knees, then stood, wobbling, in the gathering night. It stood still for a long time; the lips moved, but it made no sound. One arm moved up to finger a now-closed hole over the heart. It stooped painfully to the roots where the datasheet and gun had been hidden, retrieved them, straightened up, turned, and began to walk north.

To Next    To Previous
   605         607

FIG. 2

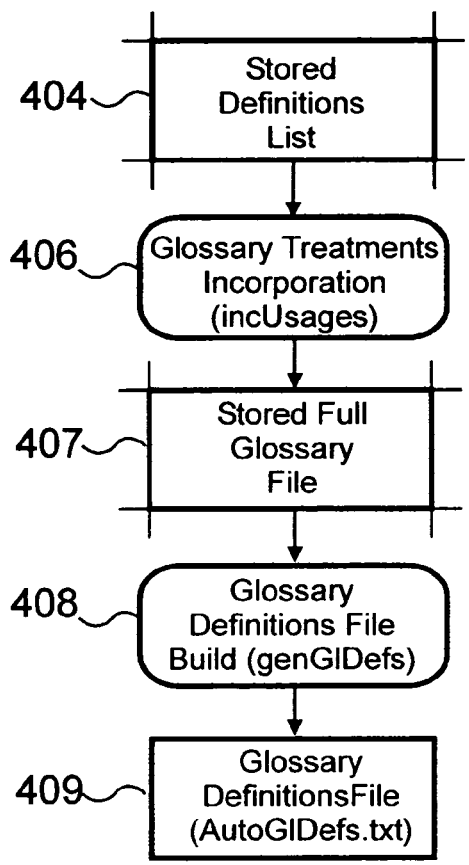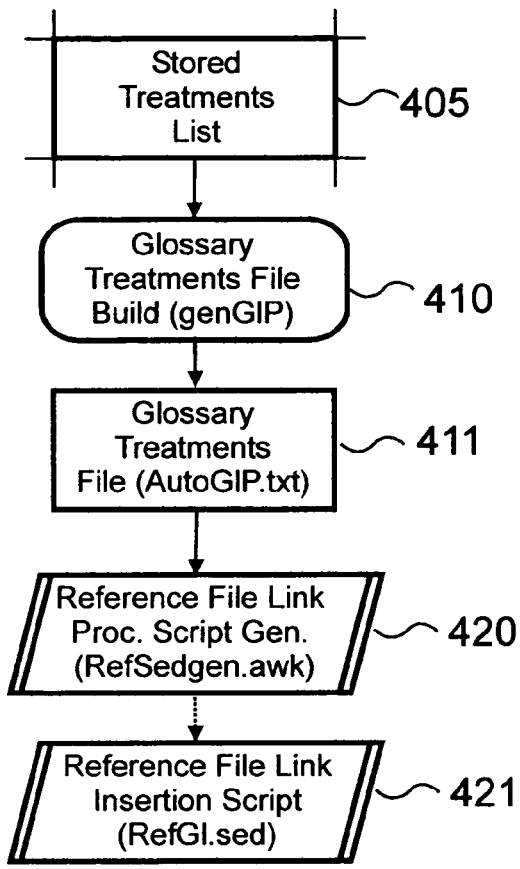
FIG. 8                    FIG. 9

700

800

Scuffing the floor with her boot, Ezzar brushed dust and grime from striations running along the street and out into the crossing, lines that tangled and untangled in a hypnotically-woven collision of faintly-gleaming metal strands. It looked like those walls near the Complex, just before they had gone in, making a language of its gestured curves that demanded attention and repelled meaning. What a place this City was, so much older and deeper than her Monford home, so weighed down not just with its stoniness but with the millions of lives and deaths and denials and promises that had piled up in its endless ways to turn to dust and vanish.

A harsh chirring sound grew, repeated, then stopped, coming from the vine leaves by Ezzar's left shoulder. A cicadal. She parted the leaves and reached in, and the gray insect, fat and long as her thumb, crawled slowly onto her finger and sat cleaning its forelegs and its wings. Dozens of its miniature young still swarmed its belly, wingless. Its huge gray-orange eyefacets stared out into the wartime evening.

760 — Next

760 — Introduction

760 — Previous

FIG. 34

 File or Data Repository
 Manual Operation
 Software Compiler or Interpreter
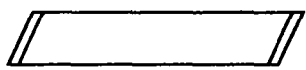 Software Program Code or Software Script
 Spreadsheet Cell Code
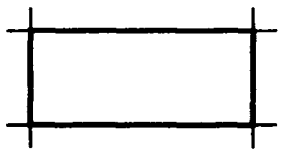 Spreadsheet Cell Data Repository
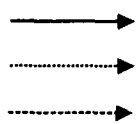 Flow of Operation and Data
Spreadsheet Calculations
Generation of Operations
FIG. 36
(LEGEND)

APPARATUS AND METHOD FOR CREATING LITERARY MACRAMÉS

AREA OF INVENTION

This disclosure relates to the creation of texts readable on computers, and more specifically to the creation of interconnected narratives and references readable using browser programs such as those adapted for use on the World Wide Web.

REFERENCES SUBMITTED

A computer program listing appendix containing computer program listings comprising components of the present invention is enclosed with the present specification as Appendix A, and is hereby incorporated by reference in the present specification. Two copies of Appendix A are enclosed, each copy on a single compact disk labeled "Computer Program Listings for Apparatus and Method for Creating Literary Macramés", the copies marked Copy 1 and Copy 2 respectively. The listings included on each compact disk are ASCII text files as follows:

Date and Time of Creation File Size File Name (software language)

Apr. 27, 2006 03:33 PM 1,314 bytes—BuildGlossHTM.txt (VBA code)

Apr. 27, 2006 03:36 PM 3,306 bytes—BuildSGlossHTM.txt (VBA code)

Apr. 27, 2006 04:13 PM 1,291 bytes—CompileLM.txt (VBA code)

Apr. 27, 2006 03:56 PM 1,258 bytes—GlGen.awk (awk code)

Apr. 27, 2006 03:38 PM 5,196 bytes—GlSedgen.awk (awk code)

Apr. 27, 2006 03:48 PM 59,581 bytes—MakeLMCompilationFile.txt (VBA code)

Apr. 27, 2006 03:54 PM 378 bytes—PrepGlDefs.awk (awk code)

Apr. 27, 2006 03:18 PM 6,015 bytes—PrepScen.txt (PerfectScript code)

Apr. 27, 2006 03:45 PM 4,902 bytes—RefSedgen.awk (awk code)

Apr. 27, 2006 03:40 PM 5,975 bytes—Sedgen.awk (awk code)

Apr. 27, 2006 03:47 PM 1,576 bytes—UpdateRefHTM sed scripts.txt (sed code)

Apr. 27, 2006 03:44 PM 639 bytes—UpdateRefHTM.txt (bash shell script)

Apr. 27, 2006 03:51 PM 4,148 bytes—footset.awk (awk code)

Apr. 27, 2006 03:31 PM 25,531 bytes—genGlFiles.txt (VBA code)

Apr. 27, 2006 03:51 PM 2,938 bytes—headset.awk (awk code)

Apr. 27, 2006 03:50 PM 3,728 bytes—scriptset.awk (awk code)

16 File(s) 127,776 bytes

BACKGROUND OF INVENTION

One of the great advantages of the printed literary text has been its ability to absorb a reader's attention to the point that the reader becomes immersed in the environment created by the words of the author, losing awareness of the words themselves, the pages on which they are printed, and the acts of turning the pages to continue the immersive experience. Modern books have been designed so as to maximize the degree of immersion for readers at a minimum cost and inconvenience. Modern authors have followed guidelines that intensify the reader's immersion in their works to the point that time in the reader's world loses all importance to the reader, a profound achievement. But all these achievements fail to take advantage of the possibilities of electronic texts.

Electronic texts have emerged as superior replacements for printed works in certain areas of publication, particularly those areas in which links within the texts lead to references, alternative narratives, or supporting materials of other kinds such as audio or image streams. But these advantages gain little recognition in the realm of mass-market literature such as fiction and nonfiction.

The hardware devices used so far to present electronic literature are expensive, mutually incompatible, and complicated to use. The forms in which the literature is presented mimic fairly closely the forms used in the printed media, in an effort to preserve the immersive reading experience. The advantages presented by the availability of textual linkages in the electronic form are rarely exploited. Such exploitation would yield great and diverse benefits for authors, publishers, and readers across the board.

To illustrate with an example from fiction, many conventional novels and series of novels present richly-realized settings, characters, cultures, and story threads for their readers. One such series of novels is J. R. R. Tolkien's "The Lord of the Rings", which offers the reader a world of such scope and complexity that the reader becomes immersed in that world with little effort, and remains immersed no matter how many characters, stories, languages, timelines, and events are presented. Many readers, not satisfied with a single reading, repeat their reading of the series many times, and plumb the complexities of its appendices, languages, maps, and other supplementary materials included with the story itself. This deeper reading process, however, is hindered, not facilitated, by the use of the printed form of text and other material.

Specifically, some characters are presented with multiple names used on different occasions, e.g., the character named Gandalf, Mithrandir, Olorin, Tharkun, Incanus, Grey Pilgrim, and so on. Some locations are given different names by people of different kinds, e.g., the mountain called Redhorn, Carathras, or Azanulbizar; or the castle called Orthanc or Isengard. Some narratives are relegated to appendices, footnotes, or other separate areas of the printed work.

The histories of specific sites, people, and objects are rich and filled with meaning not easily apparent on first (or even later) reading. The ordering and interrelation of events is so complex that the reader must often take their arrangement on faith while reading, not always understanding exactly how things are arranged until after the reading is complete, and not always then either. The success of the work arises not out of the clarity of its every component during reading, but rather from the overwhelming wealth and consistency of its presentation.

Readers, authors, and publishers would benefit greatly from a mode of presentation which facilitates enhanced wealth and consistency of content while also increasing the clarity of the work for a reader and preserving the immersive reading experience.

GLOSSARY OF TERMS USED

Anchor, hypertext anchor—a marked location in a hypertext document serving as a target for a Web browser. When a viewer selects a link to the anchor on a page of hypertext, the viewer's browser displays the page containing the anchor location. In HTML, a hypertext anchor commonly appears in the form:

<a name="[ANCHOR-ID]">[DISPLAYED-ANCHOR]</a> where [ANCHOR-ID] identifies the location to be displayed upon selection, and [DISPLAYED-ANCHOR] marks the location of a point in the display to be presented.

Browser program, browser—a software program for locating, navigating, and viewing presentations on a computer display. Conventional browser programs provide means for selecting links in a display to navigate to a new display, scrolling and paging through the current display, backtracking and forward-tracking through displays already presented, resizing and repositioning the display within the presentation means provided, and opening and closing multiple displays as needed by the viewer.

Electronic literary tapestry—a literary tapestry viewable using a software browser program such as Microsoft Internet Explorer, Netscape, Mozilla Firefox, or Opera, and in which hypertext anchors and links are embedded to allow the viewer to move quickly from one display to another.

Glossary hypertext file—a hypertext document comprising a set of terms, each term accompanied by its definition and other information concerning its use. A glossary hypertext file is a special form of a reference hypertext file.

HTML (Hypertext Markup Language)—a conventional class of annotative or markup languages interspersed in or combined with text or other digital electronic material presentable to a viewer, providing means for exploitation of electronic enhancement of the presentation of digital electronic material.

Hypertext—a collection of electronic records, viewable using a browser program, incorporating component texts, images, and other forms presentable to human beings and containing viewer-selectable links among its components. See also the definition at http://isp.webopedia.com/TERM/H/hypertext.html.

Hypertext document—a closely-interlinked set of hypertext records.

Hypertext reference—a marked location in a hypertext document serving as a reference point for a hypertext anchor. When a viewer viewing a hypertext document selects the marked reference point, the viewer's browser displays the page referred to by the reference. If the reference is directed to an anchor (q.v.), the browser displays the page containing the anchor location. In HTML, a hypertext reference commonly appears in the form:

<a href="[ANCHOR-ID]">[DISPLAYED-TERM]</a>, where [ANCHOR-ID] identifies the location to be displayed upon selection, and [DISPLAYED-TERM] is the mark of the reference point to be selected in order to use the [ANCHOR-ID].

Immersive reading—a mode of reading a text, characterized by enhanced awareness on the reader's part of the settings, events, speech, and characters limned by the text, in such a way that the reader experiences those settings, events, speech, and characters as if present at their occurrence.

Layered reference—a context-sensitive hypertext reference to a single term or article for which multiple definitions or articles may exist. The choice of the particluar definition or article used for the hypertext reference is made on the basis of contextual information in the text or document containing the reference, such as a date in a timeline, a point-of-view character, or other keying information.

Link—a hypertext reference.

Link order control file—a list of values providing a sequence by which scenes of a narrative may be read.

Literary effect—a change brought about in the mind of a viewer as a result of the viewer's intake of a narrative by reading, listening, or seeing said narrative.

Literary macramé—an enriched electronic literary tapestry, comprising a collection of electronic files, each in turn comprising text and other electronic literary expressions, and each containing one or more literary references to other electronic files in the collection, such that by pursuing any of a range of possible sequences of references, a reader may follow quickly and freely any of a set of stories constructed by a writer using overlapping sets of events.

Literary tapestry—a collection of text files each containing one or more references to other files in the collection, and each file of which may contain narrative, references, expository material, and illustrations, in any written, visual, audible, or interactive form.

Narrative—a sequence of scenes in readable or viewable form which allows a person reading or viewing those scenes in sequence to produce a mental representation of a progression of events, objects, and ideas, whether factual or fictional.

Reference hypertext file—an electronic file containing reference text, tables, figures, diagrams, hypertext anchors, and hypertext links connecting said electronic file to any of a set of scene hypertext files and other reference hypertext files.

Reference source file—an electronic file containing reference text, tables, figures, diagrams, and other reference information.

Scene—a sequence of statements in readable or viewable form setting forth a collection of events, objects, and ideas, whether factual or fictional, that are situated in some bounded region of time and space, or in some bounded range of ideas. The bounds of the region or range constitute the locale of the scene.

Scene hypertext file—an electronic file containing narrative text, anchors, and a set of hypertext links connecting said electronic file to any of a set of scene hypertext files and other Scene processing control file—an electronic file in text form containing sets of parameters and values needed to transform a scene text file into a scene hypertext file.

Scene source file—an electronic file in word-processor form containing narrative text and an array or list of attributes characterizing said narrative text, such as scene title and locale.

Scene text file—an electronic file in plain text form containing narrative text and an array or list of attributes characterizing said narrative text, such as scene title and locale.

reference hypertext files.

Stylesheet—Stylesheets, as used with hypertext prepared in a framework and language such as HTML, XHTML, or XML, are essentially common repositories for presentation rules shared by multiple hypertext documents. By changing the presentation rules in a single stylesheet, an author or editor can change the appearance and behavior of any number of hypertext documents with a single transaction.

DESCRIPTION OF DRAWINGS

FIG. 2 shows the appearance of a scene hypertext file to a reader

FIG. 8 shows the steps of building the glossary definitions file (AutoGlDefs.txt).

FIG. 9 shows the steps of building the glossary treatments file (AutoGlP.txt) and the reference file link insertion script.

FIG. 34 shows the foot of a multithreaded scene hypertext page in which the fixed links to the next and previous scenes in the author's primary sequence of reading are presented.

FIG. 36 shows the symbols used in the figures in the present document and their defined meanings.

LIST OF REFERENCE NUMERALS

Figure 1:
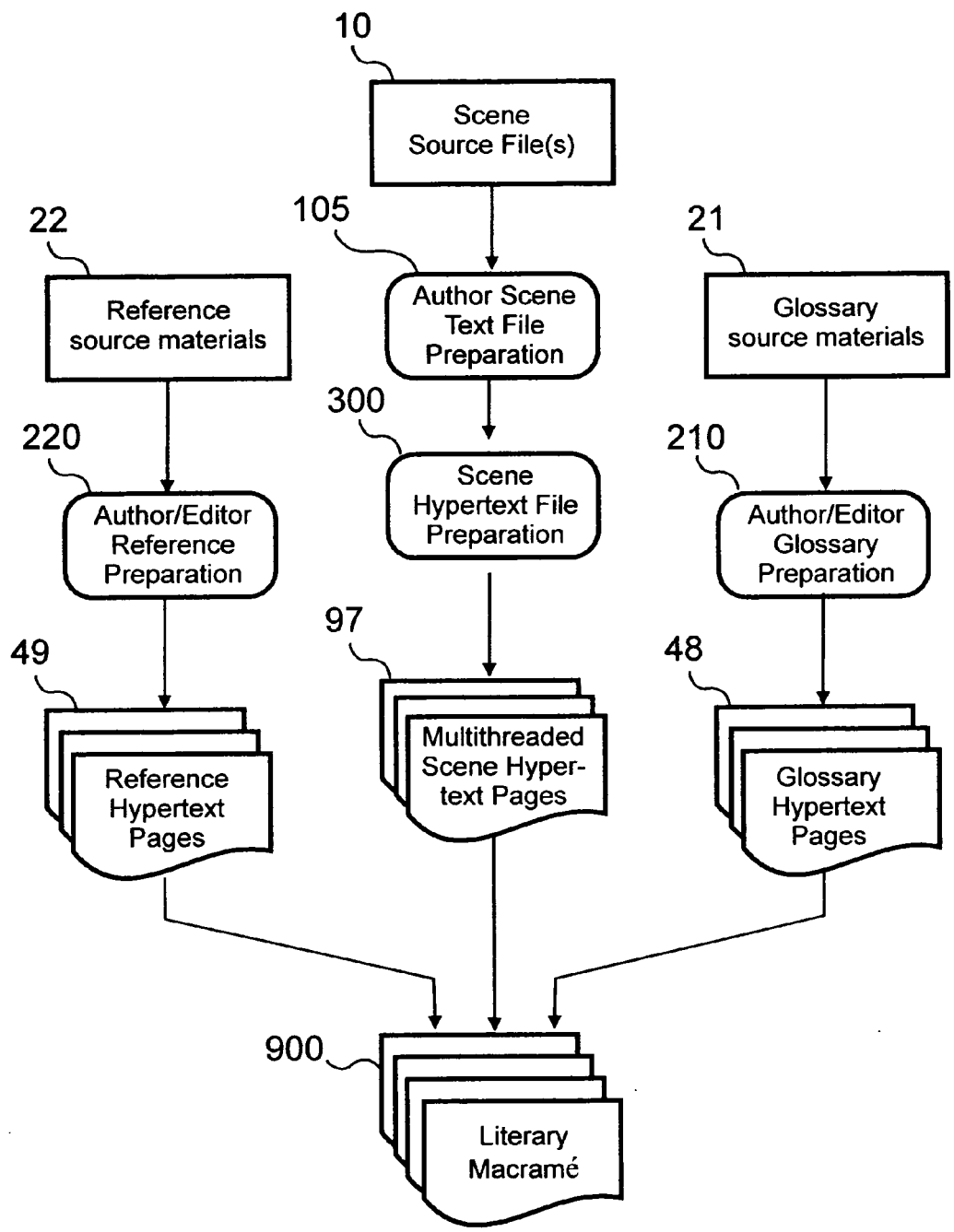
FIG. 1 shows the overview of the invention's components and processing.

Display Screen 5
Raw Scene Source File 9
Scene Source File 10
Interim Scene Source File 10.1
Edited Interim Scene Source File 10.2
Raw Scene Text File 15
Reference Source File 20
(Literary) Glossary Source Materials 21
Text Reference Source Materials 22
Source Materials (e.g., sidebar papers, footnotes, endnotes, encyclopedia entries) 22
(Augmented) Scene Text File 30
Layered-Reference-Linked Scene Text File 30.1
Scene Text File Attributes 31
Scene General Attributes 31a
Scene Pov Attributes 31b
Scene Sequence Attributes 31c
Scene Text 32
Generated Scene Text File Attributes 33
Edited Scene Text File Attributes 34
Pov Matrix Entries 35
Edited Pov Matrix Entries 36
Stored Scene Link Sequences 37
Generated Links For Scene 38
Scene File Compilation Control Record Data Values 39
Reference Text File 40
(Literary) Glossary Hypertext File 41
Reference Hypertext File 42
Reference Hypertext File Header Section 42a
Reference Hypertext File Footer Section 42b Reference Hypertext File Text Section 42c
Enhanced Glossary Hypertext File 43
Enhanced Reference Hypertext File 44
Raw Glossary Reference File 45
Edited Glossary Reference File 46
Reference-Linked Glossary Hypertext File 48
Reference-Linked Reference Hypertext File 49
Pov Spreadsheet 50
Scene Text Control File 70
Scene-To-Next-Scene Link 80a
Scene-To-Previous-Scene Link 80b
Scene-To-Alternate-Scene Link 80c
Scene-To-Glossary Link 81
Scene-To-Reference Link 82
Glossary-To-Reference Link 83
Glossary-To-Glossary Link 84
Glossary-To-Scene Hypertext File Link 85
Reference-To-Glossary Link 86
Reference-To-Reference-Link 87
Reference-To-Scene Hypertext File Link 88
Scene Hypertext File 90
Glossary Footer File 91
Reference-Linked Scene Hypertext File 91
Glossary Header File 93
Scene Header Template File 93
Scene Footer Template File 95
Glossary Hypertext Page (Multithreaded Hypertext Glossary) 48
Multithreaded Scene Hypertext Page 97
Glossary Hypertext Page 98
Reference Hypertext Page 99
Author/Editor Scene Text File Separation 105
Author/Editor Scene Attribute Specification 153
Author/Editor Scene First Sequence Specification 163
Author/Editor Scene Alternate Sequence Specification 173
Author/Editor Glossary Preparation 211
Author/Editor Reference Preparation 232
Converts Source Materials 232
Scene Hypertext File Preparation 300
Scene Loading Program 301
Attribute Transformation Formulas 313
Pov Loading Program 315
Updated Text Section 330
Scene Sequence Mapping Formulas 367
Attribute Mapping Formulas 369
Construct Scene Control Files 397
Glossary Text File 401
Glossary Loading Process 403
Stored Definitions List 404
Stored Treatments List 405
404 As Input To A Process 406
Process To Build A Glossary Definitions File 408
Glossary Definitions File 409
Protected Glossary Definitions File 409.1
Reference-Linked Glossary Definitions File 409.2
Process To Build A Glossary Treatments File 410
Process To Build A Layered-Reference Treatments File 410.1
Glossary Treatments File 411
Layered-Reference Treatments File 411.1
Author/Editor Glossary Link Anchor Installation 413
Generation of Glossary Self-Link Insertion Script 414
Glossary Self-Link Insertion Script 415
Glossary Build Script 417
Scene File Link Processing Script 418
Layered-Reference Link Insertion Script 418.1
Generation of Reference File Glossary Link Insertion Script 420
Reference File Glossary Link Insertion Script 421
Author/Editor Reference Link Anchor Installation 424
Reference Extraction Program 430
Header Setaside Script 431
Footer Setaside Script 432
Text Selection Script 433
Glossary Link Deletion Script 434
Html Concealment Script 435
Html Restore Script 436
Reference File Link Update Script 437
Reference File Updated Text Section 440
Reference Link Script-Building Program 460
Reference Link Insertion Script 470
Glossary Reference File Protection Script 470
Scene Opening Review 491
Scene Opening Correction 492
Scene Paragraph Marking 493
Scene Quotes/Punctuation Review 494
Speech Span Enhancement 495
Speech Span Enhancement Review 496
Scene Continuity Review 497
Prepscen Macro Operation 497
Scene Source File Save 501
Quote Conversion 502
Scene Shift Marker Conversion 503
Scene Paragraph And Paragraph Class Definition 504
Scene Title Conversion 505
Scene Date/Time Conversion 506
Scene Speech Span Marking 507
Scene Speech Span Cleanup 508
Scene Text File Save 509
Scene Source File Close 510
Interior Speech Span Marking 571
Headset Speech Span Marking 572
Narrator Speech Span Marking 573
Verbal Thought Span Marking 574
Media Broadcast Span Marking 575
Special-Content Span Marking 576
Scene Text 600
Scene Title 601
Scene Date/Time 602
Hypertext Links 605
Hypertext Links 607
Mouse Pointer 610
Displayed Mouse Pointer 611
Story Passage 700
Link 707
Story Link 717
Glossary Link 737
Definition 747
Explicit Link 760
Concealed Link 770
Primary Window 800
Narrative Text 805
Reference Window 820
Glossary Window 840
Literary Macramé 900
Scene Setup Generation Program 910
Scene Header Setup Program 930
Scene Content Setup Script 940
Scene Footer Setup Program 950

SUMMARY

The invention takes as its input a set of text files making up a work of literature of substantial size, converts the files to an electronically-readable form, links the files to each other in multiple ways to provide readers with a rich set of associations to be explored within the work, mutes the presentation of the links in order to preserve the immersive character of the reading process, and simplifies the user browsing interface to limit distractions that vitiate the immersive reading experience. By the richness and apparent simplicity of its outputs for readers, the invention offers the author a new range of opportunities for engaging the reader, offers the publisher a new opportunity for succeeding in purveying electronic literature, and presents the reader with an "electronic literary macramé": a new class of work permitting a level and structure of immersive reading practice obtainable only in the world of electronic text.

The invention's outputs also support the presentation of textbook material in which multiple sequences of themes or logical progressions exist, such as the contents of mathematics or science texts. The invention also provides for time-dependent selection of links by an author or editor so that a reader may see different reference information based upon a timeline of the work of literature. In general, the invention enriches electronic configurations of text works by exploiting hypertext and Web technology, and supports profitable exploitation of business models based on the Internet.

DETAILED DESCRIPTION OF THE INVENTION

The invention applies best to literary works such as novels, biographies, histories, and other forms of similar length and complexity. These classes of literature characteristically engage readers immersively in their narratives, so that the reading experience makes the book itself transparent and invisible to the reader.

The printed book is a linear vehicle. The reader immersed in the printed work may progress conveniently only in a linear fashion through the printed literary work. Many such readers find ways to preserve the immersive experience of book reading by violating the linearity of the work—they skip expository passages, skim passages they feel they already understand, and reread passages they particularly like to savor. Some readers immersed in a work they are reading will even jump back and forth between passages to relish the connections between them. All of these practices demonstrate that linearity of the work and immersive reading of the work are not so tightly bound together that they preclude other forms of presentation preserving the immersion.

Many authors find ways of circumventing the physically-linear character of the printed book. Some works supply introductory or prefatory reading that offers the reader different selections of sections or chapters, or different sequencings of reading, based on the reader's wishes. Some works offer flags, sidebars, footnotes, or endnotes in the text that permit local detours in the linear reading process. In any case, these methods are attempts to overcome the physical limitations of the printed medium.

The invention presents the literary work electronically in a manner that appears linear but functions in both a linear and a nonlinear fashion based on reading selections made by the reader from a set of selections generated and offered by the invention. This form of presentation is familiar to anyone who uses a Web browser to access documents on the World Wide Web electronically. In a first embodiment, the invention presents the reader with: 1) a view of story text, 2) a view of glossary text containing terms and their meanings in the realm of the story, and 3) a view of a set of reference works providing expository and enriching information concerning the story and its background. The reader may navigatge freely and quickly among these views, and may also navigate the story text itself rapidly in nonlinear ways defined by the author and the invention. This specification explains both the methods of navigation and the means for their establishment. The software listings of the invention are enclosed with the present specification as source text files on a single CD-ROM titled "Computer Program Listings for Apparatus and Method for Creating Literary Macramés", and are hereby incorporated in this specification by reference.

The Invention's Literary Macramé

For the most part, works of literature are not enhanced to take full advantage of such forms of presentation. The invention facilitates such enhancement. The result is here termed a "literary macramé": a work of literature which is woven and knotted together using many threads of narrative in a nonlinear fashion. This approach contrasts with the printed presentation of a literary tapestry, which is essentially (and physically) a single thread with a single, linear sequence of presentation. The term "macramé" is used for the present invention to reflect the freedom with which the invention's products can be linked, knotted, and interwoven for aesthetic and literary effect, as is done with macramé in the visual and tactile arts.

"Literary tapestry" is a term of art in literature. Examples of literary tapestries exist in the realm of printed literature in spite of the limitations of print. One is the set of four novels called "The Alexandria Quartet", by Lawrence Durrell, which narrates several overlapping sets of events from the points of view of four different characters. The reader is free to read them in their given order or in any other order; the author cannot control the choices of the reader. Regardless, they are printed in a specific fixed order at the author's direction, and alternative paths of reading fall outside the author's expectations.

A second example of a printed literary tapestry is the set of works by J. R. R. Tolkien that includes "The Hobbit", "The Lord of the Rings", "The Silmarillion", and "Unfinished Tales", all set in Tolkien's invented world of Middle-earth. The stories told in these works interrelate in many sometimes-surprising ways. Besides the narratives of the stories themselves, the works contain numerous appendices, maps, and other supporting material that adds to the richness of the experience of reading them. Many readers return to these works to read portions or explore the world created by the author, and do not read the stories in their originally-presented sequence.

Tolkien's corpus of work set in Middle-earth includes many preliminary, embryonic, and draft versions of the same material contained in the above list. Many readers consider various portions of this additional material to be part of the literary realm of the published stories and their settings, and read the additional material as part of the experience of Tolkien's created world.

Many other authors have created multiple works which can be read by skipping between one work and another. These works, by their richness and by the ability of readers to restructure the experience of reading them, constitute literary tapestries as well. But the physical form of printed works creates obstacles to this restructuring, by imposing the need to mark pages, put down one book and pick up another, look up details or other information in separate parts of a work, and so on. By its exploitation of the possibilities of electronic text to assist authors in creating literary macramés, the invention eliminates or significantly diminishes such obstacles, thereby enhancing the reading experience and its possibilities.

The invention creates a literary macramé by the following steps.

At the author's direction, it breaks the literary work down into a set of small electronic scene text files of one or more paragraphs, each file incorporating a list of data elements characterizing the scene;

It establishes a set of reference source files to be used in support of the work, comprised of glossaries, definitions, expositions, illustrations, and narratives, any of which may incorporate text, images, animations, maps, audio, and other reference materials in any combination;

It provides for definition and use of time-dependent linkages between scenes and the references to which it links the scenes;

It converts the scene text files and reference source files into browser-compatible form with linking capabilities among them;

It links words, terms, phrases, and other text units as large as the file itself to reference files and reference units within the reference files (such as glossary or encyclopedia entries) that expand on the content of the linking text unit;

It links the text units to each other in multiple ways to create interwoven sequences of narrative;

It links the reference units to each other and back to the text units;

It facilitates the author's incorporation of manual links among the text units and the reference units;

It suppresses the conventional marking of browser links, providing only the barest minimum signal showing where a link is available in the work;

It defines and uses background, muted windows for display of linked units not in the main narrative, while preserving the reader's ability to move freely among the windows;

It generates a collection of interlinked browser-ready files for reading by a reader of the literary work;

It uses conventional browser technologies, both in order to facilitate acceptance in the current world of electronic literature, and in order to exploit the ability of browsers to 'remember' the paths followed by their users.

The above list of steps is clarified in what follows. The steps are shown using current technologies, but a practitioner skilled in the art of producing electronic text would find many different ways of implementing the steps explained here in one or more specific embodiments.

Portability of the Invention

The invention's use of a limited, commonly-accepted subset of the features of XHTML and Javascript allows its output to be stored, navigated, and read on any of a wide range of electronic devices capable of supporting standard Web browsers and presenting readable, navigable text. 'Navigable' here means text containing hypertext references and anchors that can be easily used by a reader.

The invention's outputs have been tested on desktop and laptop computer systems, and on a popular high-resolution handheld game system, and have been shown to work independently on all three types of system with a minimum of adaptation required. The invention's output text, markup language, and program code are consistent with that supported by any conventional Web-enabled operating system for personal computers of many types. This generality makes the literary macramé form accessible to the widest possible range of readers and reading devices, without requiring the development and maintenance of diverse forms of program code and markup language.

The Invention's Approach to 'Framing' in Literature

The invention provides authors with a functional realization of the literary device termed 'framing'. Framing is the practice of situating a secondary narrative text in relationship to a primary narrative text so that the secondary text comments on, refers to, illustrates, or otherwise enlarges upon the primary text in such a way as to transform the reader's relationship with the primary text. Glossaries, references, footnotes, endnotes, sidebars, as supported by the invention, are a limited form of framing narratives. A stronger form of framing is the use of a narrator's commentaries to open and close episodes in a story, when the narrator is not within the story itself, as in the novel Tom Jones, by Henry Fielding. The so-called "Greek chorus" of a play is a framing device.

Modern literature often applies the practice of frame violation, for humorous or dramatic effect. An example in cinema is in the film The Purple Rose of Cairo, where a character in a movie being shown in a theater leaves the screen to join the characters in the theater watching the movie. Time-travel stories in which a character appears multiple times in the same scene constitute another form of frame violation.

The invention's scene-by-scene linking mechanisms support unexpected and interesting violations of the frame normally presented to a reader. The cinematic example above can be adapted in a surprising way by linking the story of the on-screen character directly to the scene when that character leaves the screen to be in the outer world of a second narrative.

The invention's ability to connect scenes in circular and interwoven ways facilitates the circular telling of stories such as E. R. Eddison's The Worm Ouroboros, in which the story begins again for its characters because they have enjoyed living it so much. A second series of books by Eddison, The Zimiamvian Trilogy, is set in the heaven of The Worm Ouroboros, which would allow an editor presenting the works using the invention to link directly between them.

In such ways, the invention offers an electronic realization of literary devices that in conventional literature are handled with words alone. The rich possibilities for framing that the invention produces with electronic linkage depend solely on the imagination and creativity of its users.

The Invention's Approach to Time Dependencies in a Literary Work

Accessing available reference materials in the course of reading a narrative can have negative consequences for the reader. The primary problem for the author of fiction is that the content of a reference article may contain information that the author does not want the reader to learn until a later point in the story thread. In fiction, early viewing of some information during reading can drain suspense from the narrative, and such information disclosure is called a 'spoiler' in the art of fiction.

A similar problem can occur in an expository work when a reference contains sufficient distracting material to confuse or mislead the reader who has not covered certain portions of the work at the time of reading the reference.

The result is that authors avoid providing much reference information to the reader during the reading of a narrative. This avoidance limits the richness of the work.

To give an example, suppose that a particular character named Franklin is a trusted member of the protagonist's inner circle of friends during the early stages of a story. The entry for 'Franklin' in a reference might read, "A close friend and companion of the travelers, born in a far-off country, whose mental abilities give the travelers badly-needed guidance during difficult times." But suppose that Franklin betrays the travelers later on and joins the enemies opposing their journey, turning his talents to the construction of horrific war machines. The writer may wish to conceal the betrayal and later events from readers in the earlier stages of the work when the reader is using the reference, but reveal them in the reference to readers who have moved ahead past the occurrence of the betrayal and afterwards.

In a printed work this is not possible. The advantage of presenting an updated or later version of the reference is that a reader using the reference will obtain useful information there no matter what stage of the story he or she may be reading. In a printed work this is not possible.

The invention addresses the problem of time-dependent references in a layered-reference embodiment, in which the same term may appear in multiple ways in a presented reference, or the same reference may be differently presented, depending on the point in story time and the situation from which the reader is linking to the reference. The invention's link-installation scripts contain code which is sensitive to the timeline location of the narrative (and potentially to other situational information such as point of view/POV, presence of other characters in the scene, and location of the scene), and inserts a link appropriate for the point in the timeline at which the insertion is being done.

Method of Operation of the Invention

The invention combines manual steps in a process applied by the author, editor, or publisher with computerized steps performed by the execution of programs in the form of scripts and spreadsheet functions. The input to this process is a set of one or more literary works to be combined in the output product, a literary macramé. The input literary works may be poems, short stories, novellas, novels, lyrics, sagas, histories, biographies, or any other written form generally considered literature. Input works may also include textbooks in which thematic or logical linkages and definitions may be presented in any of a large number of sequences or relationships.

Summary of Method

The invention's process is summarized very briefly as shown in FIG. 1. The author collects or creates a set of scene source files 10 constituting the individual components of the literary macramé's narratives. The author also creates or collects a set of glossary and reference materials 21, 22 constituting the supporting material to be linked with the narratives. Using the invention's hypertext preparation tools 300 the author removes or translates word processor control codes, converts the scene, glossary, and reference materials to linked scene hypertext pages 97, glossary hypertext pages 48, and reference hypertext pages 49 respectively, and collects the linked pages to form the literary macramé 900. Subsequent figures detail the components and operations in each stage of the processes shown in FIG. 1.

The preparation of interlinked scene hypertext files is the primary task of the invention. Each scene hypertext file presented to a reader has the general appearance shown in FIG. 2. A scene title 601 appears at the start of the scene hypertext file's page 97, followed by a scene date and time 602 or other orienting information, followed by the scene's text 600 and any embedded displays. Following the scene text 600 is a set of hypertext links 605, 607 allowing a reader to link to any of a number of scene hypertext files, table of contents pages, Websites, or other destinations. The display form and the content of each hypertext link 605, 607 are carefully defined by the invention in a scene processing control file, which the invention builds using information provided by the author, editor, or other user.

The preparation of a glossary and reference texts are the secondary tasks of the invention. While a reference text resembles a scene text fairly closely, the glossary takes the form of a list of terms in alphabetical order, each term followed by its definition. The invention links every reference to a glossed term to the corresponding location of the definition or article in the glossary, whether the reference is in a scene text, a reference text, or the glossary itself. Likewise, the invention links every reference to a reference text to the head of the corresponding reference text, whether the reference is in a scene text, a reference text, or the glossary itself. Consequently, the scene texts, glossary, and reference texts constitute an integrated hypertext document: the literary macramé.

The invention's parameters define the appearance and presentation of the literary macramé to a reader.

Details of Method

The individual steps in the invention's process are as follows:

1. Break the literary work down into files;

2. Establish a set of reference hypertext files;

3. Establish links among units of text of the work and reference files;

4. Establish sequences of reading for scenes;

5. Convert the work into browser-compatible form;

6. Incorporate manual links;

7. Incorporate special presentation features in the work,

8. Link the reference materials back to the units of text of the work,

9. Suppress the conventional marking of browser links;

10. Define and use background, muted supporting windows;

11. Generate a collection of interlinked browser-ready files.

Step 1: Break the Literary Work Down into Files

Figure 3:
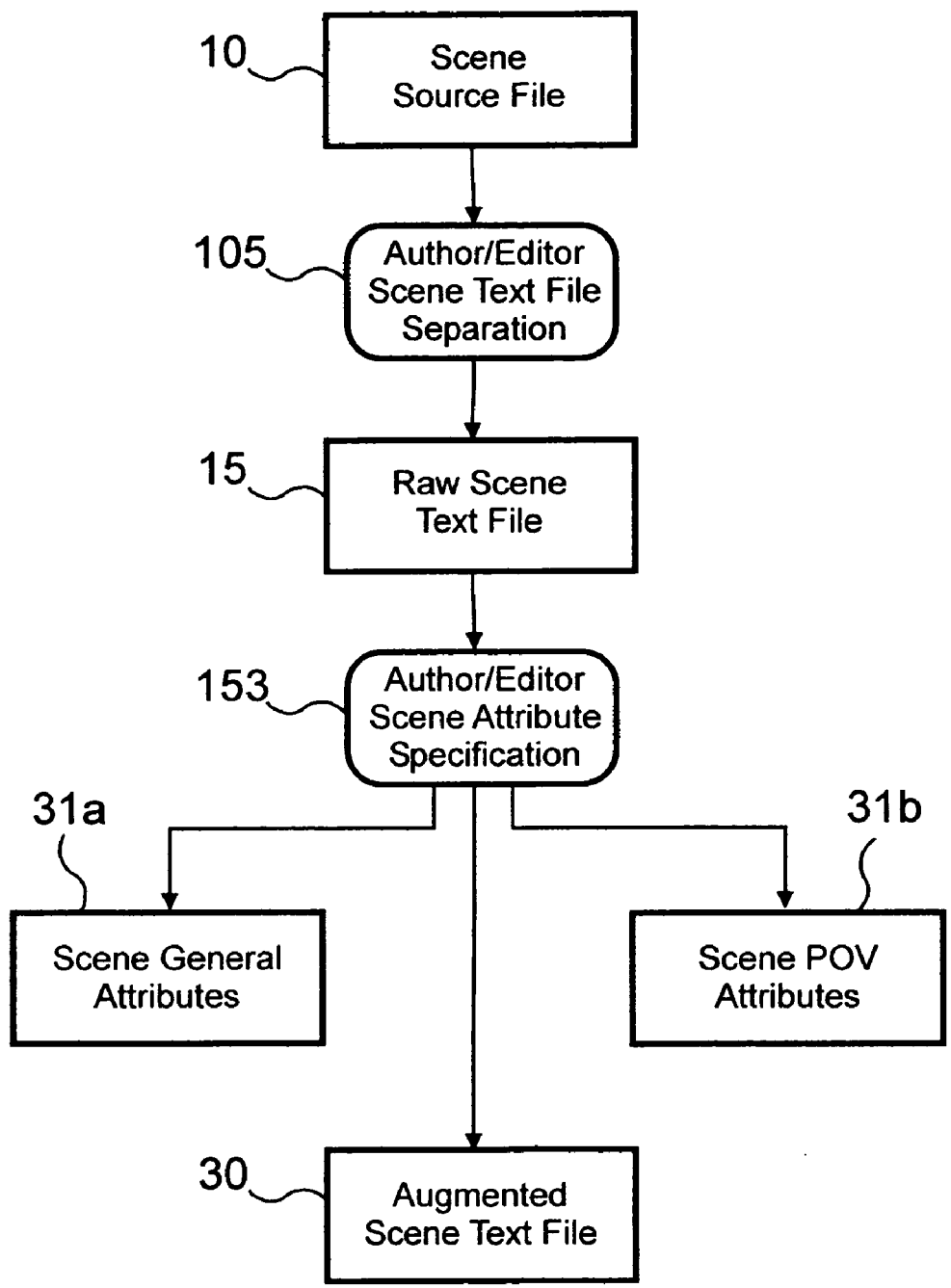
FIG. 3 shows the initial steps required for the author or user in preparing information required by the invention.

See FIG. 3. Using the original source files 10 containing the literary work, the author divides (105) the work into a set of raw scene text files 15 each containing one scene from the work. A scene may be a scene in the traditional sense, meaning a series of actions by one or more characters in a stationary or comoving setting. A scene may also be a unit of narrative bounded only by its beginning and ending, by the limits of its content whether physical or otherwise, and by the author's focus on a single theme, image, or other central magnet of attention for the reader.

The invention requires the author or editor to specify and list scene attributes for every scene in a marked or reserved component of the raw scene text file 15, producing an augmented scene text file 30. The scene attributes required are listed in Table 4. The author or editor must derive the attributes by reading the scene text and related materials such as timelines, maps, or descriptions of detail, and store the resulting information in the list of attributes. For example, the author or editor determines the point of view (POV) attribute by reading the text to see who the narrator appears to the reader to be.

For the purposes of the invention, each scene is bounded by a single POV, a single stationary or comoving (such as an aircraft cabin in flight) frame of reference, and a generally-continuous interval of time. Each scene is also bounded by a flexible limit on the length of the narration of the scene, usually on the order of between one and ten pages of narrative, with the distribution of length skewed sharply toward the low end. These bounds are not rigid—many narratives violate one or more of these bounds within a single scene—but they serve to help an author prepare a work for processing by the invention.

In the course of breaking down the work, the author creates (153) a table 31a of scene attributes associating each scene text file with a title, a date and time, and a list of the characters in, or other focal aspects of, the scene, as specified in Table 4.

The invention requires that one scene attribute receive special treatment separate from the others: the point of view presented in the scene's narrative. The point of view (POV) is a powerful determinant of the way in which a reader experiences the scene being presented, and constitutes a highly-useful way of enlisting a reader's interest and sympathy for the events the entities in the scene. Consequently, the author creates a separate set of scene POV attributes 31b for the invention's use. The author posts all scene attributes 31a, 31b in raw scene text file 15 to create augmented scene text file 30, using the invention's forms for the purpose.

Authors wishing to use the invention innovatively with respect to scene definition may define scenes in any way they wish—a scene having only one line of text presented to the reader may be more effective than the same scene presented at some length. Furthermore, the invention's mechanisms for linking each scene to other scenes may be exploited to 'bounce' a reader through some chaotically-repeating pattern of scenes to obtain different effects in the reading.

The invention provides a tool to assist a user (an author, editor, or publisher) in converting a scene source file for use in a literary macramé. The use of this tool requires the user to perform certain preparatory manual edits on the scene source file. The assumption here is that the user is working with the WordPerfect document software. Analogous methods may be used with other similar software by applying techniques well-known in the art to reinterpret the methods described here.

To use the invention's tool in its basic embodiment, the first line of each scene source file must contain only a title, and the second line must contain only a date and time to be used to situate the scene for the reader. The rest of the scene source file must contain only text in paragraphs, each paragraph starting with a Left Tab indent. The WordPerfect macro Prep-Scen captures each scene's title (first line) and date/time (second line), places span markings for different classes of speech and for passages requiring special presentation treatment, and lays out each paragraph as a single line, complete with paragraph and class markings, for later glossary link installation. The following sections describe the steps needed to convert a WordPerfect scene source file to literary macramé form.

The user (author or editor) must first insert markings in the scene source file to show the macro program where specific types of enhancement are required for proper presentation in XHTML using stylesheets. WordPerfect stores many style codes and other information in its text. As a result, when applying the changes in this step, the user should activate Reveal Codes in the View menu to show where the enhancements are being placed relative to others. All added enhancements must replace existing ones—if any earlier markings, even invisible ones, are left in the document inadvertently, the macro processing will produce unpredictable results.

Verse in the scene source file must be stored as one paragraph per line, starting with a Left Tab. A blank line must precede the verse, and a blank line must follow the verse, and subsequent text must start a new paragraph with a Left Tab.

Speech presented in a work of literature may appear in many modes. Ordinary speech is represented in print using some form of quotation marks. Thoughts articulated as speech are usually represented without quotation marks, and are often signaled to the reader by context alone. Speech directed into a telecommunications device is usually quoted, but this method can confuse readers if it is taking place in a crowd or in the midst of other direct conversation. For works of speculative character, telepathic voice communication is often represented by italics or similar changes of typeface. Automated voices sometimes are represented in similar manner. For all of these modes of speech and any others, their presence and mode must be identified in each scene source file. The use of text enhancements, which embed coded demarcations around the affected text, supports the invention's treatments of different modes of speech.

Enhancements may also be applied in order to grade or categorize certain passages of a text which affect different groups of readers in different ways. Passages which are violent, sexually explicit, horrific, blasphemous, or otherwise offensive to certain classes of readers may be marked with enhancements to permit their special treatment later by the invention. Special treatments may include blanking, removal, obscuration, encryption, or other methods of signaling the nature of the passage to a reader before the reader begins reading it.

For simplicity of the invention, all enhancements listed must be applied within paragraph boundaries only. That means that each paragraph in a long section with a single class of enhancement must be marked individually.

The manual steps in the conversion process for each scene are (see FIG. 4):

1. Starting with the raw scene source file 9, review (491) the scene's opening for the necessary situating cues for readers concerning locale, point of view, continuity from other scenes, and flow of action in progress.
2. Make (492) any necessary changes to the scene's opening to cover the above issues if needed.
3. Review (493) every paragraph and verse line to insure that it begins with a Left Tab character, and ends with a Hard Return character. This combination is used by the Prep-Scen macro to define paragraphs in the output scene text file.
4. Review (494) all dialogue in each scene for consistent use of quote marks and other special symbols, and correct where needed to allow good HTML presentation.
5. Apply (495) the following enhancements to passages of the type described:
   Speech in a character's mind from a source other than the character must be marked as underlined.
   Utterances by a communications device in the ears of a character must be italicized. The character's subvocal speech back to the communications device is also italicized. The communications device's speech is in quotes, the character's responding speech is without them.
   Words of an external narrator must be marked as boldface.
   Character thoughts must be marked as shadowed.
   Media communications must be marked as strikeout.
   Adult-content passages must be marked as redlined.
6. Review and eliminate (496) all other uses of the above-listed enhancements, replacing such usages with other markings that can be individually selected and converted if necessary.
7. Review and develop as needed (497) the scene's ending for the necessary uptick to carry the reader's interest to whichever scene the reader chooses, producing the scene source file 10.
8. Using scene source file 10 as input, run (500) the PrepScen macro to create the scene text file 30 for the scene. A macro button has been provided on the WordPerfect Hyperlink Tools toolbar to simplify starting the macro.

All of the edits listed above are needed for the PrepScen PerfectScript macro to do its work. See FIG. 5. Its specific tasks:

1. Saves (501) the incoming scene source file 10 in place before any macro changes are made (otherwise any edits done just before the macro runs will be lost).
2. Converts (502) left and right quotes to the single, straight-up form, both single and double. This eliminates one source of inconsistency in the scene files, some of which followed left-right conventions, and others of which used the straight-up forms.
3. Locates and centers (503) scene shift markers ("# # #") in HTML format.
4. Locates and marks (504) the start and end of each paragraph in the scene's text, as "<p class="story"> . . . </p>".
5. Marks and codes (505) the top line as an XHTML title header, in the "<h3> . . . </h3>" form.
6. Marks and codes (506) the second line as a story date and time, in the form <p class="tdate"> . . . </p>".
7. Locates and marks spans of text (507) (see FIG. 6):
   Locates and marks (571) speech within a character's mind from a source other than the character, marked in WP with underlining, converting to "<span class="alvce"> . . . </span>".
   Locates and marks (572) speech in a character's headset, marked in WP with italics, converting to "<span class="helmvce"> . . . </span>".
   Locates and marks (573) words of an external narrator, marked in WP with boldface, converting to "<span class="singvce"> . . . </span>".
   Locates and marks (574) character thoughts, marked in WP with shadowing, converting to "<span class="thinkvce">> . . . </span>".
   Locates and marks (575) media communications, marked in WP with strikeout, converting to "<span class="sensivce"> . . . </span>".
   Locates and marks (576) adult-content passages marked in WP with redlining, converting to "<span class="codedvce"> . . . </span>".
8. See FIG. 5 again. Cleans up (508) any reversals of position of </p> and </span> markers wherever possible. Span ranges must always be nested within paragraph ranges.
9. Saves (509) the results as an ANSI delimited text file in the same folder as the scene source file, with no added newlines, and with the same name except for the final qualifier, which is '.txt' replacing '.wpd'. The absence of inserted newlines within a paragraph allows proper processing of multiword glossary references later.
10. Closes (510) the scene source file without saving it, thereby avoiding overwriting it with output information.

The marking of spans of text is done within paragraphs, and not across them. Otherwise the XHTML codes will overlap inconsistently. Although it is possible to nest or overlap multiple marked spans, this practice is not recommended. Such use of the markings will give unpredictable results.

Scene text files 30, as output from the PrepScen macro, are the proper inputs to the invention's conversion scripts for development of the literary macramé. A control file corresponding to a scene text file must be in the parent folder of all the scene text files. The invention's scripts are designed to draw the scene text files out of their separate folders and create all scene HTML files in the parent folder, so these scripts must be run in the parent folder. The scripts are all invoked by a generated shell script called CompileLM.

The different class names in the <span> directives invoke classes in the cascading style sheet used for hypertext display of the scene texts. These classes may change in their presentation as the work evolves.

The PrepScen macro listing appears on the enclosed CD-ROM in the file labeled PrepScen.txt.

Step 2: Establish a Set of Reference Hypertext Files

Every author of literary works creates a work with specific language usages in mind. Due to the vastness, complexity, and variety of usages prevalent in any human language, many authors find necessary the inclusion of vocabularies, glossaries, footnotes, chronologies, sidebars, and other supportive expository or narrative material. Such materials explain or expand on an author's usages to a reader or viewer of a literary work. In a conventional literary work, the viewer must navigate manually among these supportive components. Such manual navigation distracts the reader from experiencing the work immersively. The invention streamlines this navigation task for the viewer so as to minimize disruption to the immersive experience of reading the main body of the literary work.

Figure 7:
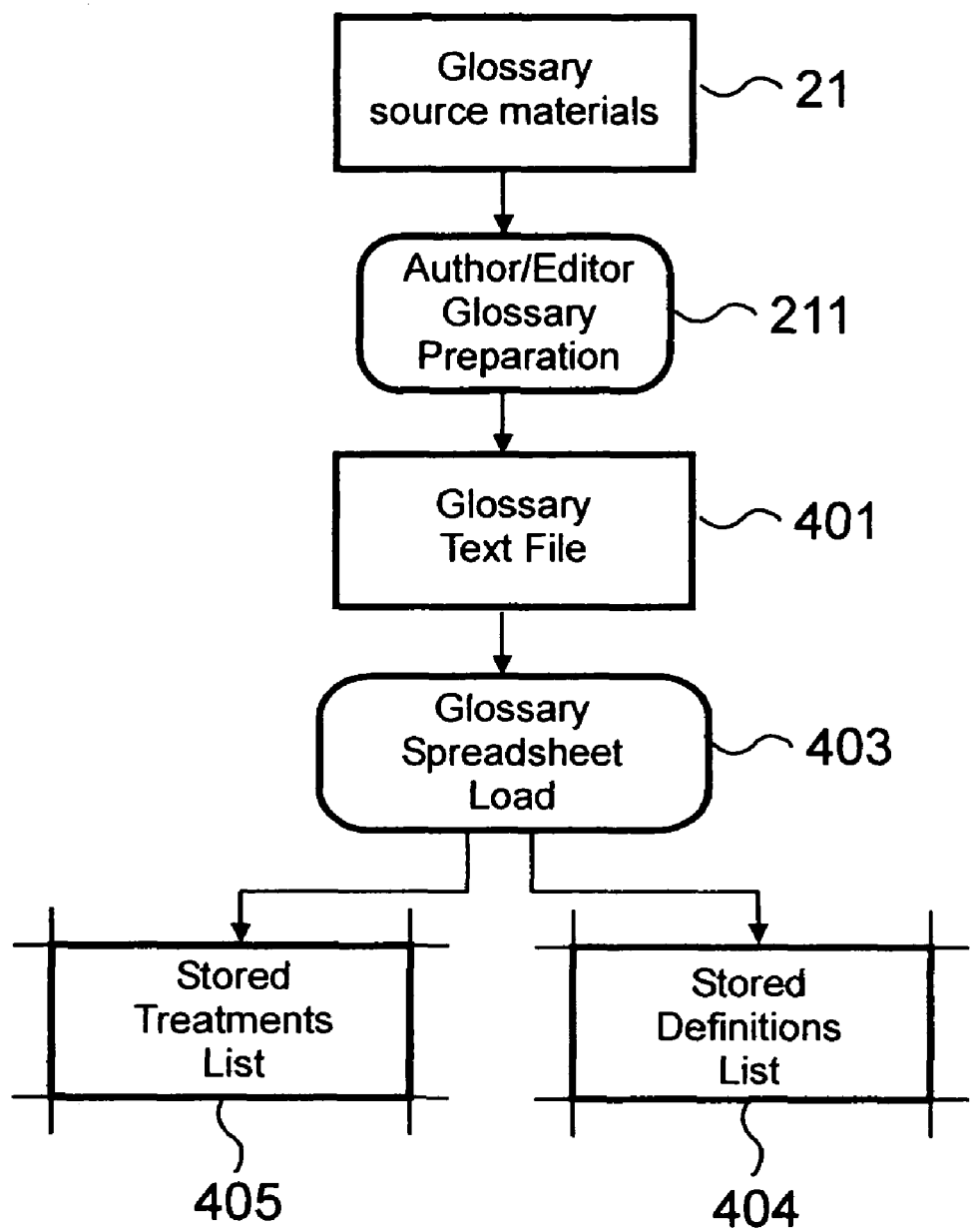
FIG. 7 shows the steps taken in loading the glossary spreadsheet.

See FIG. 7. To create a glossary for the invention's use, the author or editor assembles glossary source materials 21 and converts them (211) into a single glossary text file 401 in a format defined for the invention. A glossary loading process 403 then loads the glossary text file 401 into a glossary database spreadsheet in two tables, the stored definitions list 404 and the stored treatments list 405.

See FIG. 8. The invention uses the stored definitions list 404 as input to a process 406 to incorporate all usages or forms of a term in the term's glossary definition, followed by a process 408 to build a glossary definitions file 409, called AutoGlDefs.txt.

See FIG. 9. The invention uses the stored treatments list 405 as input to a process 410 to build a glossary treatments file 411, called AutoGlP.txt, followed by a process 420 to generate a script 421 for installing glossary links in reference files.

Figure 10:
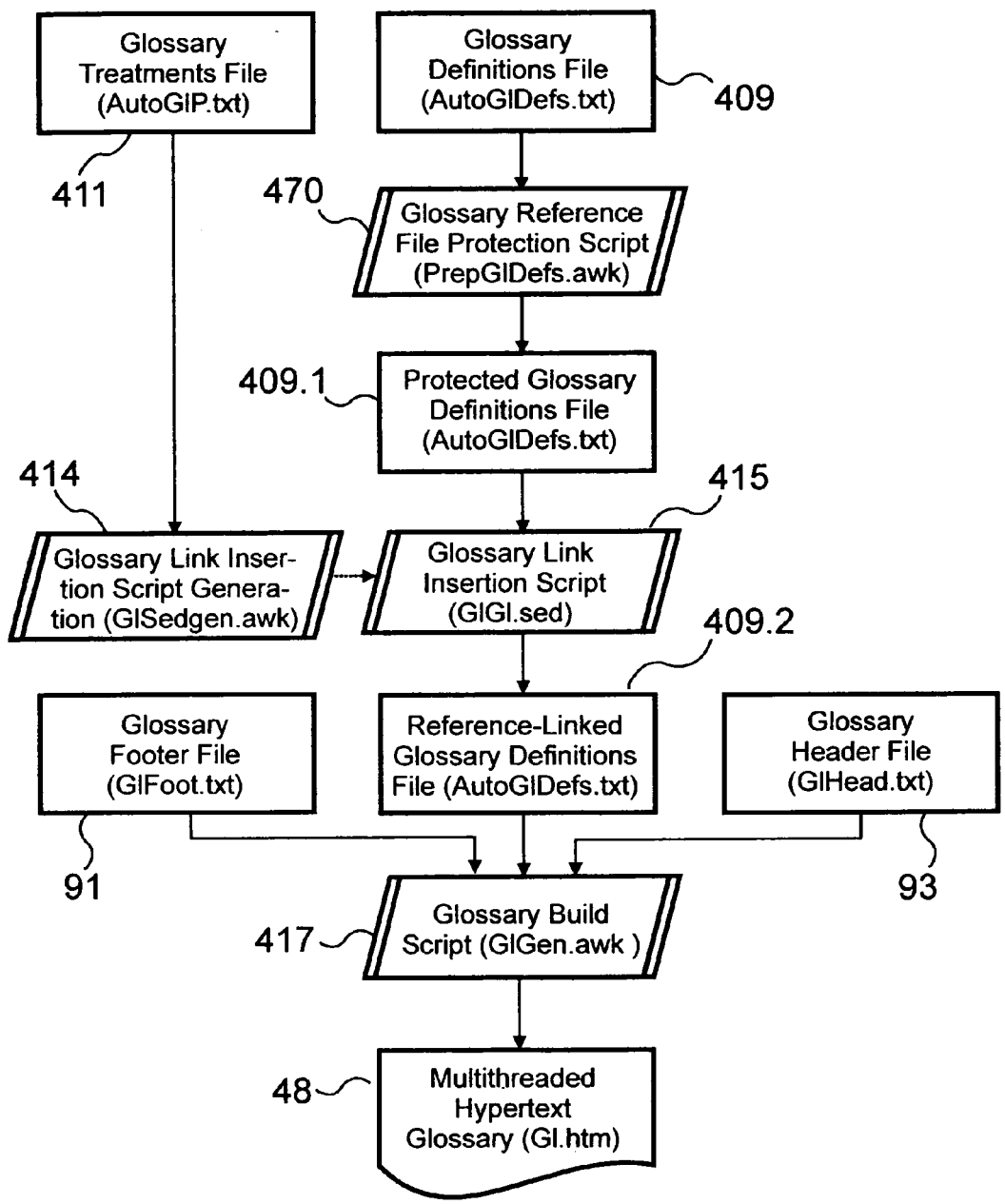
FIG. 10 shows the steps of building the glossary hypertext file.

See FIG. 10. The invention now uses both glossary definitions file 409 and glossary treatments file 411 to build the glossary hypertext file. In a first step, the invention executes a glossary reference file protection script 470 to prevent changes to non-displayed fields in the glossary definitions file 409, converting said definitions file to a protected form 409.1.

The invention uses the stored treatments list 405 to build a glossary self-link insertion generation script 414, which it then executes to read in the protected glossary definitions file 409.1 to create a glossary self-link insertion script 415 to insert glossary links in the glossary itself. The invention then executes glossary self-link insertion script 415 to create an internally-linked glossary definitions file 409.2.

In a final glossary-creation step, the invention executes a glossary build script 417 to combine a glossary header file 93, the reference-linked glossary definitions file 409.2, and a glossary footer file 91 into glossary hypertext page 48, denoted as the multithreaded hypertext glossary.

Figure 11:
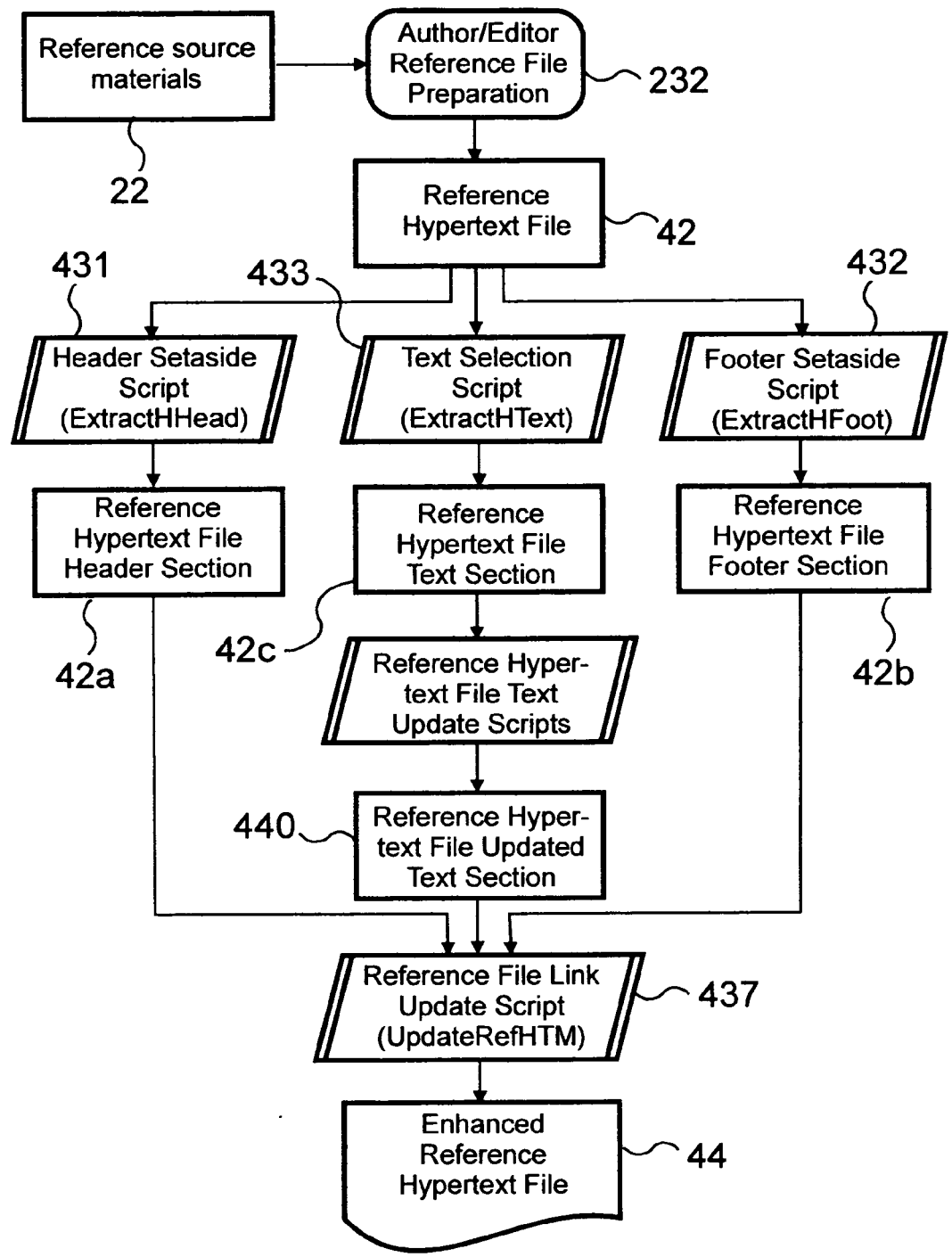
FIG. 11 shows an overview of the steps of building a reference hypertext file.

See FIG. 11. To create other reference hypertext files, the author or editor assembles source materials 22 such as sidebar papers, footnotes, endnotes, and encyclopedia entries, and converts them (232) into reference hypertext files 42.

The invention then applies three scripts to each reference hypertext file 42 to split said file into three parts. The header setaside script 431 creates a reference hypertext file header section 42*a*, the footer setaside script 432 creates a reference hypertext file footer section 42*b*, and the text selection script 433 creates a reference hypertext file text section 42*c*.

All links to the glossary in the reference hypertext file text section 42*c* must be updated. The invention executes a series of scripts to incorporate changed glossary links in the reference hypertext file. See FIG. 12. First, the invention executes a glossary link deletion script 434 to get rid of old glossary links, an HTML concealment script 435 to prevent glossary change code from making false matches to other HTML code, the reference file link insertion script 421 (see FIG. 9) to load the updated glossary links, and an HTML restore script 436 to replace the HTML concealed by script 435.

The output of the link update process just described is the reference file updated text section 440. Return to FIG. 11. The invention's reference file link update script 437 then recombines the updated text section 440, the reference hypertext file header section 42a, and the reference hypertext file footer section 42b to build the enhanced reference hypertext file 44.

Step 3: Establish Links Among Units of Text of the Work and the Reference Hypertext Files At this point the reference-linked reference hypertext files 49 and the reference-linked glossary hypertext files 48 are in their final form for display. See FIG. 13. Each linked glossary hypertext file 48 then contains links 84 to anchors within glossary hypertext files 48, and links 83 to anchors within reference hypertext files 49. Each linked reference hypertext file 49 contains links 86 to anchors within glossary hypertext files 48, and links 87 to anchors within reference hypertext files 49.

Glossary and reference links must also be inserted in the scene texts. See FIG. 14. The invention reads glossary treatments file 411 (AutoGlP.txt) into a scene file link processing script generation process 418 to construct scene file reference link insertion script 419. The invention's augmented scene text file 30 serves as input to scene file reference link insertion script 419, which installs hypertext links to references and glossaries in the scene text to produce reference-linked scene hypertext file 91.

Figure 13:
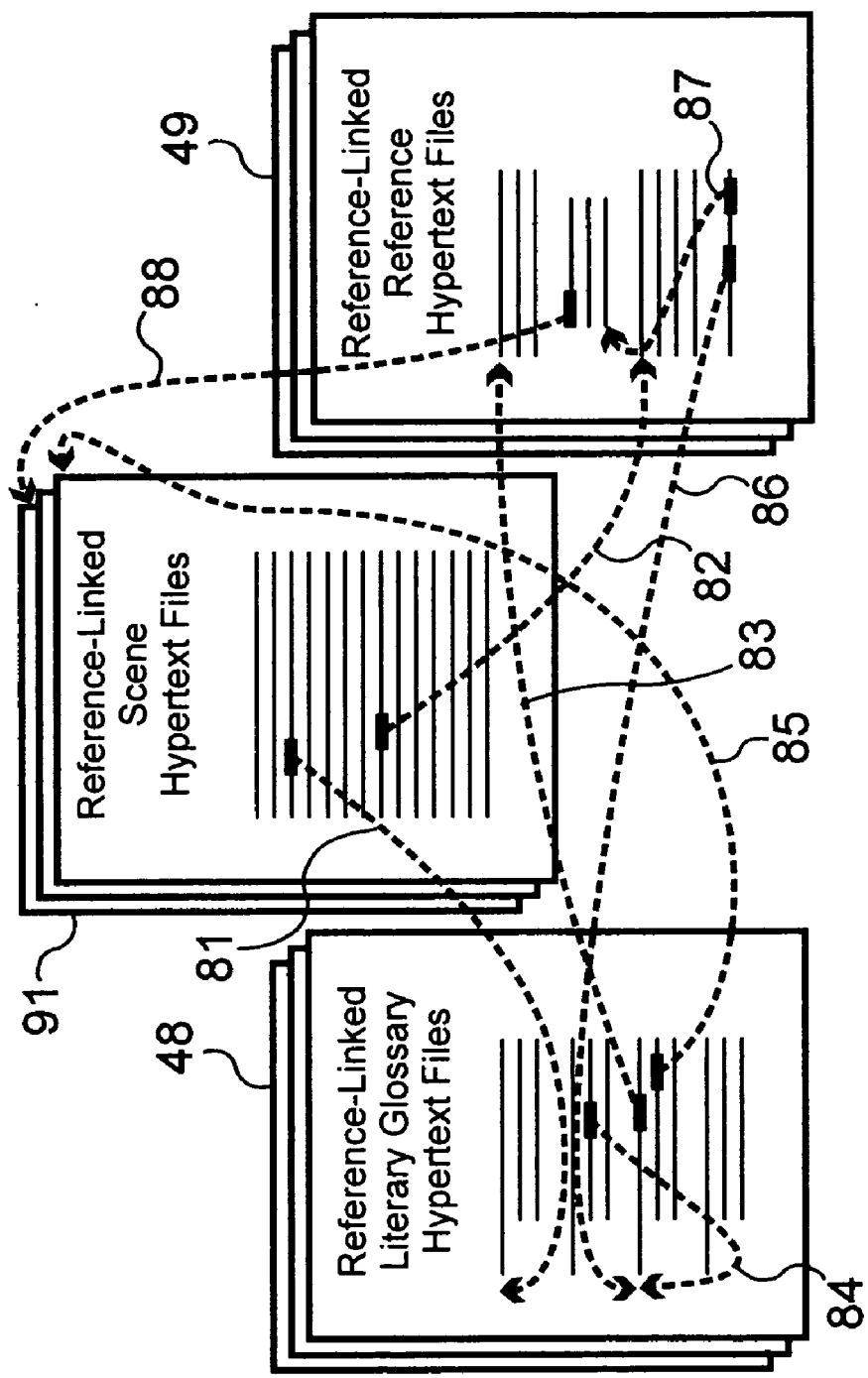
FIG. 13 shows the interlinking of scene, reference, and glossary hypertext files produced by the invention.

See FIG. 13. Each reference-linked scene hypertext file 91 now contains links 81 to anchors within glossary hypertext files 48, and links 82 to anchors within reference hypertext files 49.

Figure 14:
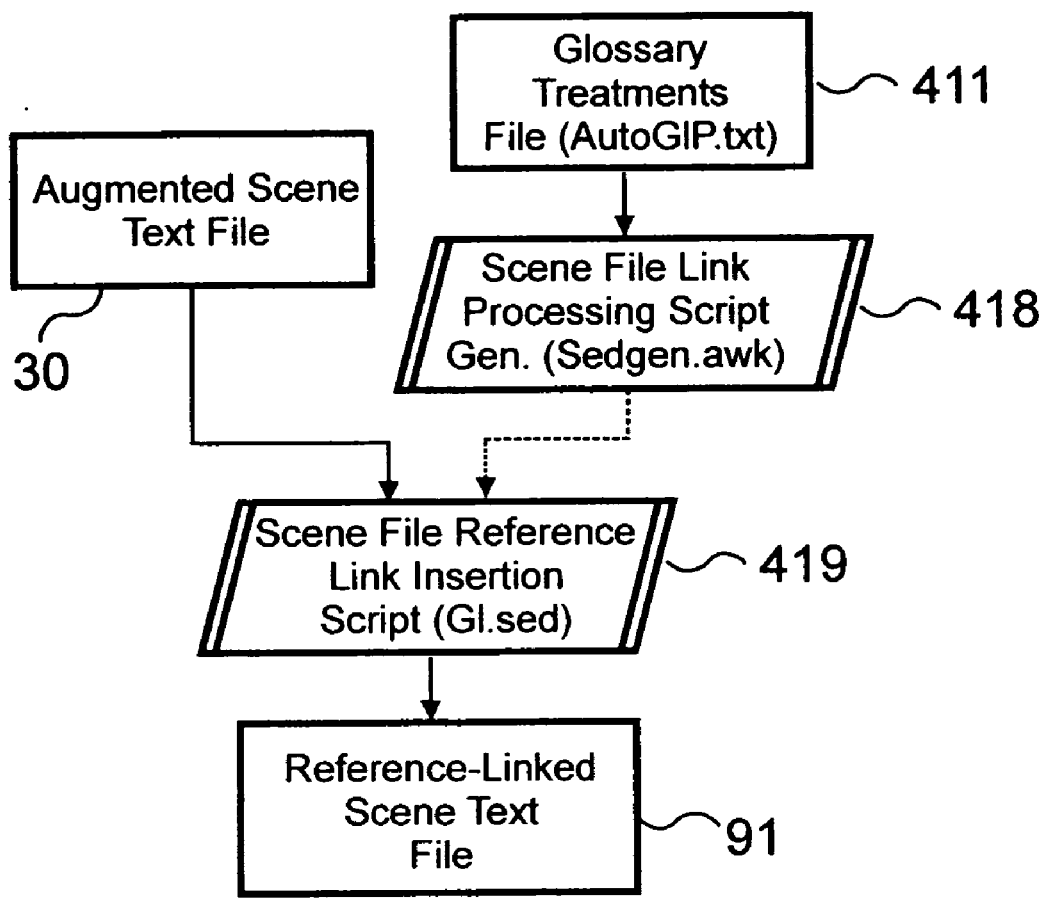
FIG. 14 shows the steps of building a reference-linked scene text file.
Figure 15:
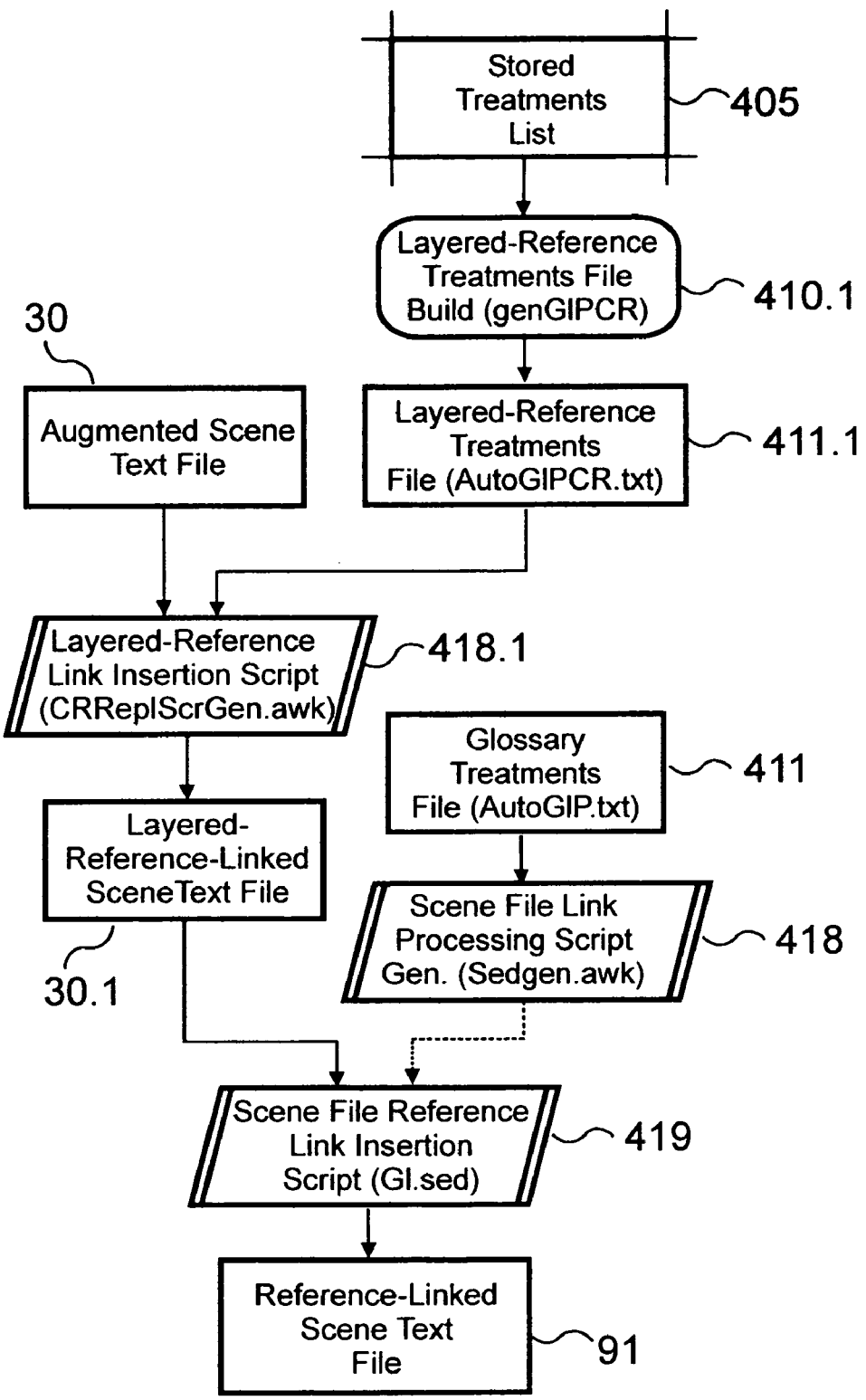
FIG. 15 shows the steps of building a reference-linked scene text file in an alternative embodiment.

See FIG. 15. In a layered-reference embodiment allowing time-dependent link insertion, the invention takes an additional step preceding the installation of glossary and reference links in the scene texts as shown in FIG. 14. In the present embodiment, the invention applies a layered-reference treatments file build script (genGlPCR.txt) 410.1 to build the layered-reference treatments file (AutoGlPCR.txt) 411.1. The invention then uses the layered-reference treatments file (AutoGlPCR.txt) 411.1 as input to a scene file layered-reference link insertion script 418.1. Scene file layered-reference link insertion script 418.1 then installs time-dependent hypertext links to references and glossaries in the scene text to produce layered-reference-linked scene hypertext file 30.1. Processing then continues as shown in FIG. 15, in steps identical to those shown in FIG. 14.

The use of POV dependency requires that the scene text file carry its POV information along, which is done in a POV-sensitive embodiment. A match of link term plus POV triggers the use of a reference entry different from the entry used when such a match has not been made. Different POVs may yield different references.

Such conditional link handling may be generalized to other characteristics of each scene. Once an XML-style listing of scene data elements is incorporated in each scene text file before the storage of these data elements in the POV spreadsheet, additional embodiments are easily developed.

Step 4: Establish Sequences of Reading for Scenes

The invention uses a specially-defined database or spreadsheet, in a first embodiment called the POV spreadsheet, to establish multiple sequences in which scenes may be linked for the reader. See FIG. 16. The scene general attributes 31a, also produced in Step 1 as shown earlier in FIG. 3, serve as input to a scene loading process 301 to load the scene text file attributes 31 in a scene attribute entry 33 in the scene attributes list 3a of the POV spreadsheet. For each scene, the POV spreadsheet also lists in the scene text file attributes 31 the name of that scene's corresponding text file, its locale in the world of the story, and the range in story time during which it takes place.

Figure 17:
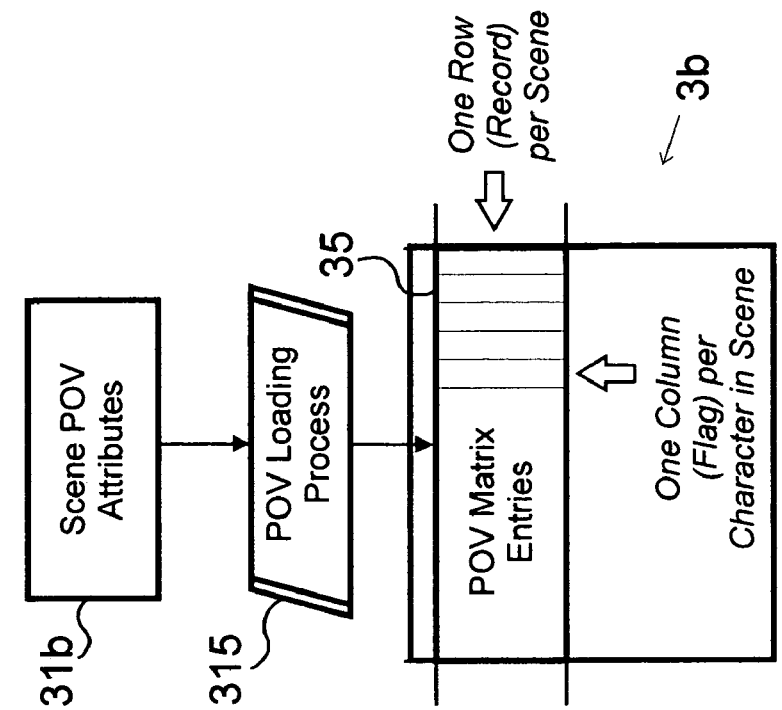
FIG. 17 shows the steps of loading POV spreadsheet scene-character matrix entries.

See FIG. 17. The POV spreadsheet contains a matrix of scenes versus characters, called the POV matrix, that shows which character is the point-of-view character in each scene, and which other characters appear or are presented, directly or indirectly, in the same scene. The scene POV attributes 31b, produced in Step 1 as shown in FIG. 3, serve as input to a POV loading process 315 which loads the scene POV attributes in an entry 35 in the POV matrix 3b.

In a manual-loading embodiment, the author, editor, or other user loads and updates scenes and characters into the POV spreadsheet by conventional manipulations of spreadsheet rows and columns. Each scene text file corresponds to a single row entry in both the POV matrix 3b and the list 3a of scenes and their attributes. To add a scene to the POV spreadsheet, the user inserts a row in the list 3a of scenes and their attributes and a corresponding row in the POV matrix 3b, and fills in all attribute values in both rows. To add a character to the POV spreadsheet, the user inserts a column in the POV matrix 3b. To show a character as the point-of-view character in a scene, the user enters a '*' in that character's column in that scene's row in the POV matrix. To show a character as present in a scene, the user enters an 'x' in that character's column in that scene's row in the POV matrix.

The user may delete scenes by deleting the corresponding rows in list 3a and matrix 3b.

The manual-loading embodiment may be replaced using conventional user interface techniques such as forms fill-in or text data loading utilities.

Figure 16:
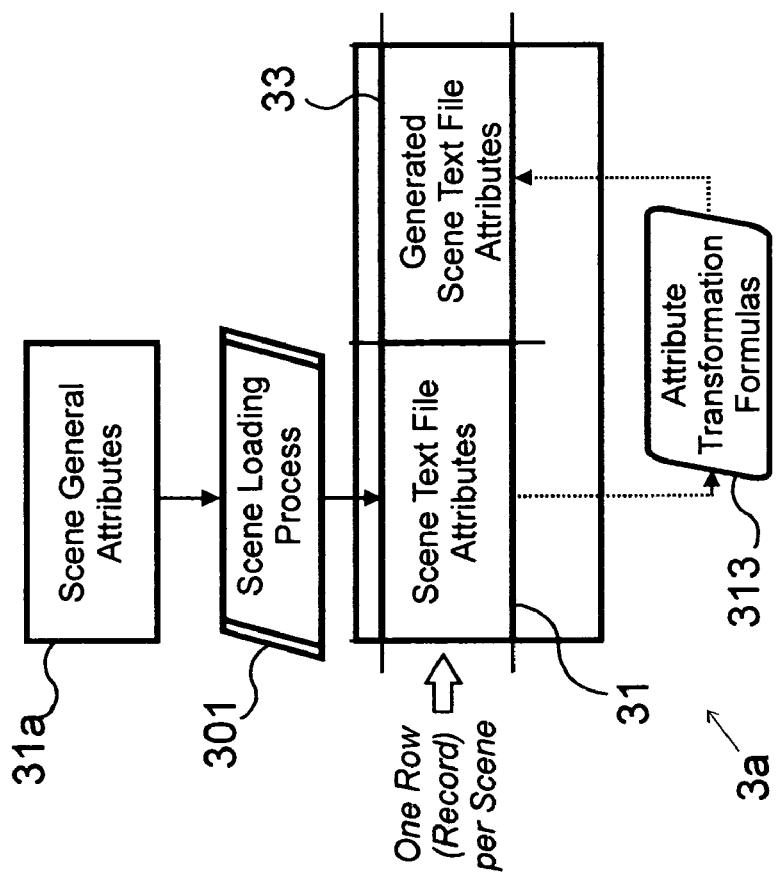
FIG. 16 shows the steps of loading POV spreadsheet scene text file attributes.

See FIG. 16. By its application of attribute transformation formulas 313, the invention's POV spreadsheet constructs for its internal use one or more additional generated scene text file attributes 33. To establish multiple possible sequences of reading, the POV spreadsheet also constructs and maintains for each scene an index to each of one or more predecessor scenes and one or more successor scenes in various sequences of possible readings, including such indices in the set of generated scene text file attributes 33. The spreadsheet also lists for each scene any relevant formatting and publishing information needed to complete the synthesis of the literary macramé.

Figure 18:
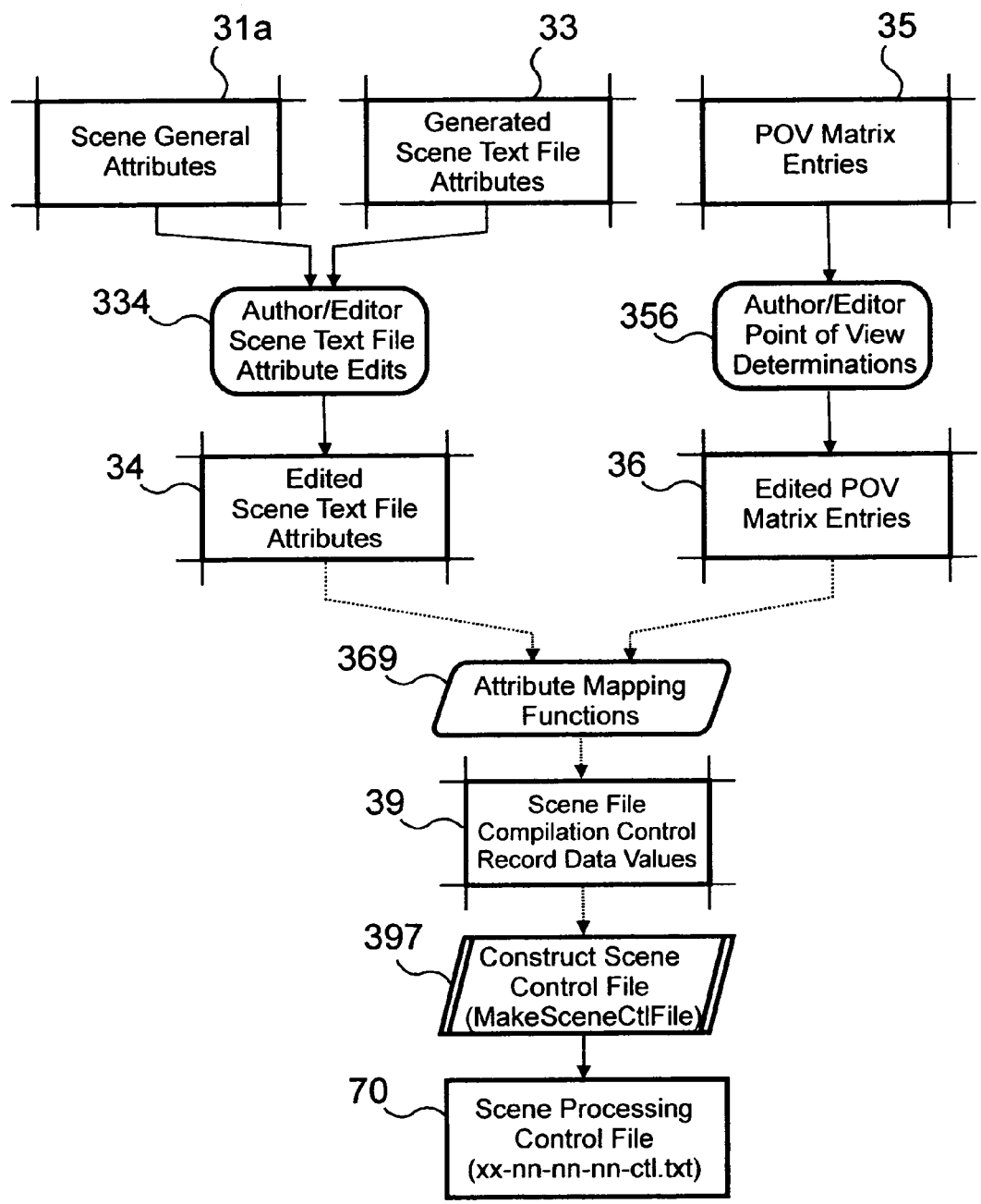
FIG. 18 shows the steps required of the invention and the user for building the scene processing control file.

See FIG. 18. The POV spreadsheet offers the author the opportunity to see all the information gathered concerning all the scenes in the work, and make any needed changes to that information before the invention uses it to construct the complete literary macramé. The author reviews and updates (334) the scene general attributes 31a and the generated scene text file attributes 33 to produced the edited scene text file attributes 34. The author reviews and updates (356) the POV matrix entries 35 to produce the edited POV matrix attributes 36.

Figure 19:
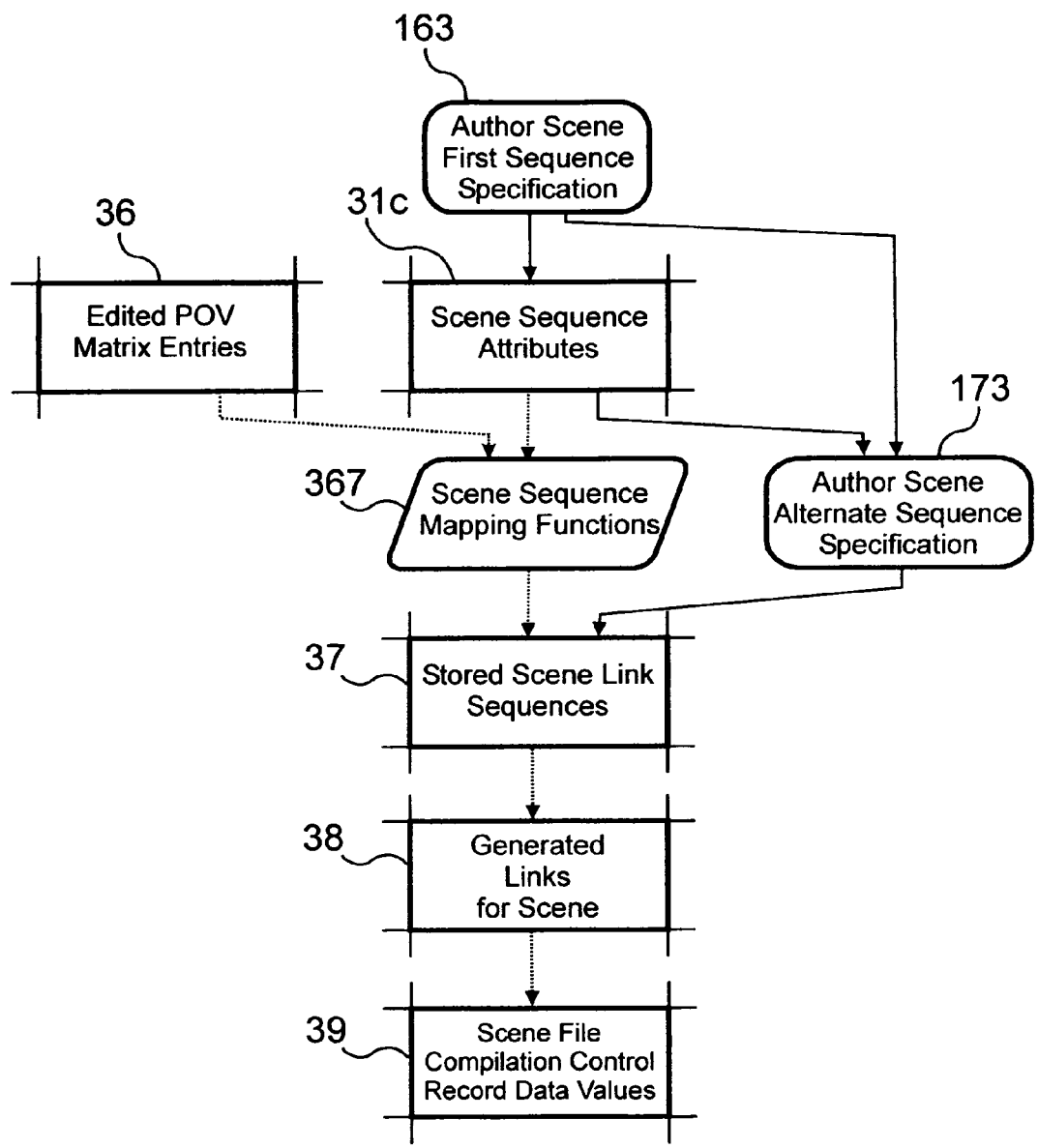
FIG. 19 shows the steps required of the invention and the user in the production of control record data values for primary and secondary scene sequences.

See FIG. 19. Using the invention's interface to the POV spreadsheet, the author specifies (163) a principal or first sequence of reading for the work, which is stored in the scene sequence attributes 31c (see Table 1). The POV spreadsheet combines the scene sequence attributes 31c with the edited POV matrix entries 36, applies its scene sequence mapping formulas 367, and thereby produces scene link sequences 37 (see Tables 2a and 2b). The author may specify (173) one or more alternate scene sequences for reading of the work, adding them to stored scene link sequences 37 (see Table 2c). The POV spreadsheet uses stored scene link sequences 37 to produce generated links for scene 38, and a set of scene file compilation control record values 39.

The author may use a simple, primary, list-order sequence to link scenes in a linear order only. The author may also number scenes in any of several different ways to offer the reader different orders of reading. Finally, the author may decide to present all scene links to successor scenes to the reader at once, to enable free choice of succeeding scenes within the bounds of the author's selections. For each alternative scene selection, the invention stores a scene title and other orienting information which is visible only on passing the mouse pointer over the link's display area.

See FIG. 18. Using its edited scene text file attributes 34 and its edited POV matrix entries 36, the invention's POV spreadsheet applies its attribute mapping formulas 369 to produce a set of scene compilation control record data values 39. Using a generating function 367 (MakeSceneCtlFile), the POV spreadsheet then constructs a scene processing control file 70 for each scene.

This step establishes a plurality of narrative sequences in which the scenes of a literary work may be read. In any case, one set of primary links connects the scenes in a first order of reading so that a reader can move through the main story by a single command or click for each scene.

Using the invention's spreadsheet, the author may also place additional scenes in the story to be read only through other sequences of reading as defined by a second set of links. The author may also overlap or replicate scenes in the work as seen from different points of view and possibly different scenarios, and provide added sets of links for sequences of reading that include those overlapped or replicated scenes.

The author may also provide one or more sets of links to follow the viewpoint of each of several characters in the story, as was done by Lawrence Durrell in his printed story "The Alexandria Quartet", told from four separate points of view. The invention, through its application of scripts incorporated in the POV spreadsheet keyed to the point-of-view character for each scene, may construct such viewpoint-following threads of narrative for any characters selected by the author.

The author may also provide one or more sets of links to follow different temporal sequences in the story, which permits reading the story backwards, forwards, or in any other temporal mode.

The author may also provide one or more sets of links to follow different spatial sequences in the story, which permits reading the story as seen from a series of distinct physical vantage points.

The author may also provide one or more sets of links to follow different conceptual associations in the story, which permits aggregating components of the story to be presented in some specific order for some desired mental or emotional effect. The invention, through its application of scripts incorporated in the POV spreadsheet keyed to keywords supplied by the author for each scene, may construct such viewpoint-following threads of narrative for any characters selected by the author.

Further such orderings, linkages, and combinations of them are possible; the invention facilitates all such combinations.

In a search-engine embodiment, the author may also provide for presentation of links established dynamically by a search engine, a method well-known in the art but not applied in the presentation and reading of fiction. The search engine's heuristics may be applied by a server system to a given scene to present different sets of links for different readers depending on earlier choices made by each reader or defined set of readers, or dependent on the presence, frequency, and usage of various terms and text constructions in the scene texts. In such a search-engine embodiment, the invention does not install all links at the time of creation of the scene hypertext files, but instead defers link installation until runtime when the literary macramé is being read. The appearance and presentation of the scene hypertext file remains the same as in other embodiments.

Finally, a search-engine embodiment may be combined with other embodiments described above to offer the reader both fixed links and dynamic links among scenes.

Step 5: Convert the Work into Browser-Compatible Form

Figure 20:
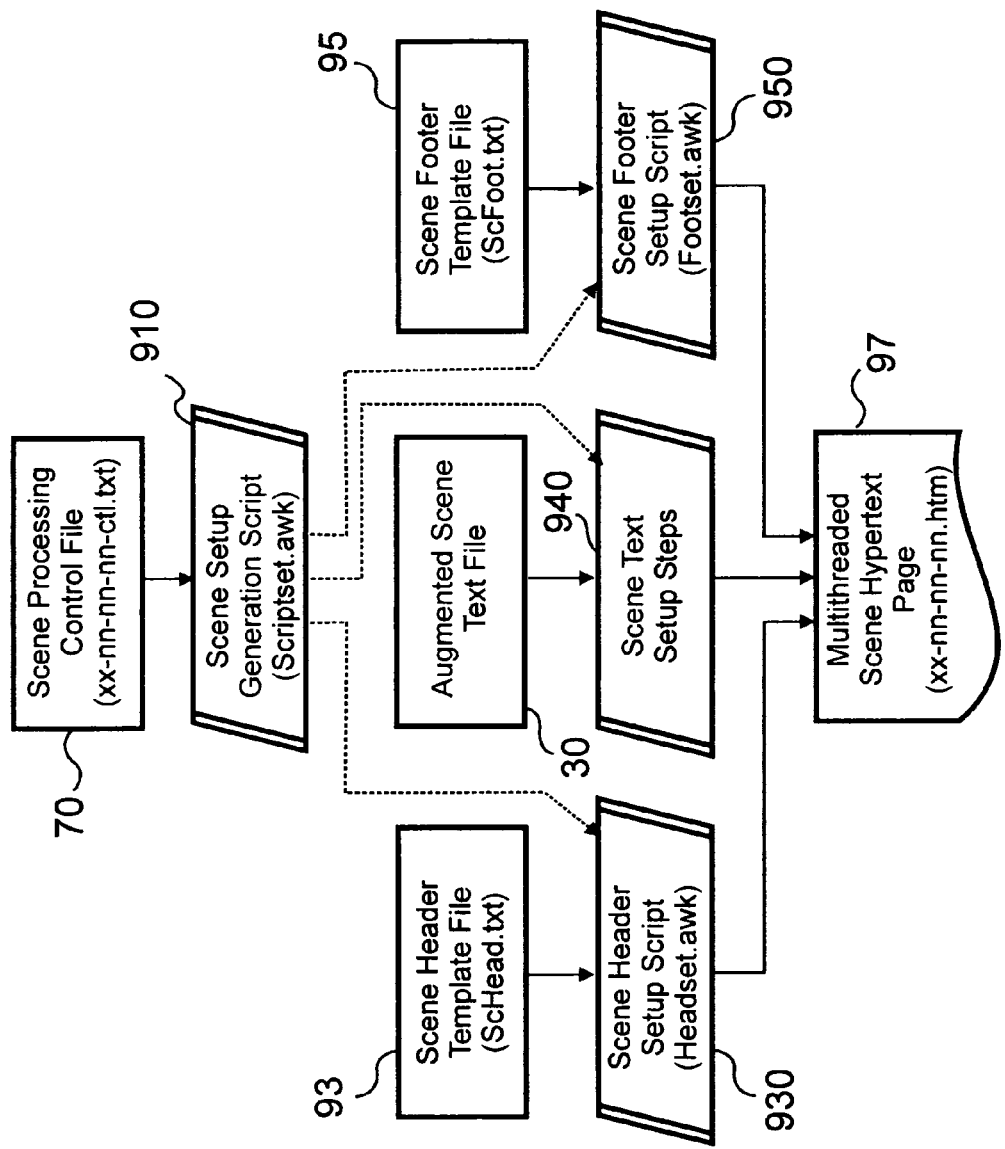
FIG. 20 shows the steps of the invention in the production of the final multithreaded scene hypertext page, a fully reference-linked scene hypertext file.

As shown in FIG. 20, the invention's scene processing control file 70 serves as input to a scene setup generation program 910. Scene setup generation program 910 builds scene header setup script 930, scene text setup script 940, and scene footer setup script 950, incorporating scene attributes and scene links in all three files as needed, and combines the outputs from setup programs 930, 940, 950 with reference-linked scene hypertext file 91 to produce multithreaded scene hypertext page 97.

Figure 21:
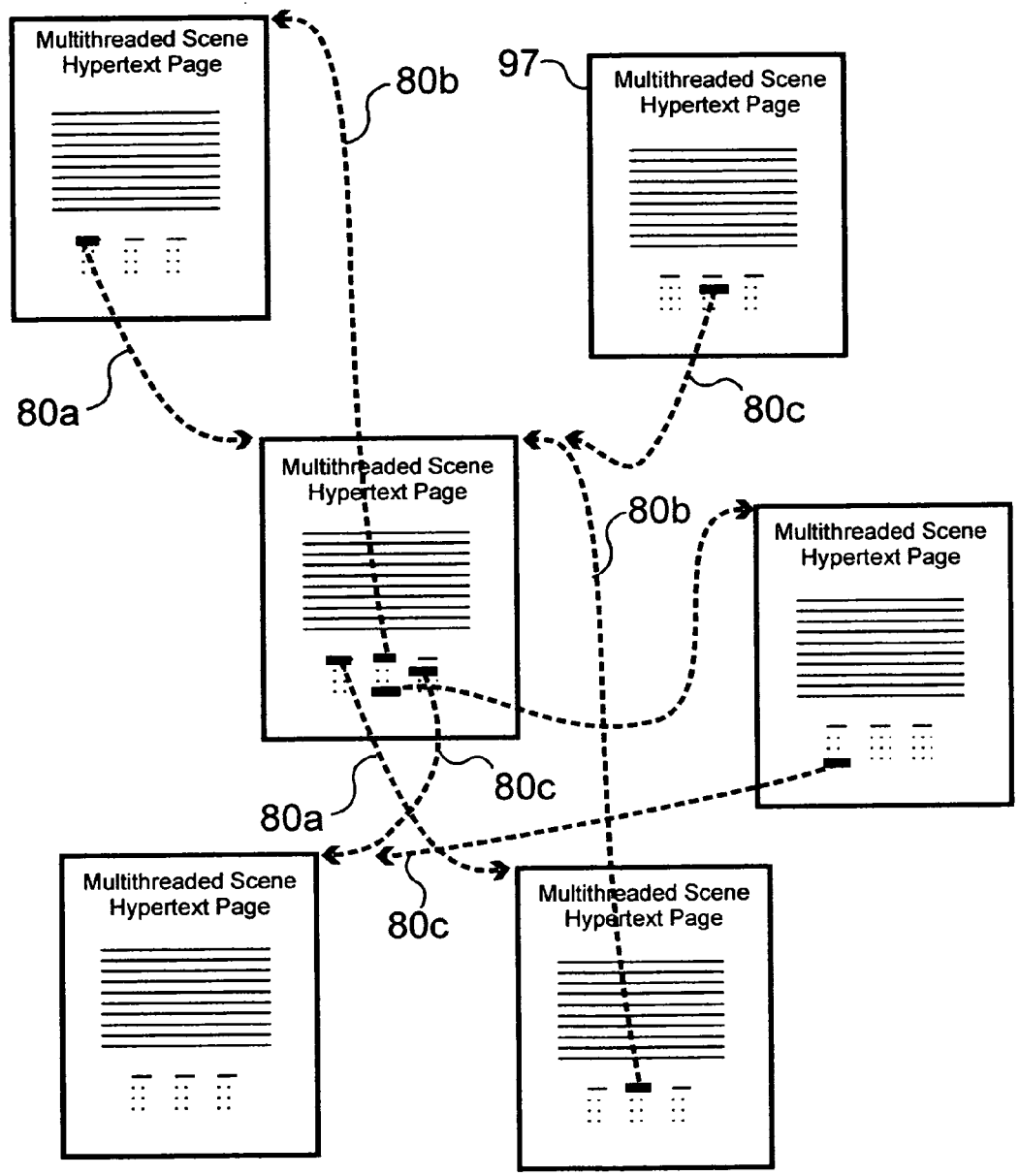
FIG. 21 shows the paths of scene sequence links among multithreaded scene hypertext pages.

As a result of the operation of scene header setup program 930 and scene footer setup program 950, the stored scene link sequences contained in the scene text control file are converted into links stored in the multithreaded scene hypertext page 97. See FIG. 21. Each multithreaded scene hypertext page 97 contains a single visible link 80a to the next scene in the author's first sequence of scenes, a single visible link 80b to the previous scene in the author's first sequence of scenes, and one or more optionally-displayed links 80c to scenes in an alternate sequence of reading specified in the stored scene link sequences. See FIG. 22 and FIG. 23 for illustration of the appearance of links in multithreaded scene hypertext page 97.

Each multithreaded scene hypertext page 97 contains everything necessary to allow browser access and display of its contents in the overall form desired by the author. Any hypertext components incorporated manually by the author are preserved in this process. The name of each hypertext scene file is stored in the invention's POV spreadsheet. All links to succeeding scenes and other essential points are incorporated in each multithreaded scene hypertext page 97.

Step 6: Incorporate Manual Links

This step is not depicted. Using a conventional Web page editor program, the author inserts anchors at points within the multithreaded scene hypertext page 97 wherever the author intends such points to be used by the reader. Once the multithreaded scene hypertext pages 97 contain anchors inserted by the author and are linked to reference materials and to each other, the author may add links to the multithreaded scene hypertext pages 97 that supply side pathways and shortcuts for readers to follow.

Step 7: Incorporate Special Presentation Features in the Work

The invention provides for varying levels of concealment and display of individual components of the work. Based on reader preferences, certain scenes may be skipped or substituted, certain scenes may be presented in different languages or symbols, certain scenes may be presented as puzzles or cryptograms, and other such transformations may be included in the interest of accommodating reader sensitivities, offering readers challenges, or simply entertaining readers.

Figure 4:
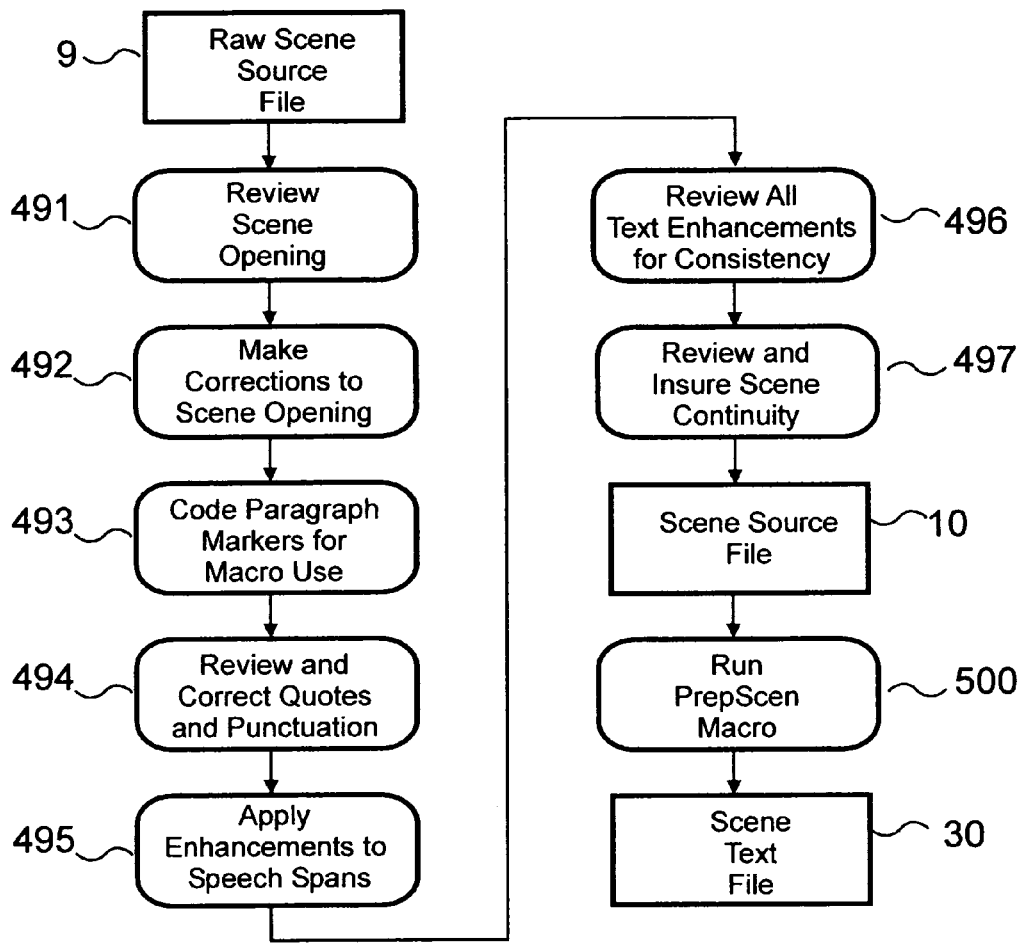
FIG. 4 shows the steps of the manual conversion process for a scene text file
Figure 5:
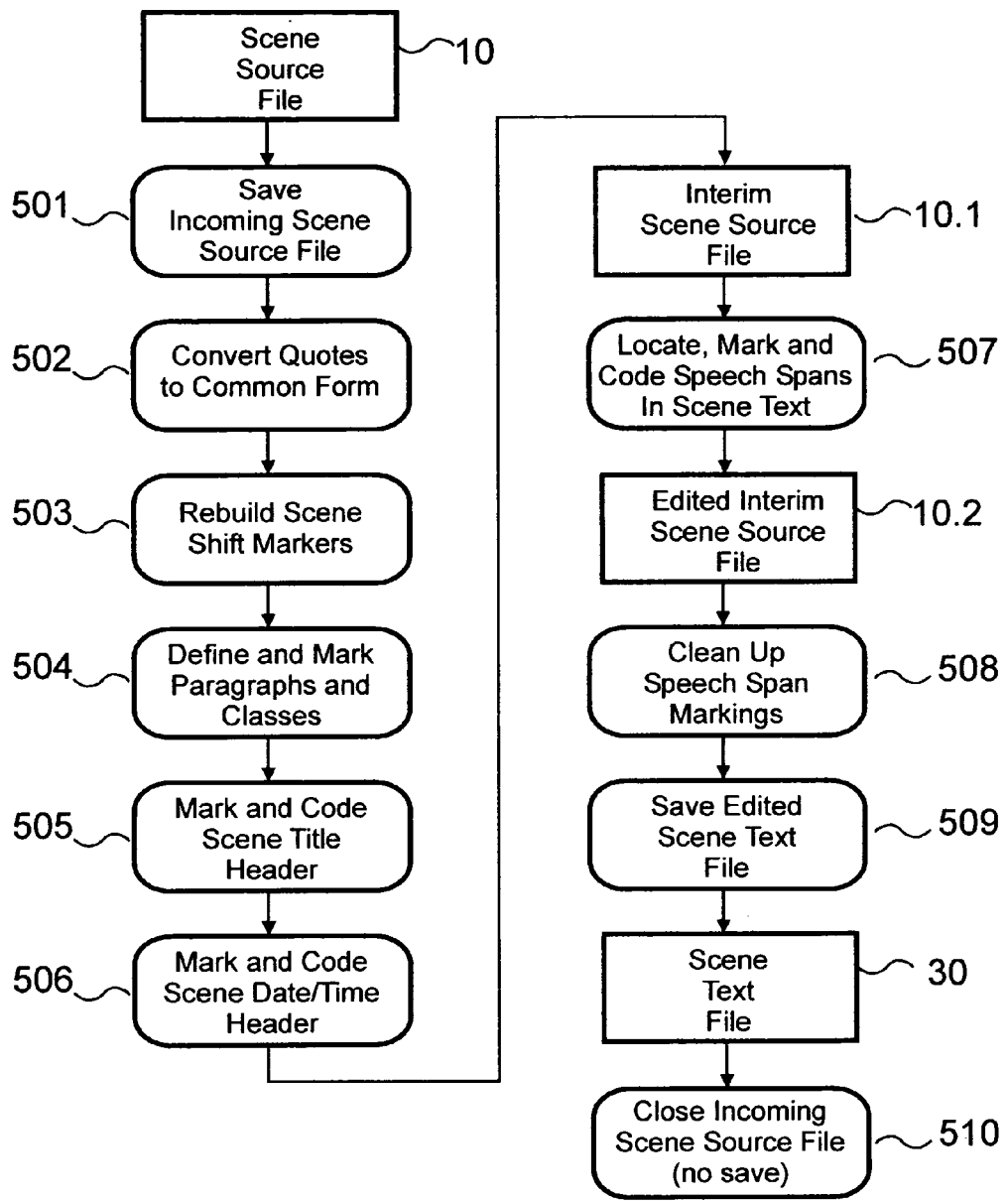
FIG. 5 shows the steps of the overall macro processing for a scene text file.

Through its marking of different spans of text as described in Step 1 and shown in FIGS. 4 and 5, the invention offers the flexible use of different typefaces to convey different modes of discourse or dialog, governed by hypertext stylesheets. An example of the presentation of such modes might contain dialogue between two characters in conventional form in quotation marks, interspersed with interior monologue in the mind of one of the characters displayed in a first distinctive typeface, and interspersed with headset communications conducted privately by one of the characters and displayed in a second distinctive typeface.

By its use of selectable stylesheets, the invention allows the reader to see the words of certain classes of speaker presented in one typeface while the words of other classes of speakers are presented in another typeface. An example of such a contrast: the presentation of normal dialogue in conventional quotes, the presentation of internal monologue or thought in a first altered typeface without quotes, and the presentation of a telecommunications dialogue in the same scene in a second altered typeface without quotes. Such stylistic differences of presentation clarify for the reader the character of the utterance while allowing the author to avoid including complicated framing or identifying terms or phrases, thereby simplifying the flow of the narrative and facilitating deeper reader immersion in the work.

Selectable stylesheets also allow the author to present differently-graded versions of the text for different readerships, for example, younger readers, those with visual or cognitive impairments, those with cultural, political, or ethnic sensitivities, and so on.

Step 8: Link the Reference Materials Back to the Units of Text of the Work

The invention permits the insertion of links from within each reference file to points in the hypertext scene files. Such references may provide starting points for the reader which lead to self-contained narratives or stories within the literary macramé being created.

Step 9: Suppress the Conventional Marking of Browser Links

Figure 24:
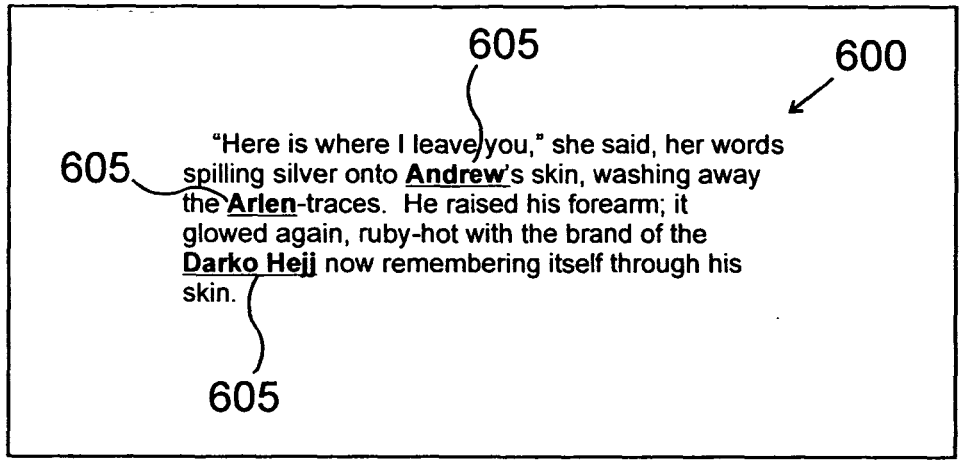
FIG. 24 shows a conventional scene hypertext page presentation as presented by a Web browser, with conventional link marking.
Figure 25:
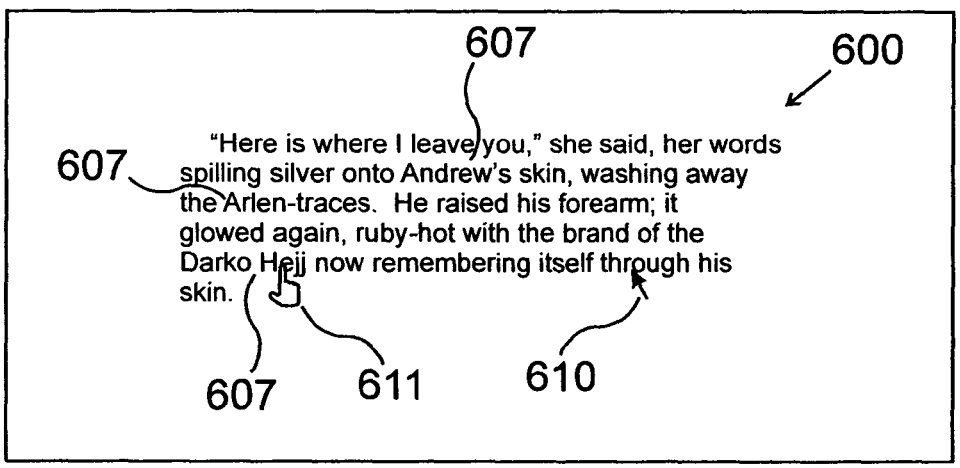
FIG. 25 shows the invention's scene hypertext page presentation as presented by a Web browser, with the invention's link marking.

See FIG. 24. Through the use of stylesheets, the invention suppresses the conventional accents used to highlight or mark the presence of hypertext links in the story text 300. Ordinarily, hypertext links 305 are displayed using colors, typefaces, or other distinguishing styles which set off the links in visible contrast to the story text 300. As shown in FIG. 25, the invention's presentation of hypertext links 307 makes them indistinguishable in appearance from story text 300. As a result, the reader may only locate hypertext links 307 by passing the mouse pointer 310 over such a link. This action triggers a change in the form of the displayed mouse pointer 311, which informs the reader of the presence of the link. A reader who does not pass the mouse pointer over the story text 300 will see only the displayed text, not the hypertext links 307.

The invention also provides for readers who wish to make such links subtly visible during reading by substituting different stylesheets when requested by a reader to do so. Such substitutions are facilitated through the use of conventional interfaces.

Step 10: Define and Use Background, Muted Supporting Windows

Figure 26:
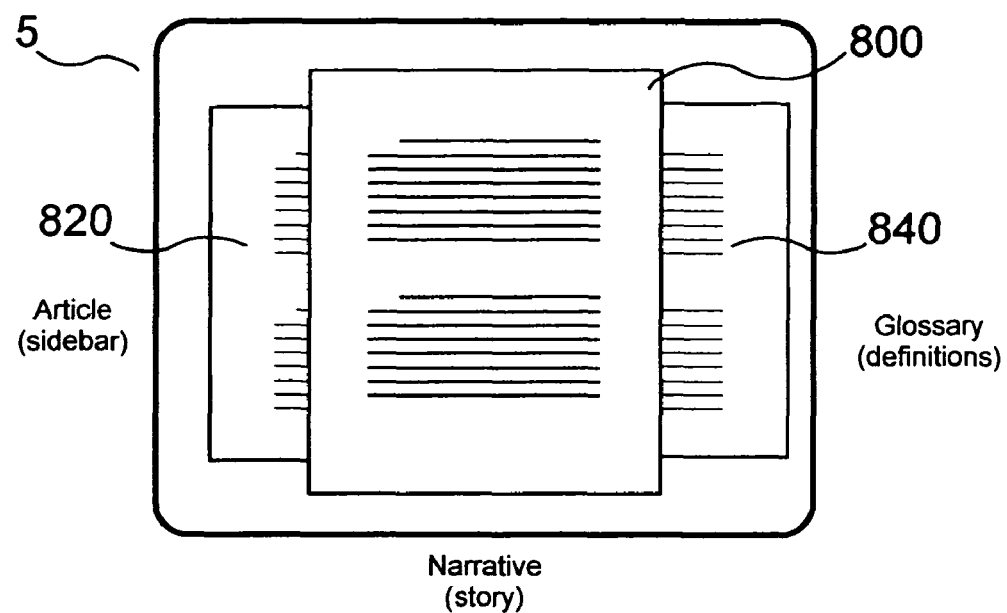
FIG. 26 shows the invention's scene hypertext page presentation in front of glossary and reference hypertext pages as presented by a Web browser.

See FIG. 26. The invention provides at least three basic windows in which it presents material to the reader on the display screen 200. The primary window 500 is the story window, placed centrally in the display and made both larger and of higher contrast than the other windows 520, 540. The story window 500 displays primary story or narrative text 505. The reader of the work may ignore windows 520 and 540 throughout the reading experience, thereby emulating the reading experience using a printed book. The remaining two windows 520, 540, presented at left and right respectively and overlapped by the story window 500, supply sidebar reference reading in the form of glossaries, expositions on subjects in the story, images, maps, animations, diagrams, dictionaries, and other supporting works.

When the reader selects a link within the primary window 500, said link may have its anchor either in the primary window 500 or in one of the side windows 520, 540. If the link has its anchor in the primary window 500, the link selection will cause the primary window 500 to display the anchor and its surrounding context. If the link has its anchor in a secondary window 520, 540, the link selection will cause the side window for the page in which the anchor appears to display the anchor and its surrounding context. The link selection for an anchor in a side window 520, 540 does not, however, cause said side window to overlap the primary window 500. The reader must explicitly select said side window to display it in the foreground.

Figure 27:
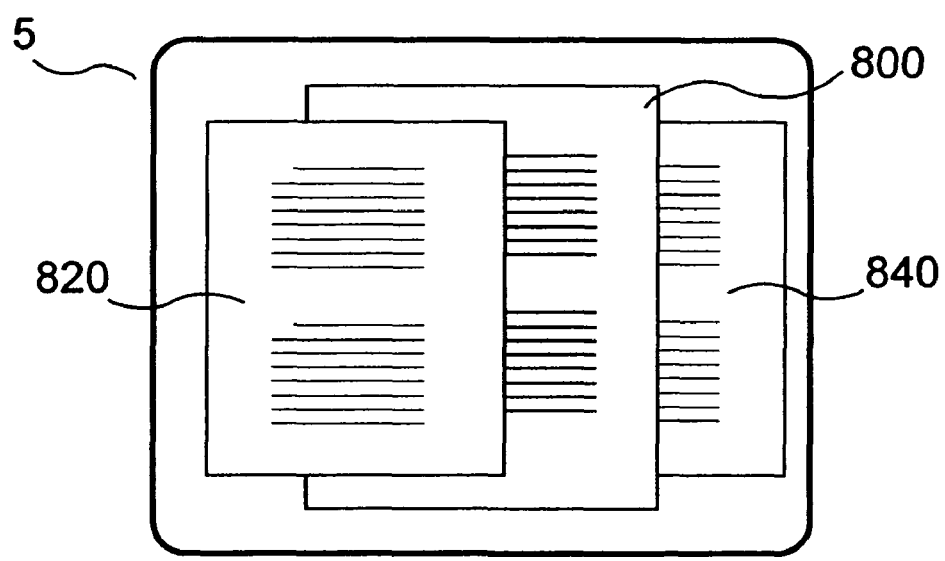
FIG. 27 shows the invention's reference hypertext page presentation in front of glossary and scene hypertext pages as presented by a Web browser.

When the reader selects a side window 520 or 540 as shown in FIG. 27, side window 520 or 540 overlaps the story window 500 until the reader selects the story window 500 again. The same process holds in the opposite sense, when the primary window is selected. This overlap process is standard behavior for a browser program.

When the reader selects a link within a side window 520, 540, said link may have its anchor either in the primary window 500 or in one of the side windows 520, 540. The link selection will cause the window for the page in which the anchor appears to display the anchor and its surrounding context. The link selection for an anchor in another window 500, 520, 540 will not, however, cause said window to overlap the window containing the link. The reader must explicitly select said window to display it in the foreground.

Side windows 520, 540 are muted in their appearance to avoid distracting the reader with their contents during the reading of the contents 505 of story window 500. Additional windows may be provided as needed. Different sizes and resolutions of display screens 400 are provided for by the invention. The invention also scales the positions and sizes of the windows 500, 520, 540 to accommodate different display devices.

Figure 28:
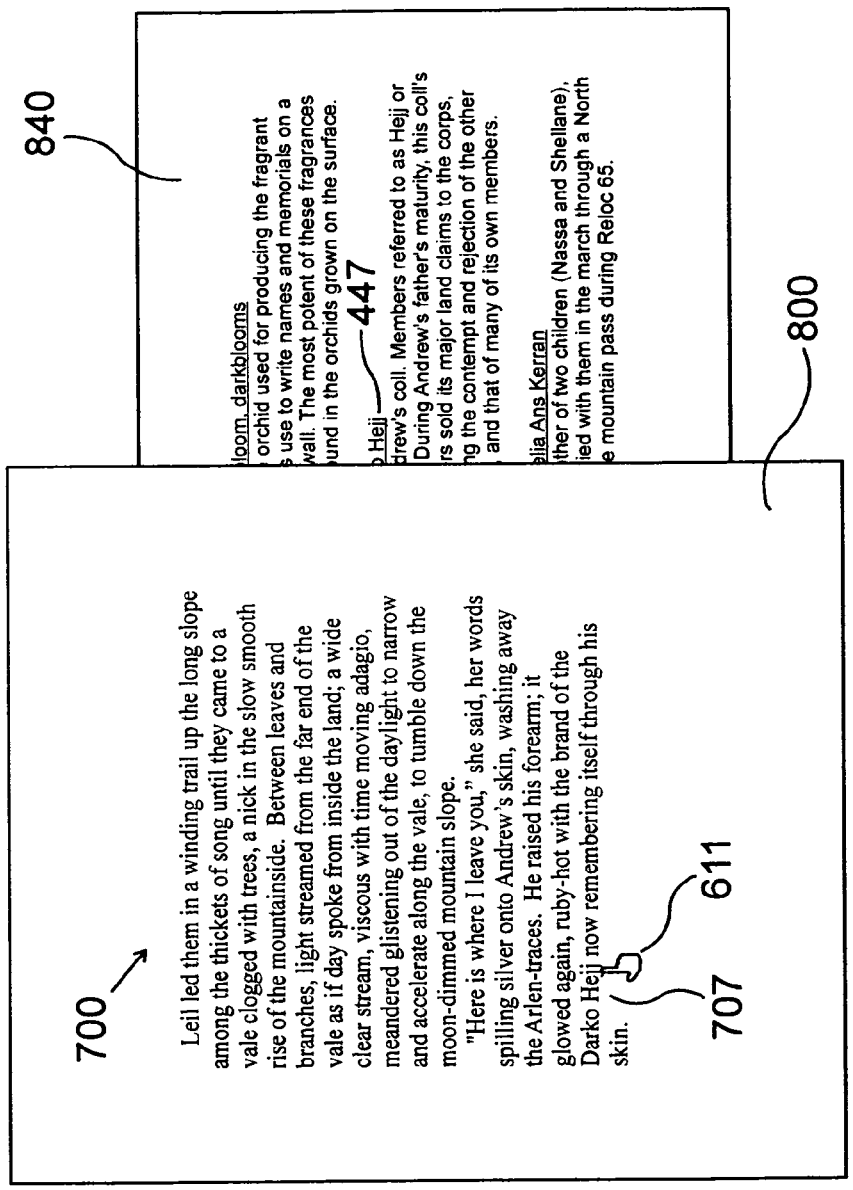
FIG. 28 shows the invention's scene hypertext page presentation in front of a glossary hypertext page for which the reader has referenced a link in the scene hypertext page.
Figure 29:
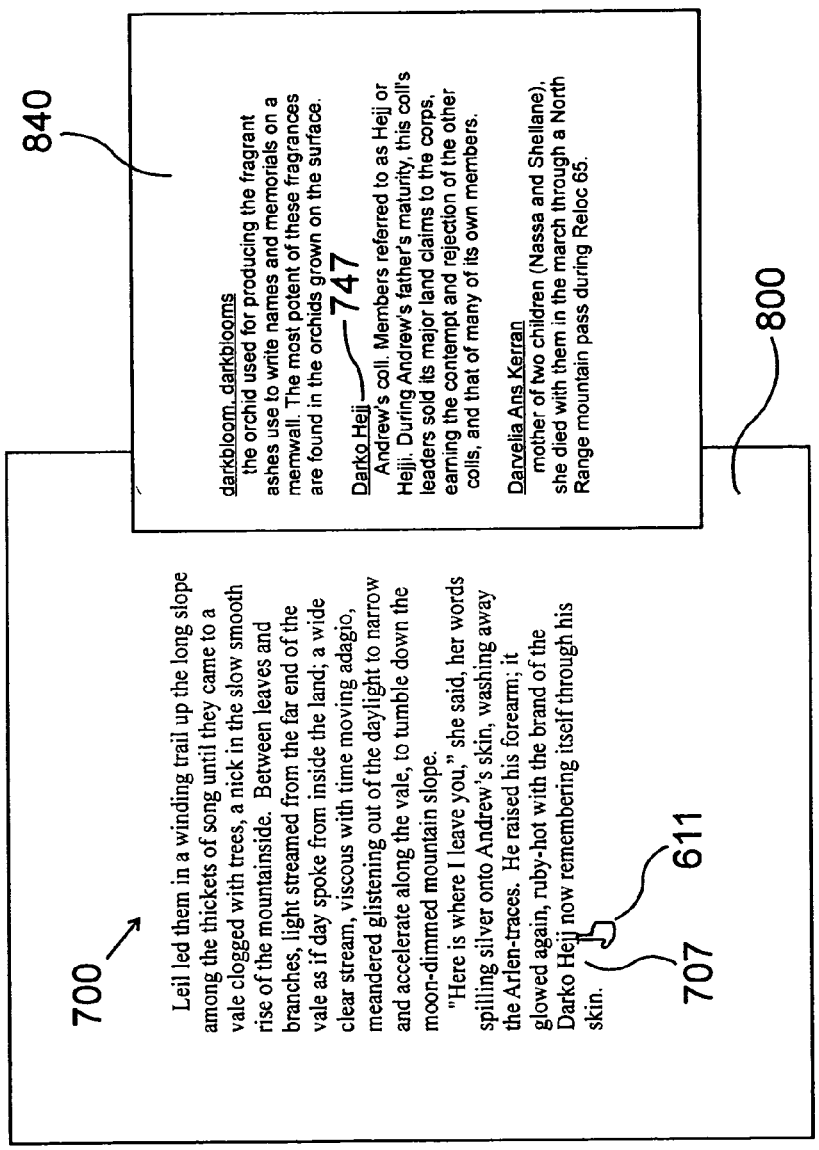
FIG. 29 shows the invention's glossary hypertext page presentation in front of a scene hypertext page for which the reader has referenced a link to the glossary hypertext page and selected the glossary hypertext page for viewing.

A detailed view of the relationship between a story window 500 and a glossary window 540 is shown in FIG. 28 and FIG. 29. In story window 500 a passage 400 in a story is presented to the reader, including among its links a link 407 to the definition 447 of a term used in the story. When the reader selects link 407, definition 447 is presented to the reader in glossary window 540 as shown in FIG. 28. If the reader wishes to read definition 447, the reader selects glossary window 540, which is then displayed in the foreground for reading as shown in FIG. 29.

Step 11. Generate a Collection of Interlinked Browser-Ready Files

Using its software scripts, the invention stores the hypertext scene files, the reference files, the stylesheets, and all other supporting files in a fully-interlinked set of directories or folders, the contents of which constitute the literary macramé of the work. The literary macramé can now be made available for readers using conventional electronic sale and distribution methods.

Programs (Apparati) of the Invention

The invention uses a number of software programs to produce the literary macramé from the set of literary works. The invention's programs do not replace the author's creative choices in producing the macramé, but instead amplify the impact of such creative choices. For instance, if an author uses words or phrases from an invented language in the text of a work, and wishes to gloss those terms, the invention simplifies the process of linking the words in the text to their glossary entries and others.

The invention's programs are in general written in the form of: 1) scripts that define processing for any of several utility programs used for Unix-compatible systems and environments, 2) Visual Basic for Applications (VBA) scripts used for processing information in Microsoft Corporation's Excel spreadsheet application, and 3) WordPerfect PerfectScript macro programs. This arrangement need not be the only way for the invention to work properly; the invention will work equally well in alternate embodiments whether programmed in awk, sed, perl, bash, Python, Java, Visual Basic, C, C++, or any other sufficiently-full-featured software language. The following descriptions of the invention's programs are purely functional, and mention specific implementations only where doing so might be illuminating.

POV (Point-of-View) Spreadsheet

During the construction of the invention's literary macramé, the author or editor must keep track of hundreds or thousands of scenes and their associated information and links. The invention uses its own database of scenes to support the author or editor and to produce processing scripts for compiling the scenes into the finished product. Once the product literary macramé is compiled and completed, it can be made available to readers without the database, but the database is essential for the invention's process.

The POV spreadsheet, containing the invention's database of scenes and their information and links, is central to the invention's structure and operation. The POV spreadsheet contains integrated program functions which generate all information necessary to fabricate a single, integrated literary macramé from a set of scene text files. The POV spreadsheet contains one row of information for each scene in the author's work. The name "POV spreadsheet" is used because each scene is defined as being narrated from a single point of view (POV).

TABLE 1

Scene Attributes in POV Spreadsheet

| Scene Attribute | Scene Attribute Description |
|---|---|
| Chapter | the identifier of the chapter in which the scene appears |
| Section | the identifier of the section or part of the chapter in which the scene appears |
| Scene | the identifier of the scene within the section |
| POV | the identity of the point of view within the scene |
| Scene Source File | the name of the original word processor file containing the scene text |
| Year | the year within the world of the macramé |
| Month | the month within the world of the macramé |
| Day | the day within the world of the macramé |
| Hour | the hour within the world of the macramé |
| Minute | the minute within the world of the macramé |
| COPYRIGHT YEAR | the year in which the scene was copyrighted |
| Scene Title | the title of the scene |
| Scene Locale | the locale of the scene within the world of the macramé |
| Chapter Name | the name of the chapter |
| Scene Stylesheet | the name of the stylesheet used to display the scene |
| Scene Class | the hypertext class of the scene's display, designating the window or location in which the scene is to be presented |
| Keywords 1 | a first set of keywords characterizing the scene |
| Keywords 2 | a second set of keywords characterizing the scene |
| Scene Primary Seq No. | the number of the scene in the primary order of narrative of the macramé |
| Link Class | the class of the previous and next scene links displayed |

Figure 30:
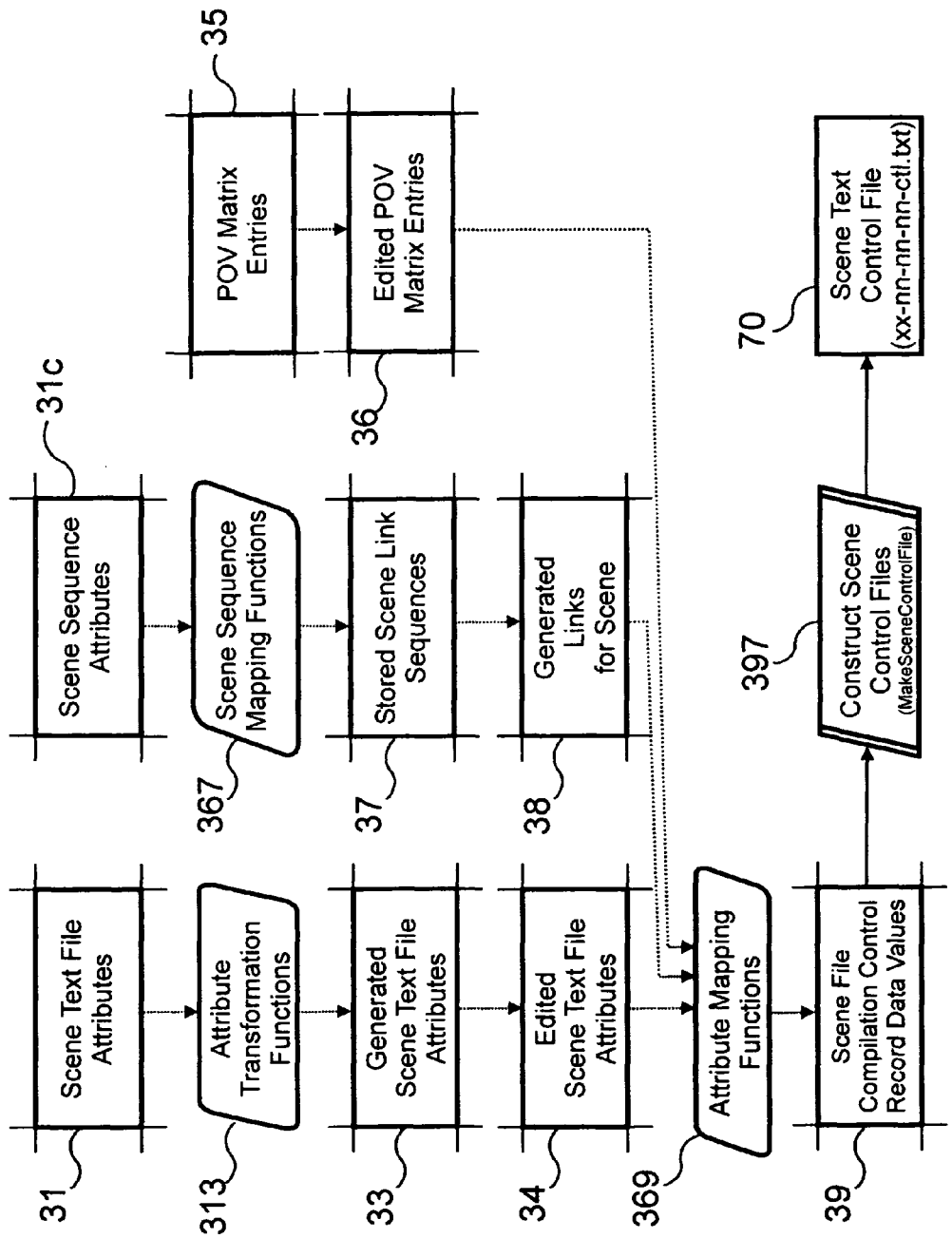
FIG. 30 shows the components of the POV spreadsheet and their roles in the creation of the scene text control file.

See FIG. 30, which shows all information contained in the POV spreadsheet as summarized from FIGS. 16, 17, 18, and 19, but omits all manual interactions with the author. All information in FIG. 30 is contained in the POV spreadsheet with the exception of the scene text control file 70, which is the output from a VBA (Visual Basic for Applications) script component of the POV spreadsheet. Scene text file attributes 31 are listed in Table 1 and exemplified in Table 1a. Generated scene text file attributes 33 are listed in Table 1b, and may be individually replaced or overwritten by an author or editor to become edited scene text file attributes 34.

TABLE 1a

Scene Attributes in POV Spreadsheet: Example

| Scene Attribute | Scene Attribute Description |
|---|---|
| Chapter | 03c |
| Section | 01 |
| Scene | 01 |
| POV | Andrew |
| Scene Source File | Andrew POV\Chapter 03a-01-08 (Andrew POV).wpd |
| Year | 1544 |
| Month | |
| Day | |
| Hour | |
| Minute | |
| COPYRIGHT YEAR | 2005 |
| Scene Title | WORDS FOR SKY |
| Scene Locale | Train westbound |
| Chapter Name | The Land Above |
| Scene Stylesheet | Scene Stylesheet |
| Scene Class | book |
| Keywords 1 | Andrew train west |
| Keywords 2 | |
| Scene Primary Seq No. | 62 |
| Link Class | masked |

Due to the potential complexity of combining different sequencings of numerous scenes in a single macramé of works, maintaining a clear record of the characteristics of each scene requires a tabular or database approach. The invention uses a spreadsheet to tabulate scenes, but in an alternative embodiment a database system is used. In the first embodiment the POV spreadsheet contains a set of attributes for each scene and a POV matrix 35 showing for each scene which character carries the point of view and which other characters or groups of characters appear in that same scene. The contents of the POV matrix are listed in Table 1d. The POV spreadsheet also contains a set of stored scene link sequences 37, generated from scene sequence attributes 31c by scene sequence mapping formulas 367, showing the primary order of narrative of the macramé and one or more secondary orders of narrative for that macramé.

The list of scene text file attributes 31 to be entered in the POV spreadsheet is shown in Table 1. The author, editor, or other user may populate the set of attributes for each scene either by entering them using the invention's forms interface, by using scene text file conversion scripts of the invention, or by entering the information manually in the spreadsheet. An example of Table 1 contents is shown in Table 1a.

Using its attribute transformation formulas 313, the invention generates scene text file attributes 33 from the scene text file attributes 31 entered by the user. The generated elements 33 are scene attributes used to identify files, provide sequence numbers for scenes, and build data elements such as titles and links to be stored in each scene hypertext file. The set of generated data elements is shown below in Table 1b. The presentation of these data elements facilitates author and editor development of the literary macramé for the reader.

TABLE 1b

Scene Attributes Generated from POV Spreadsheet

| Data Element Name | Description | Generating Formula or Function |
|---|---|---|
| Scene Entry Number | The serial number of the scene in the list of scenes in the spreadsheet | =ROWS($5:N), where N is the current row number |
| Common Scene Identifier | an identifier prefix for scene files generated from the chapter, section, and scene numbers entered by the user | =POV&"-"&Chapter&"-"&Section&"-"&Scene |
| Scene Text File Name | the name of the scene text file | genSTSFNm(Scene_Entry_Number) |
| Scene HTML File Name | the name of the scene hypertext (HTML) file | genSHSFNm(Scene_Entry_Number) |
| Scene Processing Control File Name | the name of the file containing all scene processing control parameters | genSCFNm(Scene_Entry_Number) |
| Previous Scene Entry No. | the number within the spreadsheet of the entry containing the previous scene in the primary order of narrative of the macramé | =IF(ISNA(MATCH(Narrative_Scene_Seq_No.−1, Narrative_Scene_Seq_No.,0)),0,MATCH(Narrative_Scene_Seq_No.−1, Narrative_Scene_Seq_No.,0)) |
| Next Scene Entry No. | the number within the spreadsheet of the entry containing the next scene in the primary order of narrative of the macramé | =IF(ISNA(MATCH(Narrative_Scene_Seq_No.+1, Narrative_Scene_Seq_No.,0)),0,MATCH(Narrative_Scene_Seq_No.+1, Narrative_Scene_Seq_No.,0)) |
| Link Class | the class (form of display) of the previous and next scene links displayed | (formula optional —can be manually inserted) |
| Scene Character List | the names of all characters appearing in some form in the scene, with the POV character flagged | CollectCharacterNames() |
| Alternative Narrative Order Link Content (see Tables 2a & 2b) | information concerning a link to an alternative next scene | (see Tables 2a & 2b —repeated sets of elements) |

The generating code for attribute transformation formulas 313 is shown in Tables 1b and 1c for each of the generated elements. The invention uses the generated elements as inputs to program processing; their visibility documents them for the user.

TABLE 1c

Control Records Generated from POV Spreadsheet

| Data Element Name | Description | Generating VBA Function |
|---|---|---|
| Scene File Control Record | a generated image of the contents of a record used for selecting scene files for macramé processing | MakeSFCrec(Scene_Entry_Number) |
| Scene Content Control Record | a generated image of the contents of a record used to convey scene content parameters for macramé processing | MakeSCCrec(Scene_Entry_Number) |
| Scene Source Data Control Record | a generated image of the contents of a record listing the source data elements used to build the macramé | MakeSSDCrec(Scene_Entry_Number) |
| Scene Base Link Control Record | a generated image of the contents of a record used to convey basic scene linkage parameters for macramé processing | MakeSBLCrec(Scene_Entry_Number) |
| Scene Keyword Control Record | a generated image of the contents of a record used to convey scene keywords for macramé processing | MakeSKCrec(Scene_Entry_Number) |
| Scene Main Link Control Record | a generated image of the contents of a record listing the entry numbers for all linked scenes | MakeSMLCrec(Scene_Entry_Number, Scene_Maximum_Added_Automated_Links, Scene_Maximum_Added_Author_Links) |
| Scene Alternate Link Control Record (repeated) | a generated image of the contents of a record used to convey alternative scene linkage parameters for macramé processing | MakeSALCrec(Scene_Entry_Number, Link_Entry_Index) |
| Scene POV Next Scene Link Control Record | a generated image of the contents of a record used to convey next-scene linkage parameters by POV for macramé processing | MakeSPNSLCrec(Scene_Entry_Number) |
| Scene POV Previous Scene | a generated image of the contents of a record used to convey previous-scene linkage | MakeSPPSLCrec(Scene_Entry_Number) |

TABLE 1c-continued

Control Records Generated from POV Spreadsheet

| Data Element Name | Description | Generating VBA Function |
|---|---|---|
| Link Control Record | parameters by POV for macramé processing | |
| Scene Primary Scene Link Control Record | a generated image of the contents of a record used to convey primary next- and previous-scene linkage parameters for macramé processing | MakeSPSLCrec(Scene_Entry_Number) |
| Scene Author Provided Link Control Record | a generated image of the contents of a record used to convey author-provided scene linkage parameters for macramé processing | MakeSAPLCrec(Scene_Entry_Number, Link_Entry_Index) |

In a literary work with multiple points of view and multiple threads of narrative, maintaining a clear picture of the relationships among scenes is a challenge. The invention addresses this challenge by including in the POV spreadsheet a worksheet holding a matrix showing which characters appear in which scenes, and what the point of view is for each scene. The invention also gathers the set of characters in each scene into a list, separated by commas, with the point of view character marked with a '*' character. This list of characters for each scene facilitates the selection of special linkage pathways through the literary macramé. The set of data elements in the matrix worksheet is shown in Table 1d.

TABLE 1d

Scene and POV Matrix

| Data Element | Description | Generating Formula |
|---|---|---|
| Common Scene Identifier (from Links sheet) | (copied from Links sheet to assist user) | =Common_Scene_Identifier |
| Previous Common Scene Identifier (value only) | (copied from Links sheet to assist user) | (value copied from Common Scene Identifier, to highlight any changes) |
| Chapter | (copied from Links sheet to assist user) | =Chapter |
| Section | (copied from Links sheet to assist user) | =Section |
| Scene | (copied from Links sheet to assist user) | =Scene |
| POV | (copied from Links sheet to assist user) | =POV |
| Scene Entry Number (serial) | value repeated manually from the main worksheet to flag any changes to the scene sequence not propagated to the matrix | |
| Character Name (heading; repeated) | name of character or point of view used in scene | |
| Characters in Scene | list of names of all characters and POV participating or present in scene | =CollectCharNames(Scene Entry Number) (a custom VBA function - see text) |

The POV spreadsheet also provides some data elements for each scene which the user may reserve for the storage of historical or ancillary information concerning scenes, linkages, special annotations, and so on. There are in the basic embodiment six such data elements for each scene. Some examples of their possible use for historical annotation are shown in Table 1e.

TABLE 1e

Supporting Scene Attributes in POV Spreadsheet

| Original Part No. | the part number of the original work |
|---|---|
| Original Part Name | the part title of the original work |
| Original Scene Title | the scene's title in the original work |

TABLE 1e-continued

Supporting Scene Attributes in POV Spreadsheet

| Original Chapter Number | the chapter number in the original work |
|---|---|
| Original Scene Seq No. | the number of the scene in the original work |
| First Original Subordinate Scene Seq No. | the number of the scene in a first original subordinate work |
| Second Original Subordinate Scene Seq No. | the number of the scene in a second original subordinate work |

The POV spreadsheet also computes for each scene a set of file names of scene hypertext files, each of which follows the scene's own hypertext file link in an alternate order of narrative. Each named file, when considered as a forward link in a continuing chain of narrative, defines an alternative order of reading all or a part of the macramé. Examples of ways in which such alternative orders of narrative may be defined include:

1. In strict chronological order, based on the scene dates and times, so that the narrative may be read easily as if moving forward through the story's timeline scene by scene.
2. In reverse chronological order, based on the scene dates and times, so that the narrative may be read easily as if moving backward through the story's timeline scene by scene. (Such a narrative technique is used in the script for the film "Memento".)
3. In chronological order for a single character, based either on the identity of the point-of-view character or on the presence of the character in a given scene, and on the scene dates and times, restricting the narrative to scenes in the point of view (or in the presence) of that character.
4. In order by character but restricted to scenes in a given locale, so that the scenes presented focus on a given locale of the story.
5. In an order contrasting with another order of narrative, so that a reader may see multiple views of the same scene from different vantage points.
6. In an order tailored by the author to produce specific literary effects such as suspense, surprise, resonance, revelation, and others.

The generating programs in the POV spreadsheet supply formatted link information for use in forming the HTML code and text for the links to be displayed to the reader. In a first linking embodiment, each alternative narrative order link entry in the POV spreadsheet for a scene constitutes a "link set", and takes one of the following forms:

POV Character Form—a sequence chosen to follow a character who is a point-of-view character in the scene being linked. In the POV character form the invention furnishes a link to the next scene for the POV character, and a link to the previous scene for the same character. Table 2a shows the invention's calculations for this second form.

TABLE 2a

Alternative Narrative Order Link Content (POV Character)

| Data Element | Description | Generating Formula or Function |
| --- | --- | --- |
| Linked Scene Entry Number | the number of the linked scene (next or previous) in the alternate order of narrative of the macramé | POVNextSceneN(Scene_Entry_Number POV_Char_Number) or POVPrevSceneN(Scene_Entry_Number, POV_Char_Number) (link formulas here can be developed and inserted by authors or editors) |
| Next Alternate Scene HTML File Name, Scene Link Title, and Scene Link Class | the name of the scene hypertext (HTML) file containing a scene in the alternate order of narrative of the macramé, the title of the scene which is the target of the link, and the stylesheet class of the link. | MakeSPNSLCrec(Scene_Entry_Number) for link to next scene and MakeSPPSLCrec(Scene_Entry_Number) for link to previous scene |

Prominent Character Form—a sequence chosen to follow a character appearing as a point-of-view character in the work. The character must be present in the scene being linked, but is not necessarily the point of view in that scene. Table 2b shows the calculations for this first form. The invention provides for multiple sequences of this form.

TABLE 2b

Alternative Narrative Order Link Content (Prominent Character)

| Data Element | Description | Generating Formula or Function |
| --- | --- | --- |
| Linked Scene Entry Number | the number of the linked scene in the alternate order of narrative of the macramé | LinkNextSceneN(Scene_Entry_Number NextSceneLinkChN(Scene_Entry_Number, Link_Entry_Index)) (link formulas here can be developed and inserted by authors or editors) |
| Next Alternate Scene HTML File Name, Scene Link Title, and Scene Link Class | the name of the scene hypertext (HTML) file containing a scene in the alternate order of narrative of the macramé, the title of the scene which is the target of the link, and the stylesheet class of the link. | MakeSALCrec(Scene_Entry_Number, Link_Entry_Index) |

Author-Developed Form—a sequence developed by the author either computationally or manually, as determined by the contents of the POV spreadsheet's Link_Entry_Number in the Link Set column for the sequence. Any generating formulas in the author-developed form are determined by the author. The invention provides for multiple sequences of this form. See FIG. 19 for a diagram of the movements and transformations of data in the generation of scene link sequences.

The output is built as a multi-line HTML comment, even though that may cause some browser problems.

MakeMasterSceneTable: constructs a single list containing links to every single scene in the tapestry, identified by name only. This is intended to be used to build a "map" page to let browsing readers choose entries to the narratives on the basis of the titles and their associated map zones.

TABLE 2c

Alternative Narrative Order Link Content (Author-Developed)

| Data Element | Description | Generating Formula or Function |
| --- | --- | --- |
| Linked Scene Entry Number | the number of the linked scene (next or previous) in the alternate order of narrative of the macramé | Worksheets("Links & X-Ref").Range("Link_Entry_TABLE").Cells(Scene_Entry_Number, Author_Link_Entry_Index).Value<br>Worksheets("Links & X-Ref").Range("Link_Entry_Caption_Table").Cells(Scene_Entry_Number, Author_Link_Entry_Index).Value<br>Worksheets("Links & X-Ref").Range("Link_Entry_Style_Table").Cells(Scene_Entry_Number, Author_Link_Entry_Index).Value |
| Next Alternate Scene HTML File Name, Scene Link Title, and Scene Link Class | the name of the scene hypertext (HTML) file containing a scene in the alternate order of narrative of the macramé, the title of the scene which is the target of the link, and the stylesheet class of the link. | MakeSAPLCrec(Scene_Entry_Number, Author_Link_Entry_Index) |

The full list of a particular alternative link order in a link set plus its link content comprises a "link order control file" which the invention incorporates into the Scene Processing Control File along with all other alternative link order control files. The effect for the reader is that at the end of every scene's display, a set of links reflecting every one of the link orders involving that scene is also displayed. The reader may then choose either to continue with the primary narrative order, which is clearly identified as such, or to continue reading with an alternative narrative order as identified in the display.

POV Spreadsheet Software Components of the Invention

The invention incorporates software elements that operate as functions within the POV Spreadsheet to build scene control records from data elements in the spreadsheet. These software elements perform tasks that would be difficult or onerous using only the spreadsheet's formulas and functions as provided by its vendor.

MakeLMCompilationFile: is button-driven, and generates the control files used in scripts to produce the final scene hypertext files.

MakeSceneCtlFile: takes a scene entry number as input and generates a series of file records each containing a set of names and values for data elements characterizing that scene. The source of the scene data is the spreadsheet. The output is used in a set of scripts that transform the scene text files into scene hypertext files.

MakeAllSceneDataFiles: is button-driven, and generates the scene data files for placement in the headers of the scene text files.

MakeSceneDataFile: takes a scene entry number as input and generates a series of file records each containing the name and value for a data element characterizing that scene. The source of the scene data is the spreadsheet.

BuildDTD: is button-driven, and generates an XML DTD for the data elements used in building the final scene hypertext files.

BuildChList: is button-driven, and generates a simple listing of all the characters of the work.

BuildChScRpt: is button-driven, and generates a report listing each character in the work with all the scenes in which that character appears. A character appearing as a point-of-view (POV) for a scene has the name marked with an asterisk. Scenes for each character are listed in entry order, not in story order.

BuildScChRpt: is button-driven, and generates a report listing each scene in the work with all the characters appearing in that scene. A character appearing as a point-of-view (POV) for a scene has the name marked with an asterisk. Scenes are listed in entry order, not in story order.

BuildPriScChRpt: is button-driven, and generates a report listing each scene in the work with all the characters appearing in that scene. A character appearing as a point-of-view (POV) for a scene has the name marked with an asterisk. Scenes are listed in primary story order, with secondary orders following. There are currently four significant narrative lines: main story (FirstScn=1), the Pyro thread (FirstScn=1001), the Lejina thread (FirstScn=2001), and the Derizan thread (FirstScn=3001). Other lines now in development are not listed in the report, although their scenes may appear via links from others that are included here.

rptSeq: traces the narrative thread from scene to next scene, using a given starting scene number and printing out the series of scenes following that given.

BuildScLnkRpt: is button-driven, and generates a report of any links not properly set up, particularly lins that point back to the file in which they exist.

chkLnkEntN: validates a link entry number

GetLinkedScns: requests a scene entry number and opens the scene source files for the scene and its successor.

DisplaySceneAndNextScene: uses the input scene entry number to open two new windows for the scene source file's word processor, one displaying the specified scene source file, the other displaying the next scene's source file.

CollectCharNames: uses the input scene number to build a list of characters appearing in that scene, marking the POV character name with a flag value. (Used in Excel Matrix spreadsheet)

FindPOVFlag: uses the input character number to search all scenes in the character/scene matrix for that character, returning the name of the character if found as a POV in any scene.

IsLinkPOV: uses the input character name to locate the number of scenes in which that character is POV, compare that number to a threshold value, and return True if the number found equals or exceeds the threshold value.

CountPOVFlags: accepts a character designation and returns the number of scenes in which the designated character is a POV character. (Used in Excel Matrix spreadsheet)

ChNtoChName: uses an input character number to return the corresponding character name.

CountPresenceFlags: accepts a character designation and returns the number of scenes in which the designated character is present either as a POV character or as another character. (Used in Excel Matrix spreadsheet)

LinkNextSceneN: uses an input starting scene entry number and a character number to return the scene entry number for the next scene in which that character appears.

POVNextSceneN: uses an input starting scene entry number and a character number to return the scene entry number of the next scene in which that character is the POV character.

POVPrevSceneN: uses an input starting scene entry number and a character number to return the scene entry number of the previous scene in which that character is the POV character.

NextSceneLinkChN: uses the input scene number and a rank number to determine which character appearing in the given scene has the specified rank. Rank is determined by four factors: 1) the alphabetical order of characters; 2) whether the character appears in the scene; 3) whether the character's number of POV scenes, as counted by CountPOVFlags, equals or exceeds a set minimum value; 4) whether the character's number of scene appearances, as counted by CountPresenceFlags, equals or exceeds a separate minimum value. The number of the character having the requested rank is returned, or else zero is returned if no such character is found.

MakeSFCrec: constructs a Scene File Control Record for a given scene number.

MakeSCCRec: constructs a Scene Content Control Record for a given scene number.

MakeSSDCRec: constructs a Scene Source Data Control Record for a given scene number.

MakeSBLCRec: constructs a Scene Base Link Control Record for a given scene number.

MakeSKCRec: constructs a Scene Keyword Control Record for a given scene number.

MakeSALCRec: constructs a Scene Alternate Link Control Record for a given scene number.

MakeSPNSLCRec: constructs a Scene POV Next Scene Link Control Record for a given scene number.

MakeSPPSLCRec: constructs a Scene POV Previous Scene Link Control Record for a given scene number.

MakeSPSLCRec: constructs a Scene Primary Scene Link Control Record for a given scene number.

MakeSAPLCRec: constructs a Scene Author Provided Link Control Record for a given scene number.

MakeSMLCRec: constructs a Scene Master Link Control Record for a given scene number.

BDERef: accepts a text string naming a data element and a scene entry number, and returns a string containing the data element name delimited by "<" and ">", followed by the data element value for the designated scene, followed by the data element name delimited by "</" and ">". Used in forming scene control records for script processing. (XML form)

BLDERef: accepts a text string naming a data element, a linked-scene entry number, and a link index number, and returns a string containing the data element name delimited by "<" and ">", followed by the data element value for the linked scene, followed by the data element name delimited by "</" and ">". Used in forming scene control records for script processing. (XML form)

BDRef: takes a data element name and a data element value as input, and returns a character string containing the data element name in delimiters followed by the value for that data element, followed by the data element name again, in closing delimiters (XML form).

MakeSDFRecs: simply replaces the usual field separator character in an input string with a CR (carriage return), enabling the use of the same field-building code for both scene control files and scene data files.

GetCRefPair: takes as input a data record in string form, an index specifying which data element to extract from the data record, and a separator string marking the end of the data element name-value pair, and returns the data element name-value pair with delimiters for the data element name.

GetDVal: takes as input a data element name-value pair having delimiters for the data element name, and returns the data element value alone.

GetDName: takes as input a data element name-value pair having delimiters for the data element name, and returns the data element name alone.

genSDFNm: takes a scene entry number as input and produces a full path and name for that scene's data file.

genSDFSNm: takes a scene entry number as input and produces a file name for that scene's data file, without the path.

genSHFNm: takes a scene entry number as input and produces a full path and name for that scene's hypertext file.

genSHFSNm: takes a scene entry number as input and produces a file name for that scene's hypertext file, without the path.

genSTFNm: takes a scene entry number as input and produces a full path and name for that scene's text file.

genSTFSNm: takes a scene entry number as input and produces a file name for that scene's text file, without the path.

genSWFNm: takes a scene entry number as input and produces a full path and name for that scene's source word processor file.

genSWFSNm: takes a scene entry number as input and produces a file name for that scene's source word processor file, without the path.

genSCFNm: takes a scene entry number as input and produces a full path and name for that scene's control file.

genSCFSNm: takes a scene entry number as input and produces a file name for that scene's control file, without the path.

Glossary Database Spreadsheet (GlDB)

This spreadsheet contains three tables: the Glossary table, the Treatments table, and the Glossary Split Files table. The Glossary table contains the anchor term used to link usages to the Glossary, any term forms used in texts, any term usage notations, and the term definition for each term defined for the work—in effect, the entire Glossary itself. Table X1 details the contents of the Glossary table in the spreadsheet.

TABLE X1

Glossary Attributes in GlDB Spreadsheet

| Glossary Attribute | Glossary Attribute Description |
|---|---|
| Anchor Term | the identifier of the term being defined, preferably the most common form of the term itself, to be used as a hypertext anchor in the Glossary. |
| Term Forms Used | a generated list of forms of the term used in the texts of the work. |
| Term Usage Notations | any grammatical, etymological, or other notes on the uses of the term |
| Term Definition | the definition of the term |

The Treatments table lists each term form used, along with its associated anchor term, its displayed form, the hypertext file in which its anchor term resides, the anchor term file type, the display window used for the hypertext file, and the style specification for the link to the hypertext file. Table X2 details the contents of the Glossary table in the spreadsheet.

TABLE X2

Treatment Attributes in GlDB Spreadsheet

| Treatment Attribute | Treatment Attribute Description |
|---|---|
| Found Term Form | a form of a term used in the literary work. |
| Anchor Term | the identifier of the term being defined, used as a hypertext anchor in the Glossary. |
| Displayed Term Form | the displayed form of the term found, used when the term's link is installed in the work. |
| Anchor Term File Name | the identifier of the file in which the anchor term is placed. |
| Anchor Term File Type | any grammatical, etymological, or other notes on the uses of the term |
| Anchor File Display Window | an identifier of the display window to be used to show the file containing the anchor term. |
| Link Stylesheet Name | the name of the stylesheet defining the appearance and behavior of the displayed link. |
| Earliest Reference Date | a date value indicating the earliest point in the timeline defined in the narrative for which the glossary term link may be applied |
| Latest Reference Date | a date value indicating the latest point in the timeline defined in the narrative for which the glossary term link may be applied |
| POV Dependency | (reserved for future use) |
| Split Anchor File Name | The identifier of the file in which the anchor term is placed in the split-Glossary embodiment of the invention. |

The Glossary Split Files table lists the names of the files into which the Glossary is to be split in its split-glossary-file embodiment. With each name is listed the associated initial letters or symbols of terms to have their glossary anchors in the associated file.

POV Spreadsheet Software Components of the Invention

The Glossary Database spreadsheet also has a set of VBA functions and subroutines to produce the following outputs: the AutoGlDefs.txt from the Glossary table (see Table 3a below), and the AutoGlP.txt, AutoGlPSpl.txt, AutoGlPCR.txt, and AutoGlPSplCR files from the Treatments tables (see Tables 3b below). Each file is in text form, with the same records and fields as in the corresponding table. The spreadsheet's functions and subroutines are:

genGlFiles—the main routine, which calls all the others.

incUsages—combines all usage entries for each Glossary term into a list for inclusion in the Glossary itself. If there is no usage entry for a Glossary term, the anchor term is inserted in the genGlP—builds the AutoGLP.txt file from the Treatments table.

genGlPCR—builds the AutoGLPCR.txt file from the Treatments table (for the layered-reference embodiment).

genGlPSpl—builds the AutoGLPSpl.txt file from the Treatments table (for the split-glossary-file embodiment).

genGlPSplCR—builds the AutoGLPSplCR.txt file from the Treatments table (for the split-glossary-file layered-reference embodiment).

genGlDefs—builds the AutoGlDefs.txt file from the Glossary table.

BldSGlHTM.txt—builds the BuildSGlossHTM.txt script file using the Split Files table (for the layered-reference embodiment).

sortGTTables—reorders both the Glossary and the Treatments tables for comparison and output sortTTable—reorders the Treatments table for output to scripting file GlP.txt. Non-glossary entries must sort ahead of glossary entries if found terms match leading characters.

isFoundTerm—tries to find a term in the Treatments table's Found Term Forms, returning True if found, False if not.

bldMissedRec—formats a record for a missed treatment to be added if desired.

prependForm—inserts a term form at the head of a comma-separated list of term forms in the Glossary for a given term.

protHyphens and unProtHyphens—work around a sorting problem that causes spurious insertion of synonyms for some hyphenated terms.

The incUsages routine writes out two added files during its processing: the Missed Uses file, with any glossary entries having no treatments listed for them, and the Unmatched Uses file, containing the treatment entries having no corresponding glossary entry matching on the anchor term. Both files can be used for correction of the glossary and the treatments if needed.

In the invention's layered-reference embodiment, to apply a time dependency to scene references for a specific term, the author or editor adds an entry to the glossary database which contain an earliest date and/or a latest date for which the term's entry is to be used. When the invention converts the scene from a scene text file to a scene hypertext file, and finds a term in the scene matching a date-marked term in the database, it tests the scene date against the time interval defined in the entry in the database. If the scene date falls within the range specified for a term in the database, the link for that term is taken from the date-marked entry. If the scene date does not fall within the range specified, the link for that term, if any, is taken from any matching non-date-marked entry in the database that may be present.

This method shields a reader from seeing glossary entries which may disclose story information prematurely, by redirecting the reader to a reference entry that restricts disclosure of the story information. When the reader reads a later scene, however, the invention uses the later scene date to direct the reader to the appropriate glossary entry which contains the information by that point known to the reader.

In the layered-reference embodiment, the invention's GlP.txt file and the glossary database add temporal data elements (and possibly other conditionals, such as POV) to the Treatments table. Specifically, the Treatments table in the glossary database in this embodiment contains the following elements:

1. Found Term Form

2. Linked Anchor Term

3. Displayed Term

4. Anchor File

5. Anchor File Type

6. Display Window

7. Link Stylesheet Name

8. Earliest Reference Date

9. Latest Reference Date

10. POV Dependency showing three added fields for each table entry: Earliest Reference Date, Latest Reference Date, and POV Dependency (this last field reserved for future use). The default case is to have all three fields empty, which permits the current type of processing to work. The presence of a reference date, either earliest or latest or both, triggers additional processing at the time when a link to the reference entry (reference or glossary) is being installed in a linking scene file. The additional processing is the use of the scene date, as specified in the second line of the scene text file, to compare with the available reference dates. If the scene date falls outside the range (before earliest date or after latest date), the match to the reference entry fails. If the scene date falls inside the range (on or after earliest date and on or before latest date), the match to the reference entry succeeds, and the link to the reference entry is installed in the scene text file.

Glossary and Glossary Reference Processing File Generation

Authors and editors construct glossaries, notes, and appendices in many different forms. The invention takes as its first input a set of glossary term entries in a form that will permit listing of each entry as one line containing all required information for the entry in a set of defined fields. The invention loads the glossary term entries into the Glossary table. The invention accepts as its second input a set of term usages each corresponding to a Glossary term entry. The invention loads the term usage entries into the Treatments table. The loading process uses spreadsheet text file loading processes well-known in the art.

The invention uses this set of fields for each Glossary entry as a reference processing file for the insertion of hypertext links in each text scene file. The input Glossary entries may take the form of entries in a single hypertext file, each one defined using HTML code such as the conventional usages for constructing a dictionary entry:

<dl><dt><a name="[ANAME]"></a>[NAME]</dt><dd>[DEFINITION]</dd></dl>

The invention's reference processing file generation scripts convert input file entries in a format such as the above to the forms defined in Tables 3a, 3b, and 3c.

TABLE 3a

Glossary Definition File Content (AutoGlDefs.txt)

| Data Item | Data Item Description |
| --- | --- |
| Anchor Glossary Term | the word or phrase of interest [ANAME] |
| Form of Term Used | a specific form or usage of the glossary term [NAME] |
| Usage Notes | annotations such as part of speech, etymology, as found in a dictionary |
| Definition | definition of the glossary term. [DEFINITION] |

TABLE 3b

Glossary Reference Processing File Content (AutoGlP.txt and AutoGlPSpl.txt)

| Data Item | Data Item Description |
| --- | --- |
| Glossary Term | the word or phrase of interest, as defined in the Glossary Definition File [NAME] |
| File Reference | the file (glossary, encyclopedia, sidebar, footnote, or other file) in which the Glossary Term is defined |
| Term Anchor Reference | the exact location in the File Reference at which the Glossary Term is defined [ANAME] |
| Displayed Term | the displayed text or image for the Glossary Term in any references made to it in text [NAME] |
| Target Window | the window in which the definition will appear when the Glossary Term is selected in the text. |
| Reference Class | the style of presentation of the definition of the Glossary Term |

The author or editor can then augment the Glossary Definition File with usage notes, and the Glossary Reference Processing File with: 1) added entries for different forms of the same term or added reference files to be linked from specific uses of their names in text, and 2) changes to entries to alter their appearance or placement in displays for the reader using a browser.

The invention's Glossary Database Spreadsheet contains the entire Glossary and all of the information in Tables 3a, 3b, and 3c. The Glossary Database Spreadsheet's VBA functions and programs prepare the AutoGlDefs.txt, AutoGlP.txt, and AutoGlPCR.txt files as first steps in: 1) generating the entire Glossary in XHTML format, along with the Glossary Reference Processing File; 2) generating the Glossary Reference Processing File for later use.

TABLE 3c

Glossary Time-Dependent Reference Processing File Content (AutoGlPCR.txt and AutoGlPSplCR.txt)

| Data Item | Data Item Description |
| --- | --- |
| Glossary Term | the word or phrase of interest, as defined in the Glossary Definition File [NAME] |
| File Reference | the file (glossary, encyclopedia, sidebar, footnote, or other file) in which the Glossary Term is defined |
| Term Anchor Reference | the exact location in the File Reference at which the Glossary Term is defined [ANAME] |
| Displayed Term | the displayed text or image for the Glossary Term in any references made to it in text [NAME] |
| Target Window | the window in which the definition will appear when the Glossary Term is selected in the text. |
| Reference Class | the style of presentation of the definition of the Glossary Term |
| Earliest Reference Date | a date value indicating the earliest point in the timeline defined in the narrative for which the glossary term link may be applied |
| Latest Reference Date | a date value indicating the latest point in the timeline defined in the narrative for which the glossary term link may be applied |

In its single-glossary-file embodiment, the invention uses the AutoGlDefs.txt and AutoGlP.txt files as inputs to construct a first command script (Gl.sed) for finding glossed terms in a text file and replacing each such term with a complete hypertext reference. In its layered-reference embodiment using the single glossary file, the invention uses the AutoGlPCR.txt file as input for finding time-dependent glossed terms in a text file and replacing each such term with a complete hypertext reference.

In its single-glossary-file embodiment, the invention uses the AutoGlDefs.txt and AutoGlP.txt files as inputs to construct a second command script (GlGl.sed) for finding glossed terms in the Glossary itself and replacing each such term with a complete hypertext reference, and to construct a third command script (RefGl.sed) for finding glossed terms in other reference files and replacing each such term with a complete hypertext reference. Each complete hypertext reference take the form:

```
<a href="[FILE-REFERENCE]#[TERM-ANCHOR-REFERENCE]"
target="[TARGET-WINDOW]" class="[REFERENCE-
CLASS]">[DISPLAYED-TERM]</a>
``` where the entries shown in square brackets are defined as in the preceding tables.

In its split-glossary-file embodiment, the invention uses the AutoGlDefs.txt and AutoGlPSpl.txt as inputs to construct a first command script (Gl.sed) as for the single-glossary-file embodiment. In its layered-reference embodiment using the split glossary files, the invention uses the AutoGlPSplCR.txt file as input for finding time-dependent glossed terms in a text file and replacing each such term with a complete hypertext reference.

The user applies the first command script (Gl.sed) of the invention to construct a first subordinate command script listing all permutations of all glossary references and the instructions for converting said references to hypertext references as shown above. The invention's first subordinate command script may then be used in all subsequent steps for any collection of scene text files to be compiled into a literary macramé.

TABLE 4

Augmented Scene Text File Content

| Data Item | Data Item Description |
| --- | --- |
| Scene Title | the title of the scene |
| Location Information | the date, time, place, and other information identifying the scene's locale |
| Section* | the number of the section or part of the chapter in which the scene appears |
| Scene* | the number of the scene within the section |
| POV* | the identity of the point of view |
| Scene Source File* | the original word processor file containing the scene text |
| Year* | the year within the world of the macramé |
| Month* | the month within the world of the macramé |
| Day* | the day within the world of the macramé |
| Hour* | the hour within the world of the macramé |
| Minute* | the minute within the world of the macramé |
| Copyright Year* | the year in which the scene was copyrighted |
| Chapter Name* | the name of the chapter |
| Scene Stylesheet* | the name of the stylesheet used to display the scene |
| Scene Class* | the hypertext class of the scene's display |
| Keywords 1* | a first set of keywords characterizing the scene |
| Keywords 2* | a second set of keywords characterizing the scene |
| Scene Character List* | identifiers for all characters present in scene, separated by commas |
| Scene Text Lines | one line for each paragraph of text in the scene |

The user applies the second command script (GlGl.sed) of the invention to construct a second subordinate command script listing all permutations of all glossary references and the instructions for converting said references in the Glossary itself to hypertext references as shown above.

The user applies the third command script (RefGl.sed) of the invention to construct a third subordinate command script listing all permutations of all glossary references and the instructions for converting said references in reference files to hypertext references as shown above.

Additional command scripts may be provided in order to support references to other documents as needed.

Reference Hypertext File Preparation

Each reference hypertext file supporting the Glossary and the literary macramé as a whole originates as a standalone word-processing document similar to a scene source file. One key distinction for reference hypertext files is the possible presence of specially-formatted components such as lists, tables, figures, diagrams, and custom links to other documents. Scene source files in general do not contain such features. The invention provides for support and maintenance of the reference hypertext pages, performing the following tasks:

- Accepts a reference document in word-processor form having XHTML in it;
- Sets aside the reference document's XHTML headers and footers;
- Keeps the reference document's text-embedded HTML intact except for Glossary links, which it removes, leaving only the displayed term;
- Reinstalls all Glossary links in the reference document's text, incorporating all changes affecting Glossary links;
- Restores the reference document's XHTML headers and footers;
- Republishes the reference document as a reference hypertext file (reference Web page);
- Preserves any and all author-introduced XHTML through all automated processes, without needing manual efforts for each such introduced component.

The invention's UpdateRefHTM script performs the tasks listed above, rebuilding a reference Web page with updated Glossary links while preserving all XHTML features in the original reference Web page. The UpdateRefHTM script generates and applies commands needed to install links to Glossary entries in the reference texts, using the AutoGlP.txt file constructed from the GlDB.xls spreadsheet as described earlier. The UpdateRefHTM script is described in detail below, in the section detailing the scripts of the invention.

Scene Text File Preparation

The author begins use of the invention by breaking down the source literary work into a set of scene text files containing the text and other components required for each scene in the work. The author decides where the beginning and end of each scene occurs in the narrative, selects the scene's text, and makes any textual changes needed to support smooth transitions into and out of the scene for readers. For example, the author may decide to add a name identifying a point-of-view character at the start of the scene, or modify the narrative near the end of the scene to create ambiguity for the reader to be resolved in later scenes in different sequences of subsequent scenes.

During the creation of each scene text file, the author adds to each scene text file a set of separate data elements characterizing the scene, as listed in Table 4. The invention uses certain of these data elements later in its construction of the POV Spreadsheet via its initialization script, and propagates their values forward for storage in the final scene hypertext files.

In a simplified embodiment, the first two lines of the scene text file comprise a header for the file. The first line of each scene text file contains only the scene title. The second line of each scene text file contains only a block of information used to situate the scene in space and time.

In an enhanced embodiment of the invention, each scene text file contains additional lines of header information preceding the text (the added information lines are marked with * in Table 4). Once the author or editor has incorporated the header information in its scene file, the header information is used to construct the contents of the POV spreadsheet. In further-enhanced embodiments of the invention, scene header information are encoded in a markup-language form such as that of XML (Extensible Markup Language) or, more generally, of SGML (Standard Generalized Markup Language).

POV Spreadsheet Preparation

Using the scene text files and their data elements, the author builds the POV Spreadsheet, which contains one line for each scene in each of two worksheets. In an enhanced embodiment of the invention, the scene text files constitute a first input to an initialization script of the POV Spreadsheet. The initialization script uses an empty POV spreadsheet template as a second input, adds one row to the spreadsheet in each of two worksheets to contain scene data elements, and adds one column in the second of the two worksheets to contain character and scene correlation data. Each spreadsheet row for a scene in the first worksheet contains the invention's formulas, listed in Tables 1b, 1c, and 2, for generated data elements related to each scene. Each spreadsheet row for a scene in the second worksheet contains the invention's formulas, listed in Table 1d, for generated data elements related to each scene.

The next step is defining multiple orders of narrative. Each order of narrative comprises a sequence of scenes to be read by the reader in a given reading of the work. Using the POV spreadsheet, the author may enter information to define as many alternate orders of narrative as he or she wants to include in the macramé. Usually the source literary work already has a canonical order of narrative as originally prepared by the author. The invention provides convenient means of selecting and incorporating both the canonical and alternate orders of narrative to be included in the macramé.

The invention's formulas in the POV spreadsheet support the definition and use of alternative orders of narrative. The invention generates automatically several sets of alternative links, each of which traces a narrative thread for a character in the set of characters assuming a point of view in the work.

Note that no scene link titles are given for the previous and next scene links in the primary narrative sequence—these links are displayed only as 'previous' and 'next'. This practice simplifies selection for the reader.

To support reader focus on the primary narrative sequence during sequential reading, the alternate scene link titles may be reduced in contrast, presented in a typeface that is decorative, obscure, or differently-sized, presented in a font from an alternative language, or otherwise made more attractive only for readers who wish to browse or read by alternative paths in the narratives. The invention facilitates such changes in presentation by allowing the specification of different stylesheet classes for each link.

Scene Processing Control File Preparation

The generation and linking of the scene hypertext files requires the invention's use of a series of file preparation scripts which build the linked files from the scene text files. To control its scripts properly, each scene text file has associated with it a scene processing control file which carries certain scene characteristics extracted from the spreadsheet. The scene processing control file originates in the POV spreadsheet as generated processing control records formatted by the spreadsheet from author-supplied data. The record types are as shown in Table 5a. The data items of each record type in the scene processing control file are shown in Table 5b.

TABLE 5a

Scene Processing Control File Record Types

| Record Identifier | Record Description |
|---|---|
| [FILES] | the record listing file characteristics for the scene |
| [SCENE] | the record listing scene characteristics for the scene |
| [SOURCE] | the record listing the source data elements for the scene |
| [BASELINKS] | the record listing information for the essential links for the scene |
| [KEYWORDS] | the record listing the keywords characterizing the scene |
| [LINKMAIN] | the record listing the full set of link entry numbers for the scene |
| [LINKS] | the record listing characteristics for additional links for the scene |

The [LINKS] record may be repeated for as many secondary narrative sequences as the author decides to link to (or from) the scene hypertext file for the given scene processing control file.

Each record in the scene processing control file contains data elements in a form that facilitates the independent retrieval and processing of each data element. Following the record identifier as shown in Table 5a is a first field separator. After the first field separator a first data element name appears, enclosed in "<" and ">", followed by a first data element value corresponding to the first data element name, again followed by a field separator, and further pairs of data element names and values, separated in the same way, with a final field separator at the end. An example, in which line breaks are included only for readability:

[LINKS] |
<Linked_Scene_HTML_File_Name_1>Ferdinand-00-00-01.html|
<Linked_Scene_Title_1>FERDINAND DRINKS: Ferdinand|
<Link_Class_1>masked|

Scene compilation is done using the scene processing control file as the sole source of information for the scene to be

TABLE 5b

Scene Processing Control File Content

| Record Identifier | Data Element | Data Element Description |
|---|---|---|
| [FILES] | Input file name | the input linked scene text file name |
| [FILES] | Output file name | the output scene hypertext file name |
| [SCENE] | Scene title | the title of the scene |
| [SCENE] | Scene copyright date | the date of copyright of the scene text file |
| [SCENE] | Scene stylesheet | the stylesheet or format controlling file for the scene |
| [SCENE] | Scene year | the year (in story time) of the scene |
| [SCENE] | Scene month | the month (in story time) of the scene |
| [SCENE] | Scene day | the day (in story time) of the scene |
| [SCENE] | Scene hour | the hour (in story time) of the scene |
| [SCENE] | Scene minute | the minute (in story time) of the scene |
| [SCENE] | Scene locale information | the location of the scene in the story's world as needed |
| [SOURCE] | Chapter | the chapter number of the scene |
| [SOURCE] | Section | the section number of the scene |
| [SOURCE] | Scene | the scene number |
| [SOURCE] | POV | the point of view for the scene |
| [SOURCE] | Scene_Source_File | the name of the source text file for the scene |
| [SOURCE] | Scene_Entry_Number | the spreadsheet entry number for the scene |
| [SOURCE] | Chapter_Name | the chapter name for the scene |
| [SOURCE] | Scene_Stylesheet | the stylesheet for the scene |
| [SOURCE] | Scene_Class | the display class for the scene |
| [SOURCE] | DR_2005_Scene_Seq_No. | the main sequence number for the scene |
| [SOURCE] | Part_No. | the part number for the scene |
| [SOURCE] | Part_Name | the part name for the scene |
| [SOURCE] | ORIGINAL_NOVEL_SCENE | the identifier of the scene in the original work |
| [SOURCE] | Original_Chapter_Number | the number of the chapter in the original work |
| [SOURCE] | DR_2001_Scene_Seq_No. | (sequence number from earlier source) |
| [SOURCE] | Teshill_Scene_Seq_No. | (sequence number from earlier source) |
| [SOURCE] | Pyro_Scene_Seq_No. | (sequence number from earlier source) |
| [BASELINKS] | Previous scene hypertext file name | the name of the scene hypertext file linking to the current file in the primary narrative sequence |
| [BASELINKS] | Next scene hypertext file name | the name of the scene hypertext file to which the current file in the primary narrative sequence links |
| [BASELINKS] | Introduction hypertext file name | the name of a hypertext file providing basic links to other scene hypertext files in the macramé |
| [KEYWORDS] | First set of keywords | one or more keywords characterizing the scene |
| [KEYWORDS] | Second set of keywords | one or more keywords characterizing the scene |
| [LINKMAIN] | Link entry number list | the list of linked-scene entry numbers for the scene, one for each [LINKS] record that follows |
| [LINKS] | Linked scene hypertext file name | the name of the scene hypertext file to which the current file in a secondary narrative sequence links |
| [LINKS] | Linked scene title | the displayed identifier of the scene hypertext file to which the current file in a secondary narrative sequence links |
| [LINKS] | Link class | the stylesheet class to be used for the secondary narrative link | compiled. Macramé compilation is simply the compilation of all scenes into one folder or directory so as to enable proper functioning of all hypertext links among the component scene files and reference files.

Scene Hypertext File Preparation

The invention produces each scene hypertext file as a single scrollable and pageable Web page. The scene title appears at the top of the Web page. The scene hypertext (including all unmarked links embedded in the text) appears next. At the bottom of the Web page the page's explicit links to other scene hypertext files are displayed. See FIG. 6A. In a basic fixed-output embodiment, the invention positions and labels the explicit links in a fixed form, with a single primary narrative sequence specified and labeled as such.

In a dynamic-output embodiment, the invention positions and labels the explicit links in a form which depends on the reader's choice of narrative sequences. Thus if a reader choose a particular character whose narrative he or she wishes to follow, the invention repositions and relabels each scene's links to designate the reader's choice as the primary narrative sequence.

Compilation of the Macramé

Once the POV spreadsheet contains all entries needed, the glossary database spreadsheet contains all entries needed, and all the scene text files are complete, the invention is operated to compile the complete macramé in hypertext form as directed by the author, editor, or publisher. The user selects the button in the POV spreadsheet labeled "Make Ctl Files", which triggers the invention's generation of a command script wherein a single command for each scene interprets the scene processing control file and creates the scene hypertext file with all its links included. The user then executes the resulting command script. All scenes are thereby compiled into a single folder or directory, called the macramé folder, for reading using a conventional Web browser.

The invention then copies all hypertext files containing reference information (glossaries, tables of contents, footnotes, encyclopedia articles, sidebars, etc.) into the macramé folder, so that the scene links to such materials, and the reference materials' links to the scenes, may work correctly. Once all materials are in the macramé folder, the macramé is complete, and may be accessed by any reader using a standard Web browser.

Revisions to the invention's glossary require that links to the glossary file or files be updated in all text containing such links. This is done by rerunning all programs and scripts in the compilation process to generate a fully-updated version of each hypertext page. Manual intervention in ths process is minimal.

Software Functions and Scripts of the Invention

The invention's scripts operate in three independent phases: scene text file preparation, glossary processing, and scene processing. The glossary processing provides input to the scene processing in the form of a script for detecting and converting glossary terms in the scenes into hypertext references to the glossary and other reference files as needed by the author or editor. The scene processing is the central component of the invention, converting all scene text files prepared by the author into scene hypertext files linked and ready for use by a reader.

Scene Text File Preparation Script

Figure 6:
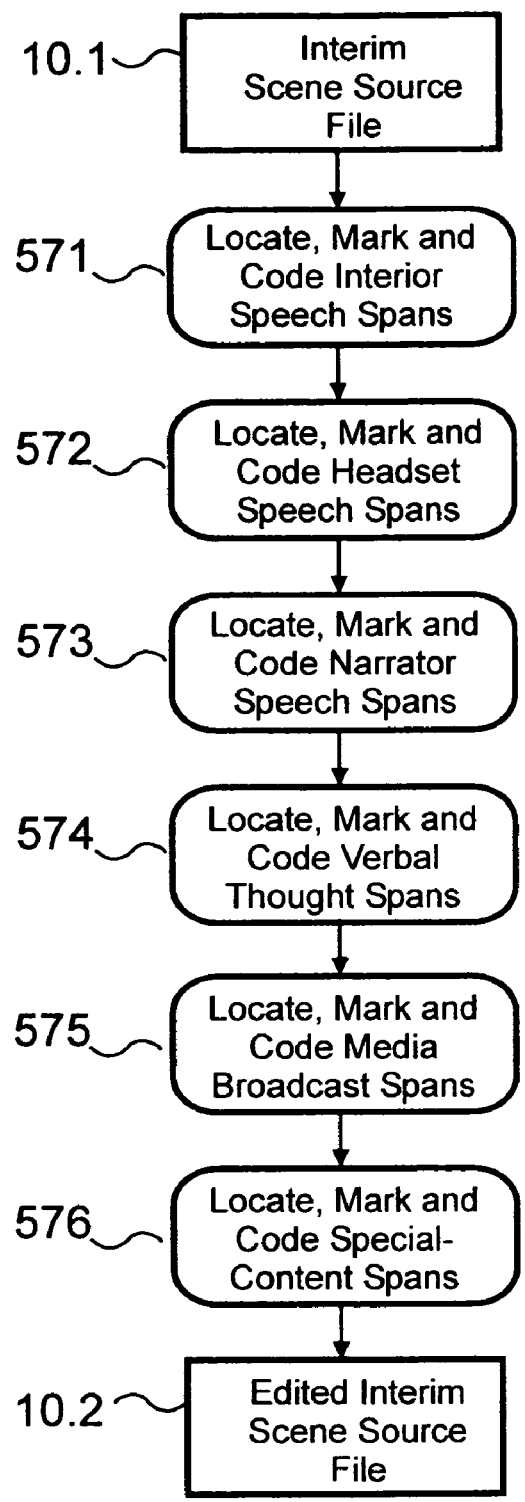
FIG. 6 shows the steps of the macro processing of different classes of text spans in a scene text file.

A single script of the invention, in the form of a WordPerfect PerfectScript program called PrepScen, facilitates scene text file preparation. FIG. 5 shows the steps performed by the PrepScen program, and FIG. 6 shows the steps performed by the Hmark Voice and Hmark Voice Varying subprograms. The PrepScen, Hmark Voice, and Hmark Voice Varying program source code is listed on the enclosed CD-ROM in the file labeled PrepScen.txt.

Glossary Processing

The invention provides the reader with links to substantially every instance of every glossary item found in the text of the work. First, the author provides a file of glossary entries including terms and their definitions. The invention uses as its input the author's glossary file defined conventionally in HTML, reads the file, and generates as output a list of terms and their intended treatments in the final work. The author then modifies the contents of this list to account for special treatments of individual glossary terms, such as plural or tense forms, alternate spellings, or cross-references, any of which maybe encountered in the text of the work. The invention subsequently converts the list into command files for converting terms found in a scene text file, Glossary, or other reference into hypertext links.

Before any other work is done, the first phase of glossary processing must be the extraction of terms to be glossed from the author's sources. The form of this process depends heavily on the form of the sources to be used. Here is an example of an extraction process using a glossary already existing in HTML form:

ExtractGlNms

This script reads a Glossary in .htm form as standard input and writes standard output as an awk command script containing the name anchors for hrefs and other required data. The output is used in the manual creation of a raw form of the GLP.txt file, called GLPRaw.txt, for required manual augmentation and editing.

```
awk '/<a name="[^"]*">/ { print $0; }' | awk '/^<dl><dt>/ { print $0; }' |
sed 's/<dl><dt><a name="//; s/">.*$//' | awk '{
print "Gl.htm|" $0 "|" $0 "|"
$0 "|gl|book"; }' >GLPRaw.txt
```

The resulting output, GLPRaw.txt, requires manual editing by the author or user to eliminate terms not to be incorporated, correct any terms not properly processed, and add any terms or forms of terms to be searched out in the text in which links to the glossed items will be placed. Following is a sample from a GLP.txt file, after a user has edited the GLPRaw.txt file to produce it.

GLP.txt (Sample)

```
...
Gl.htm|Andrew|Andrew|Andrew|gl|book
Andro Notes.htm|Andro Notes| |Andro Notes|en|book
Gl.htm|androspace|innerspace|androspace|gl|book
Gl.htm|andro|andro|andro|gl|book
...
```

By using a simple text file loading procedure as indicated in FIG. 7, the author or user may load the GLP.txt file into the Glossary Database spreadsheet so that the field contents shown for each record of the GLP.txt file load into the following columns of the spreadsheet's Treatments table:

1. Anchor_File

2. Found_Term_Form

3. Linked_Anchor_Term

4. Displayed_Term

5. Display_Window

6. Link_Stylesheet_Name

An analogous loading process allows an author or user to load records into the Glossary Definitions table itself in the spreadsheet. Once Treatments and Glossary records are loaded, the invention's software functions listed in the next section prepare the tables for further script processing.

Glossary Processing Functions

As shown in FIG. 8 and FIG. 9, the invention's Glossary Database spreadsheet converts author-supplied definitions into two files: AutoGlDefs.txt (409), the glossary definitions with their usages and treatments; and AutoGlP.txt (411), the glossary treatments list. (The split-glossary-file, layered-reference, and split-glossary-file layered reference embodiments follow closely similar paths of processing.) Some of the conversion process is done by simple spreadsheet formulas. Most of the conversion is done using VBA (Visual Basic for Applications), a programming language. The principal VBA software components of the invention, as stored in the invention's spreadsheet workbooks, are enclosed on CD-ROM. The comments at the head of each function or subroutine explain its purpose. In the program listings, some long lines of code wrap around to more than one printed line; this wraparound does not appear in the code itself. The glossary processing code, called in its overall form the genGlFiles program source code, is listed on the enclosed CD-ROM in the file labeled genGlFiles.txt.

Glossary Processing Scripts

Figure 12:
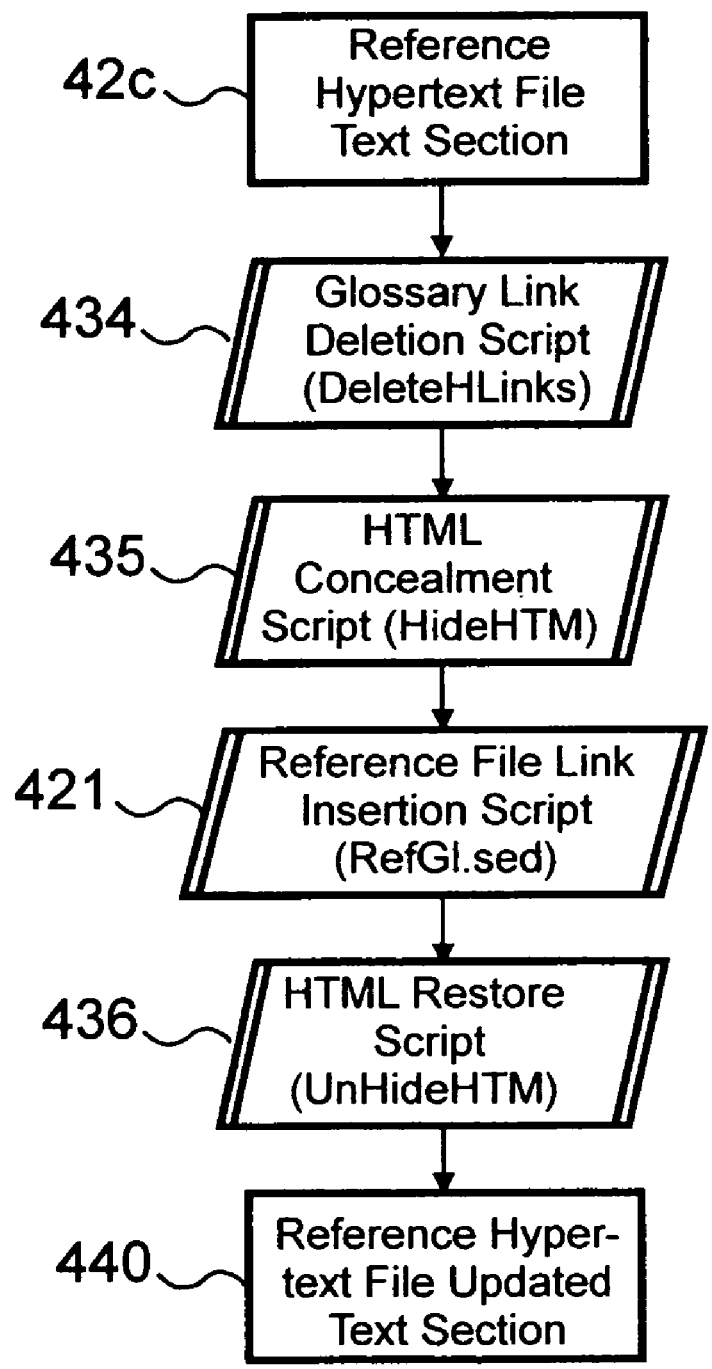
FIG. 12 shows the steps of updating the text of a reference hypertext file.

See FIG. 10. The invention uses the two outputs 409, 411 produced by the Glossary Database spreadsheet as inputs to build command file scripts for link installation. A first output command file 415, GlGl.sed, is applied to the Glossary itself during the creation of the Glossary hypertext file 48. As shown in FIG. 12, a second output command file 421, Ref-Gl.sed, is applied to each reference text during the conversion of the reference hypertext file 42 into an enhanced reference hypertext file 44. As shown in FIG. 14, a third output command file 419, Gl.sed, is applied to the scene text during the conversion of the augmented scene text file 30 into a scene hypertext file 91.

The invention provides a master script, BuildGlossHTM, for the creation of both the Glossary itself in XHTML format and the files for replacing glossed terms with hypertext references. The BuildGlossHTM script uses as its inputs the AutoGlDefs.txt and AutoGlP.txt files 409, 411 produced by the Glossary Database spreadsheet. From the AutoGlDefs.txt file, the BuildGlossHTM script builds the Glossary hypertext file 48, and from the AutoGlP.txt file, the BuildGlossHTM script builds the Gl.sed file 419 for replacing glossed terms in the scene text files and general references, and the GlGl.sed file 415 for replacing glossed terms in the Glossary itself. The BuildGlossHTM script is listed on the enclosed CD-ROM in the file labeled BuildGlossHTM.txt.

Each glossed item in the AutoGlP.txt file must be found in all its appearances in the literary work, and references inserted in the literary work pointing to the glossary entry for each occurrence of that item.

The split-glossary-file embodiments of the invention require flexibility in the number, names, and contents of the component files comprising the Glossary. Since these attributes may vary at the user's discretion, the invention's VBA code in the GlDB.xls spreadsheet builds a script similar to the BuildGlossHTM script, called the BuildSGlossHTM script. The BuildSGlossHTM script is listed on the enclosed CD-ROM in the file labeled BuildSGlossHTM.txt.

The GlSedgen.awk script generates a sed script from the AutoGlP.txt, AutoGlPCR.txt. AutoGlPSpl.txt, or AutoGlPSplCR.txt file, and the sed script will be used to find and insert glossary references for all glossed terms appearing in the Glossary itself. The GlSedgen.awk script is listed on the enclosed CD-ROM in the file labeled GlSedgen.awk.

Following is a sample portion of a set of commands generated using the GlSedgen.awk script, and called GlGl.sed. GlGl.sed is used to insert glossary links in the Glossary itself.

GlGl.sed (Sample)

```
1,$ s/\*/=!=/g
...
1,$ s/\([^A-Za-z#=>@]\)\(bioandroid\)\([^A-Za-rt-z@]\)/\1<a href="Gl.htm#andro" target="gl" class="book">bioandroid<\/a>\3/g
1,$ s/\(^bioandroid\)\([^A-Za-rt-z@]\)/<a href="Gl.htm#andro" target="gl" class="book">bioandroid<\/a>\2/g
1,$ s/\([^A-Za-z#=>@]\)\(bioandroid$\)/\1<a href="Gl.htm#andro" target="gl" class="book">bioandroid<\/a>/g
1,$ s/\([^A-Za-z#=>@]\)\(andros\)\([^A-Za-rt-z@]\)/\1<a href="Gl.htm#andro" target="gl" class="book">andros<\/a>\3/g
1,$ s/\(^andros\)\([^A-Za-rt-z@]\)/<a href="Gl.htm#andro" target="gl" class="book">andros<\/a>\2/g
1,$ s/\([^A-Za-z#=>@]\)\(andros$\)/\1<a href="Gl.htm#andro" target="gl" class="book">andros<\/a>/g
1,$ s/\([^A-Za-z#=>@]\)\(android\)\([^A-Za-rt-z@]\)/\1<a href="Gl.htm#andro" target="gl" class="book">android<\/a>\3/g
1,$ s/\(^android\)\([^A-Za-rt-z@]\)/<a href="Gl.htm#andro" target="gl" class="book">android<\/a>\2/g
1,$ s/\([^A-Za-z#=>@]\)\(android$\)/\1<a href="Gl.htm#andro" target="gl" class="book">android<\/a>/g
1,$ s/\([^A-Za-z#=>@]\)\(andro\)\([^A-Za-rt-z@]\)/\1<a href="Gl.htm#andro" target="gl" class="book">andro<\/a>\3/g
1,$ s/\(^andro\)\([^A-Za-rt-z@]\)/<a href="Gl.htm#andro" target="gl" class="book">andro<\/a>\2/g
1,$ s/\([^A-Za-z#=>@]\)\(andro$\)/\1<a href="Gl.htm#andro" target="gl" class="book">andro<\/a>/g
1,$ s/\([^A-Za-z#=>@]\)\(Andrew\)\([^A-Za-rt-z@]\)/\1<a href="Gl.htm#Andrew" target="gl" class="book">Andrew<\/a>\3/g
1,$ s/\(^Andrew\)\([^A-Za-rt-z@]\)/<a href="Gl.htm#Andrew" target="gl" class="book">Andrew<\/a>\2/g
1,$ s/\([^A-Za-z#=>@]\)\(Andrew$\)/\1<a href="Gl.htm#Andrew" target="gl" class="book">Andrew<\/a>/g...
1,$ s/=!=/\*/g
s/^ @//
s/@|@/|/
s/@|/|/
s/|@/|/
s/@ @/ /g
s/@-/-/g
s/@/ /g
```

The Sedgen.awk script generates a sed script from the AutoGlP.txt, AutoGlPCR.txt. AutoGlPSpl.txt, or AutoGlPSplCR.txt file, to be used to find and insert glossary references for all glossed terms appearing in the literary work, apart from those in the Glossary itself or in the references. The Sedgen.awk script is listed on the enclosed CD-ROM in the file labeled Sedgen.awk.

Following is a sample portion of a set of commands generated using the Sedgen.awk script, and called Gl.sed:

Gl.sed (Sample)

```
3,$ s/\*/=!=/g
...
3,$ s/\([ˆA-Za-z#=>@]\)\(andros\)\([ˆA-Za-rt-z@]\)/\1<a
href="Gl.htm#andro" target="gl" class="book">andros<\/a>\3/g
3,$ s/\(ˆandros\)\([ˆA-Za-rt-z@]\)/<a href="Gl.htm#andro" target="gl"
class="book">andros<\/a>\2/g
3,$ s/\([ˆA-Za-z#=>@]\)\(andros$\)/\1<a href="Gl.htm#andro" target="gl"
class="book">andros<\/a>/g
3,$ s/\([ˆA-Za-z#=>@]\)\(android\)\([ˆA-Za-rt-z@]\)/\1<a
href="Gl.htm#andro" target="gl" class="book">android<\/a>\3/g
3,$ s/\(ˆandroid\)\([ˆA-Za-rt-z@]\)/<a href="Gl.htm#andro" target="gl"
class="book">android<\/a>\2/g
3,$ s/\([ˆA-Za-z#=>@]\)\(android$\)/\1<a href="Gl.htm#andro"
target="gl" class="book">android<\/a>/g
3,$ s/\([ˆA-Za-z#=>@]\)\(andro\)\([ˆA-Za-rt-z@]\)/\1<a
href="Gl.htm#andro" target="gl" class="book">andro<\/a>\3/g
3,$ s/\(ˆandro\)\([ˆA-Za-rt-z@]\)/<a href="Gl.htm#andro" target="gl"
class="book">andro<\/a>\2/g
3,$ s/\([ˆA-za-z#=>@]\)\(andro$\)/\1<a href="Gl.htm#andro" target="gl"
class="book">andro<\/a>/g
3,$ s/\([ˆA-Za-z#=>@]\)\(Andrew\)\([ˆA-Za-rt-z@]\)/\1<a
href="Gl.htm#Andrew" target="gl" class="book">Andrew<\/a>\3/g
3,$ s/\(ˆAndrew\)\([ˆA-Za-rt-z@]\)/<a href="Gl.htm#Andrew" target="gl"
class="book">Andrew<\/a>\2/g
3,$ s/\([ˆA-Za-z#=>@]\)\(Andrew$\)/\1<a href="Gl.htm#Andrew"
target="gl" class="book">Andrew<\/a>/g
...
3,$ s/=!=/\*/g
3,$ s/@/ /g
1,1 s/ˆ[ ]*/<!-- Scene Title line stored in text was: /
1,1 s/.$/&\/ -->/
```

The invention uses the sed script produced in the above process as an input to the scene processing stage, converting terms having Glossary entries or other similar references into hypertext links.

To construct the hypertext Glossary itself in the single-glossaary-file embodiment, the invention combines a hypertext header file, a generated glossary body, and a hypertext trailer file. The invention generates the glossary body using the AutoGlDefs.txt file as input to a five-step process. These steps are:

1. Remove all existing hypertext links from the glossary definitions file, AutoGlDefs.txt.

2. Insert protective codes in the output from Step 1. so that no links will be installed in fields in the glossary definitions file that do not require them. This insertion is performed by an awk script, PrepGlDefs.awk.

3. Install all Glossary hypertext links to other Glossary entries in the Step 2. glossary term definitions themselves. This insertion is performed using the generated sed script, GLGL.sed.

4. Sort the Glossary entries from Step 3. into the order desired for their appearance in the finished Glossary.

5. Convert the sorted Glossary entries from Step 4. into the finished Glossary body, using the awk script GlGen.awk.

The PrepGlDefs.awk script simplifies the task of the link-insertion scripts by inserting signal characters in the Anchor Glossary Term and Form of Term Used fields. The PrepGlDefs.awk script is listed on the enclosed CD-ROM in the file labeled PrepGlDefs.awk.

The generation of the Glossary body is the task of the GlGen.awk script. The GlGen.awk script is listed on the enclosed CD-ROM in the file labeled GlGen.awk.

Once the header and footer are wrapped around the generated Glossary body, the first output of the BuildGlossHTM script is the Glossary itself. In the preferred embodiment, the Glossary is a single XHTML file; in additional embodiments, the Glossary may be broken up into multiple files.

The second output of the BuildGlossHTM script is the Gl.sed script, used in scene text file processing to insert links in each scene hypertext file.

In its split-glossary-file embodiment, the invention executes the generated BuildSGlossHTM script to build a Glossary header with an introduction and an index, and then a series of Glossary files, one for each subset of terms in the Glossary. The process is substantially the same as that described above for the single-glossary-file embodiment.

To implement a split-glossary-file embodiment by adaptation from the single-glossary-file embodiment required about a day's work, illustrating the invention's flexibility and adaptability in generating new forms of processing and outputs.

Reference File Processing

See FIG. 11. Reference files, not including the Glossary, may originate as word processing documents 22 that may incorporate tables, images, and other non-text components. Such documents are converted first into hypertext form using conventional conversion tools, but then require editing to make them consistent with the invention's glossary and scene hypertext files. A manual editing process must replace the existing XHTML header with a header consistent with the invention's scheme, creating reference hypertext files 42.

Reference File Processing Scripts

One master script 437, UpdateRefHTM, updates all Glossary links in each reference hypertext file 42. UpdateRefHTM performs all of the following tasks:

1. Constructs the sed file 421 called RefGL.sed, for detecting and linking Glossary terms within a reference hypertext file 42. This step is performed by an awk script, RefSedgen.awk, using the AutoGlP.txt file 411 constructed from the Glossary spreadsheet. (Details are in FIG. 9.) The RefSedgen.awk script is listed on the enclosed CD-ROM in the file labeled RefSedgen.awk.

2. Sets aside the input reference document's XHTML headers and footers. This step is performed by a pair of sed scripts, ExtractHHead 431 and ExtractHFoot 432, using the input document.

3. Keeps the reference document's text-embedded HTML intact except for Glossary links, which it removes, leaving only the displayed term. See also FIG. 12. This step is performed by the ExtractHText, DeleteHLinks, and HideHTM sed scripts 433, 434, and 435 respectively using the input reference hypertext file 42.

4. Reinstalls all Glossary links in reference hypertext file 42's text, incorporating all changes affecting Glossary links. This step is performed by the RefGL.sed sed script 421, using the output of Step 3.

5. Restores the reference document's text-embedded HTML. This step is performed by the UnHideHTM script 436, creating reference hypertext file updated text section 440. The UpdateRefHTM script 437 then combines header section 42a, reference hypertext file updated text section 440, and footer section 42b.

6. Produces enhanced reference hypertext file 44 (reference Web page), the UpdateRefHTM script's output.

The UpdateRefHTM script is a bash shell script containing the others described above. The UpdateRefHTM script is listed on the enclosed CD-ROM in the file labeled UpdateRefHTM.awk. The ExtractHHead, ExtractHFoot, ExtractHText, DeleteHLinks, HideHTM, and UnHideHTM scripts are listed on the enclosed CD-ROM in the file labeled UpdateRefHTM sed scripts.txt.

RefGl.sed (a sample of the file generated by RefSedgen.awk, including its head and tail):

```
1,$ s/\*/=!=/g
...
1,$ s/\([^A-Za-z#=>}@])\)\(Andrew\)\([^A-Za-rt-z{@])\)/\1<a
href="Gl.htm#Andrew" target="gl" class="book">Andrew<\/a>\3/g
1,$ s/\(^Andrew\)\([^A-Za-rt-z{@])\)/<a href="Gl.htm#Andrew" target="gl"
class="book">Andrew<\/a>\2/g
1,$ s/\([^A-Za-z#=>}@])\)\(Andrew$\)/\1<a href="Gl.htm#Andrew"
target="gl" class="book">Andrew<\/a>/g
1,$ s/\([^A-Za-z#=>}@])\)\(Earth\)\([^A-Za-rt-z{@])\)/\1<a
href="Gl.htm#Ancient@Earth" target="gl" class="book">Earth<\/a>\3/g
1,$ s/\(^Earth\)\([^A-Za-rt-z{@])\)/<a href="Gl.htm#Ancient@Earth"
target="gl" class="book">Earth<\/a>\2/g
1,$ s/\([^A-Za-z#=>}@])\)\(Earth$\)/\1<a href="Gl.htm#Ancient@Earth"
target="gl" class="book">Earth<\/a>/g
1,$ s/\([^A-Za-z#=>}@])\)\(Ancient Earth\)\([^A-Za-rt-z{@])\)/\1<a
href="Gl.htm#Ancient@Earth" target="gl"
class="book">Ancient@Earth<\/a>\3/g
1,$ s/\(^Ancient Earth\)\([^A-Za-rt-z{@])\)/<a
href="Gl.htm#Ancient@Earth" target="gl"
class="book">Ancient@Earth<\/a>\2/g
1,$ s/\([^A-Za-z#=>}@])\)\(Ancient
Earth$\)/\1<a href="Gl.htm#Ancient@Earth"
target="gl"
class="book">Ancient@Earth<\/a>/g
```

```
...
1,$ s/=!=/\*/g
s/^@//
s/@|@/|/
s/@|/|/
s/|@/|/
s/@ @/ /g
s/@-@/-/g
s/@/ /g
```

Scene Processing

The invention's POV spreadsheet initiates programmed scene processing by creating a scene processing control file for each scene to be included in the work. The scene processing control file determines the form and connections of each scene in the final work. An author or editor may make manual changes to this control file for a scene to change the form and connections as presented to the reader. This facilitation of author or editor changes is a feature of the invention. Here is an example of a scene processing control file for a scene in a novel. The Data Type Identifier begins each line of the file, and the Data Elements are concatenated after the corresponding Data Type Identifier on the same line.

| Sample Scene Processing Control File (Andrew-03g-01-01.txt) | |
|---|---|
| Data Type Identitifer | Data Elements |
| [FILES]| | <Scene_Text_File_Name>Andrew POV\Chapter 03g-01-01 (Andrew POV).txt</Scene_Text_File_Name>\| |
| | <Scene_HTML_File_Name>Andrew-03g-01-01.htm</Scene_HTML_File_Name>\| |
| | <Scene_Processing_Control_File_Name>Andrew-03g-01-01-Ctl.txt</Scene_Processing_Control_File_Name>\| |
| | <Scene_Data_File_Name>Andrew-03g-01-01-Data.txt</Scene_Data_File_Name>\| |
| [SCENE]| | <Scene_Title>CONE COUNTRY</Scene_Title>\| |
| | <COPYRIGHT_YEAR>2005</COPYRIGHT_YEAR>\| |
| | <Scene_Stylesheet>Demo Stylesheet</Scene_Stylesheet>\| |
| | <Story_Year>1544</Story_Year>\| |
| | <Story_Month></Story_Month>\| |
| | <Story_Day></Story_Day>\| |
| | <Story_Hour></Story_Hour>\| |
| | <Story_Minute></Story_Minute>\| |
| | <Scene_Locale>Novander post</Scene_Locale>\| |
| [SOURCE]| | <Chapter>03g</Chapter>\| |
| | <Section>01</Section>\| |
| | <Scene>01</Scene>\| |
| | <POV>Andrew</POV>\| |
| | <Scene_Source_File>Andrew POV\Chapter 03g-01-01 (Andrew POV).wpd</Scene_Source_File>\|<Scene_Entry_Number>85</Scene_Entry_Number>\| |
| | <Chapter_Name>To Purusil</Chapter_Name>\| |
| | <Scene_Stylesheet>Demo Stylesheet</Scene_Stylesheet>\| |
| | <Scene_Class>book</Scene_Class>\| |
| | <DR_2005_Scene_Seq_No>80</DR_2005_Scene_Seq_No>\| |
| | <Part_No>3</Part_No>\| |
| | <Part_Name>The Training Mission</Part_Name>\| |
| | <ORIGINAL_NOVEL_SCENE>63</ORIGINAL_NOVEL_SCENE>\| |
| | <Original_Chapter_Number>15</Original_Chapter_Number>\| |
| | <DR_2001_Scene_Seq_No>62</DR_2001_Scene_Seq_No>\| |
| | <Teshill_Scene_Seq_No></Teshill_Scene_Seq_No>\| |
| | <Pyro_Scene_Seq_No></Pyro_Scene_Seq_No>\| |
| [BASELINKS]| | <Next_Scene_Entry_No>86</Next_Scene_Entry_No>\| |
| | <Init_Link_Class>masked</Init_Link_Class>\| |
| | <MouseOver_Link_Class>master</MouseOver_Link_Class>\| |
| | <MouseOut_Link_Class>masked</MouseOut_Link_Class>\| |
| | <Previous_Scene_Entry_No>84</Previous_Scene_Entry_No>\| |
| | <Init_Link_Class>masked</Init_Link_Class>\| |
| | <MouseOver_Link_Class>master</MouseOver_Link_Class>\| |
| | <MouseOut_Link_Class>masked</MouseOut_Link_Class>\| |
| | <Intro_HTML_File_Name>L Intro.htm</Intro_HTML_File_Name>\| |
| | <Init_Link_Class>masked</Init_Link_Class>\| |

-continued

Sample Scene Processing Control File (Andrew-03g-01-01.txt)

| Data Type Identifier | Data Elements |
|---|---|
| [PRLINKS]\| | <MouseOver_Link_Class>master</MouseOver_Link_Class>\|<br><MouseOut_Link_Class>masked</MouseOut_Link_Class>\|<br><Next_Scene_HTML_File_Name>Andrew-03g-01-02.htm</Next_Scene_HTML_File_Name>\|<br><Next_Scene_Title>REACHING THE COAST</Next_Scene_Title>\|<br><Link_Class_Next>masked</Link_Class_Next>\|<br><Next_Scene_Entry_No>86</Next_Scene_Entry_No>\|<br><Prev_Scene_HTML_File_Name>Zashinhalh-03f2-03-01.htm</Prev_Scene_HTML_File_Name>\|<Prev_Scene_Title>AGAINST THE FIERY SANDS</Prev_Scene_Title>\|<br><Link_Class_Prev>masked</Link_Class_Prev>\|<br><Prev_Scene_Entry_No>84</Prev_Scene_Entry_No>\| |
| [KEYWORDS]\| | <Keywords_1>Alliji Andrew Hings-Wen Marande Mentrius Yuss</Keywords_1>\|<br><Scene_Character_List>Alliji, Andrew*, Hings-Wen, Marande, Mentrius, Yuss</Scene_Character_List>\|<br><Keywords_2></Keywords_2>\| |
| [LINKMAIN]\| | <Scene_Entry_Number>85</Scene_Entry_Number>\|<br><POV_Char_Number>5</POV_Char_Number>\|<br><Previous_Scene_Entry_No>84</Previous_Scene_Entry_No>\|<br><Next_Scene_Entry_No>86</Next_Scene_Entry_No>\|<br><Linked_Scene_Entry_No_1>86</Linked_Scene_Entry_No_1>\|<br><Linked_Scene_Entry_No_2>86</Linked_Scene_Entry_No_2>\|<br><Linked_Scene_Entry_No_3>91</Linked_Scene_Entry_No_3>\|<br><Linked_Scene_Entry_No_4>86</Linked_Scene_Entry_No_4>\|<br><POV_Next_Scene_Entry_No>86</POV_Next_Scene_Entry_No>\|<br><POV_Previous_Scene_Entry_No>84</POV_Previous_Scene_Entry_No>\| |
| [LINKS]\| | <Linked_Scene_HTML_File_Name_1>Andrew-03g-01-02.htm</Linked_Scene_HTML_File_Name_1>\|<br><Linked_Scene_Title_1>REACHING THE COAST: Andrew</Linked_Scene_Title_1>\|<br><Init_Link_Class>masked</Init_Link_Class>\|<br><MouseOver_Link_Class>master</MouseOver_Link_Class>\|<br><MouseOut_Link_Class>masked</MouseOut_Link_Class>\|<br><Linked_Scene_Entry_No_1>86</Linked_Scene_Entry_No_1>\| |
| [LINKS]\| | <Linked_Scene_HTML_File_Name_2>Andrew-03g-01-02.htm</Linked_Scene_HTML_File_Name_2>\|<br><Linked_Scene_Title_2>REACHING THE COAST: Alliji</Linked_Scene_Title_2>\|<br><Init_Link_Class>masked</Init_Link_Class>\|<br><MouseOver_Link_Class>master</MouseOver_Link_Class>\|<br><MouseOut_Link_Class>masked</MouseOut_Link_Class>\|<br><Linked_Scene_Entry_No_2>86</Linked_Scene_Entry_No_2>\| |
| [LINKS]\| | <Linked_Scene_HTML_File_Name_3>Andrew-03h-01-02.htm</Linked_Scene_HTML_File_Name_3>\|<br><Linked_Scene_Title_3>THE BARE LEDGE: Marande</Linked_Scene_Title_3>\|<br><Init_Link_Class>masked</Init_Link_Class>\|<br><MouseOver_Link_Class>master</MousOaver_Link_Class>\|<br><MouseOut_Link_Class>masked</MouseOut_Link_Class>\|<br><Linked_Scene_Entry_No_3>91</Linked_Scene_Entry_No_3>\| |
| [LINKS]\| | <Linked_Scene_HTML_File_Name_4>Andrew-03g-01-02.htm</Linked_Scene_HTML_File_Name_4>\|<br><Linked_Scene_Title_4>REACHING THE COAST: Mentrius</Linked_Scene_Title_4>\|<br><Init_Link_Class>masked</Init_Link_Class>\|<br><MouseOver_Link_Class>master</MouseOver_Link_Class>\|<br><MouseOut_Link_Class>masked</MouseOut_Link_Class>\|<br><Linked_Scene_Entry_No_4>86</Linked_Scene_Entry_No_4>\| |
| [LINKS]\| | <Next_Scene_HTML_File_Name>Andrew-03g-01-02.htm</Next_Scene_HTML_File_Name>\|<br><Next_Scene_Title>REACHING THE COAST: Andrew Viewpoint</Next_Scene_Title>\|<br><Init_Link_Class>masked</Init_Link_Class>\|<br><MOver_Link_Class>master</MOver_Link_Class>\|<br><MOut_Link_Class>masked</MOut_Link_Class>\|<br><POV_Next_Scene_Entry_NO>86</POV_Next_Scene_Entry_No>\| |
| [LINKS]\| | <Prev_Scene_HTML_File_Name>Andrew-03f-01-01.htm</Prev_Scene_HTML_File_Name>\|<br><Prev_Scene_Title>DAWN WATCH: Andrew Viewpoint</Prev_Scene_Title>\|<br><Init_Link_Class>masked</Init_Link_Class>\|<br><MOver_Link_Class>master</MOver_Link_Class>\|<br><MOut_Link_Class>masked</MOut_Link_Class>\|<br><POV_Previous_Scene_Entry_No>81</POV_Previous_Scene_Entry_No>\| |

The data element values in the above sample are separated by vertical bars ('|'). The first data element in each record (line) is an identifier of the type of data in the remaining data elements in that line. Each subsequent data element consists of a data element name in "<" ">", followed by a data element value.

In the [FILES] record, the first data element contains the name of the source scene text file to be read (Andrew-03g-01-01.txt), and the second data element contains the name of the target scene hypertext file to be written (Andrew-03g-01-01.htm).

In the [SCENE] record, the first data element contains the title of the scene (CONE COUNTRY), the second contains the copyright year (2005), the third contains the hypertext stylesheet used to format the display of the scene's page (Demo Stylesheet), the next five contain the year, month, day, hour, and minute of the scene in the world of the narrative (here only the story year, 1544, is given), and the last contains the locale of the scene (Novander post).

The [BASELINKS] record contains the scene entry number, initial link class, mouseover link class, and mouseout link class for each of the subsequent scene hypertext file, the previous scene hypertext file, and the hypertext file for a table of contents or other higher-level reference (L Intro.htm). The subsequent and previous scenes designated here are those in the primary narrative order of the work.

The [PRLINKS] record contains first the name of the subsequent scene's hypertext file (Andrew-03g-01-02.htm), and then the name of the previous scene's hypertext file (Zashin-halh-03f2-03-01.htm). The subsequent and previous scenes designated here are those in the primary narrative order of the work.

The [KEYWORDS] record contains data elements each of which holds a series of words which may be used to categorize the scene. The invention performs default assignments of values to these data elements. The first data element contains a default assignment of the POV character's name and the locale of the scene (Andrew Novander post), while the second contains a default assigned value consisting of a list of the characters in the scene (Alliji Andrew Hings-Wen Marande Mentrius Yuss). The third data element is reserved for later use.

The [LINKMAIN] record contains scene entry numbers for all scenes to which the current scene links. It also contains the number identifying the POV character in the spreadsheet.

The [LINKS] record, which may have multiple occurrences, contains first, a link to an alternate subsequent scene; second, the displayed title of the alternate scene and its POV character; and finally a link class for the link ('masked', meaning that the link is not visible except when a pointer passes over it).

In this scene processing control file example are six [LINKS] records, each of which generates a separate hypertext link in the page for the scene. In most cases, each link leads the reader to the next scene in which the character named in the link's display, such as Marande in "THE BARE LEDGE: Marande", appears. That next scene is in the file named Andrew-03h-01-02.htm. Different characters in the story may lead the reader to the same scene hypertext file. The characters selected for appearance in these links may or may not be point-of-view characters, but those who are point-of-view characters appear first.

The last two links may be the same as others displayed, but they will always follow the point of view of the current scene, so that a reader may follow a specific character through the work. The first of this link pair leads the reader forward to the next scene for that character's point of view, and the second takes the reader backward to the previous scene for that character's point of view.

Scene Processing Functions

The invention's POV spreadsheet converts author-supplied parameters into the information in the scene processing control files. Some of the conversion process is done by simple spreadsheet formulas. Most of the conversion is done using VBA (Visual Basic for Applications), a programming language. The principal VBA software components of the invention, as stored in the POV spreadsheet workbook, are included on the enclosed CD-ROM, in the file labeled MakeLMCompilationFile.txt. The comments at the head of each function or subroutine explain its purpose. In this listing, some long lines of code wrap around to more than one printed line; this wraparound does not appear in the code itself.

Scene Processing Scripts

The scene processing control files for all scenes are the primary input to a set of utility scripts. The utility scripts restructure the data in all the scene text files to build a scene hypertext file for each scene. See FIG. 20 for the relationships among the control scripts. In a first embodiment, the invention's POV spreadsheet executes a function called MakeLMCompilationFile to generate a shell script called CompileLM. CompileLM compiles the literary macramé in two major stages. First, CompileLM invokes a subordinate script called BuildGlossHTM to construct the Glossary and a pair of scripts for installing links to the Glossary. Second, CompileLM constructs the complete literary macramé of Web pages using all scene processing control files and scene text files. A sample CompileLM script is included on the enclosed CD-ROM, in the file labeled CompileLM.txt.

See FIG. 20. The scriptset.awk script 910 breaks down the process of building the scene hypertext file 97 into a series of steps. The scriptset.awk script 910 uses three steps 930, 940, 950 to generate three components needed to form a usable scene hypertext file 97. The three steps are:

1. Use the headset.awk script 930 to construct the HTML header for its output, using a scene header template file 93.
2. Use the AutoGlPCR.txt file 411.1, the CRReplScrGen.awk script 418.1, and the Gl.sed script 419 to construct the HTML output for the scene itself, using an augmented scene text file 30. Since the awk program is less effective and flexible in making such substitutions on a large-scale basis, the invention applies a sed-program script 419, GL.sed, to do the detailed substitution work. The sed-program script 419, also called the scene file reference link insertion script, is generated from the glossary treatments file 411 (AutoGlP.txt) by a scene file link processing script generation script 418, Sedgen.awk. The output of the execution of the scene file reference link insertion script 419 is the reference-linked scene text file 91.
3. Use the footset.awk script 950 to construct the HTML output for the scene's links and a standard HTML footer for the scene hypertext file, using a scene footer template file 95.

The scriptset.awk script 910 concatenates the outputs 91, 93, 95 of its steps into the finished scene hypertext file 97. The scriptset.awk script is included on the enclosed CD-ROM, in the file labeled scriptset.awk.

The headset.awk script 930 uses a template 93 that contains all substitution variables in a form such as "[Data Definitions]" (a marker for generation of a complete list of data elements substituting for the marker), or "[Scene_Title]" (a marker for direct substitution of the scene's title text for the marker itself). The headset.awk script is included on the enclosed CD-ROM, in the file labeled headset.awk.

See FIG. 20. The footset.awk script 950 uses a template 95 as input, and performs a task critical to the invention's purpose: the incorporation in each scene of multiple scene-to-scene links for the reader to follow while reading the work. Links in the primary (canonical) narrative sequence are presented as visible displays to the reader. Each additional scene-to-scene link is presented to the reader without contrast to its background, so that it does not become visible unless the reader selects (performs a 'mouseover') of the area the link occupies in the display. Template 95 contains all substitution variables in a form such as "[Link Table Entries]" (a marker for generation of a complete list of additional hypertext links), or "[Scene_Title]" (a marker for direct substitution of the scene's title text for the marker itself). The footset.awk script is included on the enclosed CD-ROM, in the file labeled footset.awk.

Other embodiments of the invention's scripts can be constructed in similar manner.

Illustrative Description of the Author's Use of the Invention

See the section titled Details of Method under Method of Invention, above. One aspect of the author's use of the invention requires further expansion: the establishment of alternative sequences of reading for scenes. As described above, the invention provides for the generation, display, and use of multiple alternative links to take a reader from one scene hypertext file display to another.

The main scene links lead forward to the next scene and backward to the previous scene in the primary order of reading. These links are always present, and are clearly displayed.

In its primary linking embodiment, the invention generates three additional types of links to subsequent scenes. Its first type is a link pair which lead forward to the next scene and backward to the previous scene in which the point-of-view character is again the point-of-view character. This type of link is useful for those readers who wish to follow the thread of a given character. See Table 2a for the details of processing.

The invention's second type of additional link traces forward threads for characters appearing in a scene, whether or not they are point-of-view characters in the next scene. The POV spreadsheet compiles counts for each character in the work showing the number of scenes for which that character is a point-of-view character, and the number of scenes in which that character appears without necessarily being the point-of-view character. The invention compares each of these counts to a threshold value to determine whether or not to build a forward link for that character and scene, and builds such a link only if one of the threshold values is exceeded. The author or other user can modify the threshold value to increase or decrease the number of such possible generated links from scenes. See Table 2b for the details of processing.

The invention's third type of additional link is the author-supplied link type. Space in each row of the list of scenes is reserved for the author to enter information for up to four forward scene links, each entry including scene entry number, scene caption, and scene link stylesheet identifier. See Table 2c for the details of processing.

Nonfiction applications of the invention are numerous. Playwrights can construct electronic literary macramés to assist actors, technicians, directors, and filmmakers in mounting a production. Pronunciation, cues, props, lighting, camera movements, and all other forms of script annotation become convenient in a layered form as the invention provides.

Textbooks in nearly every subject are rich in background information provided in footnotes, endnotes, sidebars, glossaries, and appendices, and the invention addresses all of these features smoothly and easily with sharply-reduced disruption to a student's of scholar's flow of thought. Furthermore, the invention offers a textbook author a way to lead a reader through a thread of thought created by a single source among several the author is presenting in the work, thereby allowing the reader the source's perspective on a given topic apart from the other sources also used in the work.

The invention supplies unexpected possibilities for texts in highly-technical subjects such as mathematics. A text containing axioms, definitions, and proofs of lemmas, theorems, and corollaries usually contains a wealth of internal cross references among all these components. The invention's glossary provides ready access to formal definitions, and the invention's reference pages are ideal for the sidebar articles that often appear in modern texts. The invention's threading of narratives allows tracings of reasoning using a series of theorems in whatver manner an author would like.

Sometimes the same theorem may be proved using analytical methods (one point of view), set-theoretical methods (a second POV), number-theoretical methods (a third POV), geometrical methods (a fourth POV), algebraic methods (a fifth POV), or topological methods (a sixth POV). By choosing a POV, a reader could follow a specific reasoning approach through the same sequence of theorems, allowing for shifts where shifts in POV (proof method) are necessary. It would follow a point-of-view pattern much the same as in a novel.

Legal documents rich in annotations and cross-references would also benefit from the invention's interweaving of pathways through such works.

The invention couples cleanly with the tools of the Internet and other media supported by hypertext such as images, audio, animations, video, and active program elements offering demonstrations, games, or other forms of interaction to a reader. By its integration of the world of text publishing with the potentials of the electronic media, the invention opens new opportunities for the creators of intellectual property of all kinds.

Figure 37:
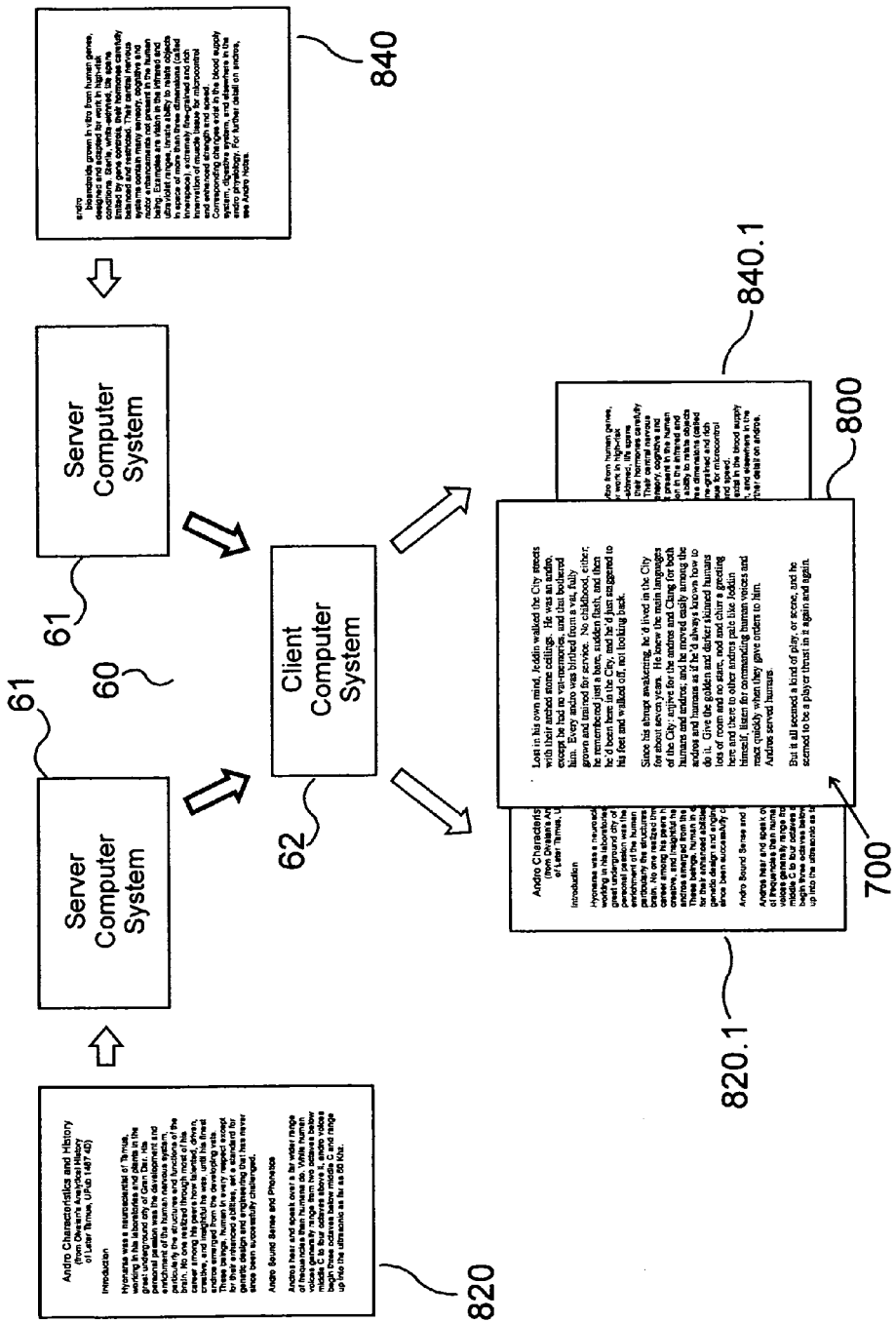
FIG. 37 shows a graphic representation of the application of the invention to a client-server system.

First, integrating the invention with the client-server technology of the World Wide Web allows the providing author or publisher the ability to create works which reside entirely on a reader's client computer system, entirely on the provider's server computer systems, or on some combination of client and server systems. See FIG. [7A]. Instead of storage and access entirely within the reader's computer system or client computer system 62, the contents of one or more windows 820, 840 can be retrieved from one or more server systems 61 at remote points in the World Wide Web to present windows 820.1, 840.1 to the reader. See FIG. 37. Such a structure accommodates the use of a subscription business model for access to part or all of the content of the literary macrame, as is done with software programs and multiplayer online games. Such business models represent potential revenue streams for publishers, authors, and other creators of text content.

Second, such links to servers may be used to connect readers directly with ongoing processes of developing content for the literary macramé, such as new installments being created by the author, supporting information made available by a publisher or scholar, or additional multimedia facets supporting the work. In this way, a static work of literature becomes a living, changing document at the reader's fingertips.

Third, for publishers carrying extensive backlists of already-published books for which print republication would be unprofitable, the invention offer a means for profitable rejuvenation of such works by integrating them with supporting material and material of scholarly interest. An author's notes and working appendices, cross-references to sources and bibliography, and other materials can give readers considerable added value.

To offer an example of the added value the invention creates, the multivolume set titled "History of Middle-earth", by Christopher Tolkien contains numerous preliminary versions of various parts of J. R. R. Tolkien's masterpieces *The Lord of the Rings, The Hobbit,* and The *Silmarillion,* along with added working documents written and expanded by the author over the long development of the finished works. The publication of a literary macramé of all of the assembled material would present readers and scholars with a priceless view of the author's creative process, and gives general readers a far deeper appreciation of Tolkien's created world.

Similar steps may be taken with every type of printed work from schoolbooks to music books, histories and biographies, and all types of fiction. Conversions to the literary macramé form, as offered by the invention, can raise the world of literature to new levels of interconnection and richness, and integrate literature constructively with the surging world of new communications and media.

Finally, the invention provides authors and editors with a functional realization of the literary device termed 'framing'. Framing is the practice of situating a secondary narrative text in relationship to a primary narrative text so that the secondary text comments on, refers to, illustrates, or otherwise enlarges upon the primary text in such a way as to transform the reader's relationship with the primary text. Glossaries, references, footnotes, endnotes, sidebars, as supported by the invention, are a limited form of framing narratives. A stronger form of framing is the use of a narrator's commentaries to open and close episodes in a story, when the narrator is not within the story itself, as in the novel *Tom Jones,* by Henry Fielding. The so-called "Greek chorus" of a play is a framing device.

Modern literature often applies the practice of frame violation, for humorous or dramatic effect. An example in cinema is in the film The Purple Rose of Cairo, where a character in a movie being shown in a theater leaves the screen to join the characters in the theater watching the movie. Time-travel stories in which a character appears multiple times in the same scene constitute another form of frame violation.

The invention's scene-by-scene linking mechanisms support unexpected and interesting violations of the frame normally presented to a reader. The cinematic example above can be adapted in a surprising way by linking the story of the on-screen character directly to the scene when that character leaves the screen to be the outer world of a second narrative.

The invention's ability to connect scenes in circular and interwoven ways facilitates the circular telling of stories such as E. R. Eddison's *The Worm Ouroboros,* in which the story begins again for its characters because they have enjoyed living it so much. A second series of books by Eddison, *The Zimiamvian Trilogy,* is set in the heaven of *The Worm Ouroboros,* which would allow an editor presenting the works using the invention to link directly between them.

In such ways, the invention offers an electronic realization of literary devices that in conventional literature are handled with words alone. The rich possibilities for framing that the invention produces with electronic linkage depend solely on the imagination and creativity of its users.

Illustrative Description of the Reader's Use of the Invention

The reader, using a conventional Web browser or other similar program, approaches the literary macramé initially as if reading an ordinary printed text. Conventional browser controls allow the reader to scroll, page ahead or back, move back and forth through displays, resize or reposition windows on the display, determine the presence of links in the text by passing the mouse pointer over the text being read, and activate links by selecting them with the mouse. The invention's transformation of the text exploits the power of these ordinary operations to enable the author to achieve literary effects not possible with a printed narrative.

Figure 31:
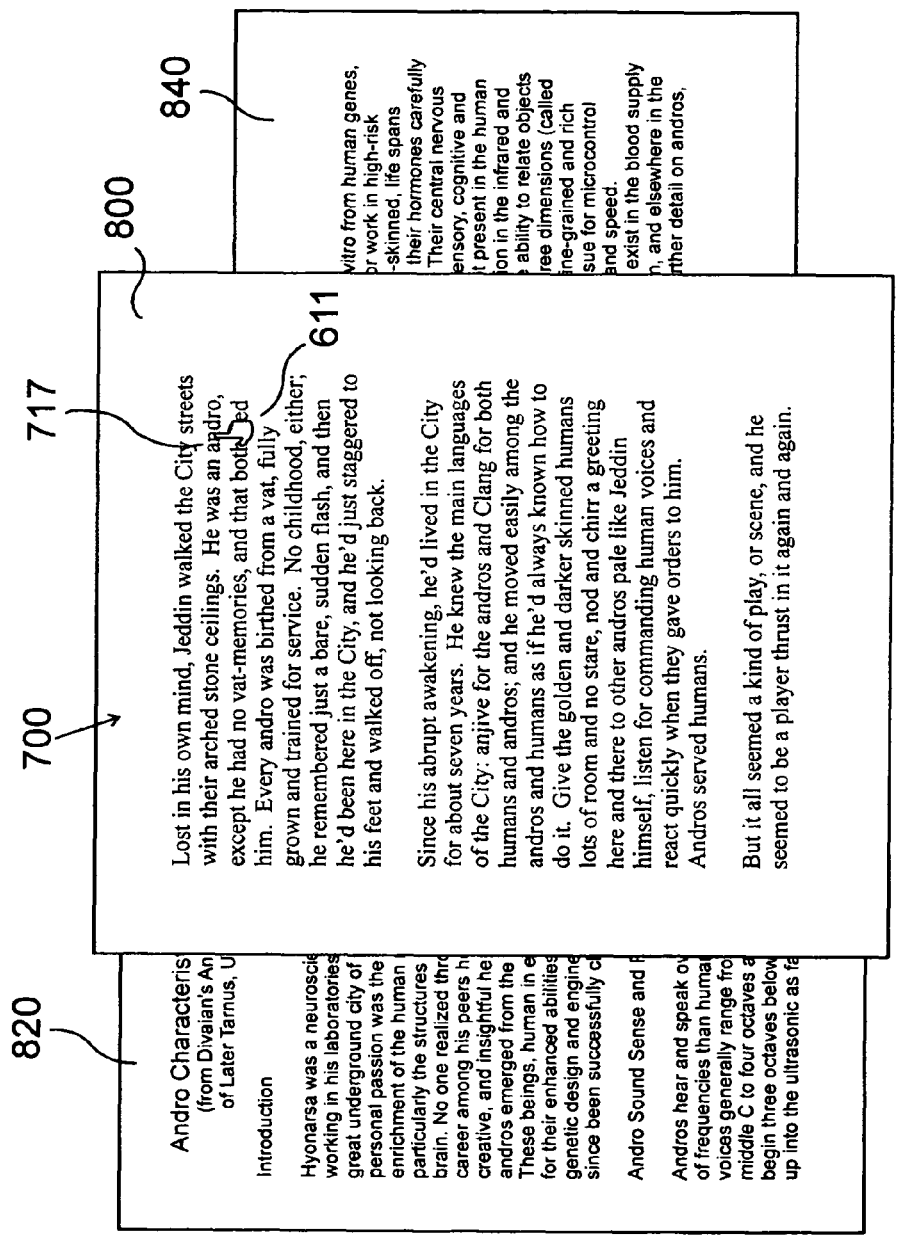
FIG. 31 shows the invention's scene hypertext page presentation in front of a glossary hypertext page for which the reader has referenced a link in the scene hypertext page, and a reference hypertext page containing information relevant to the contents of the glossary entry referenced.
Figure 32:
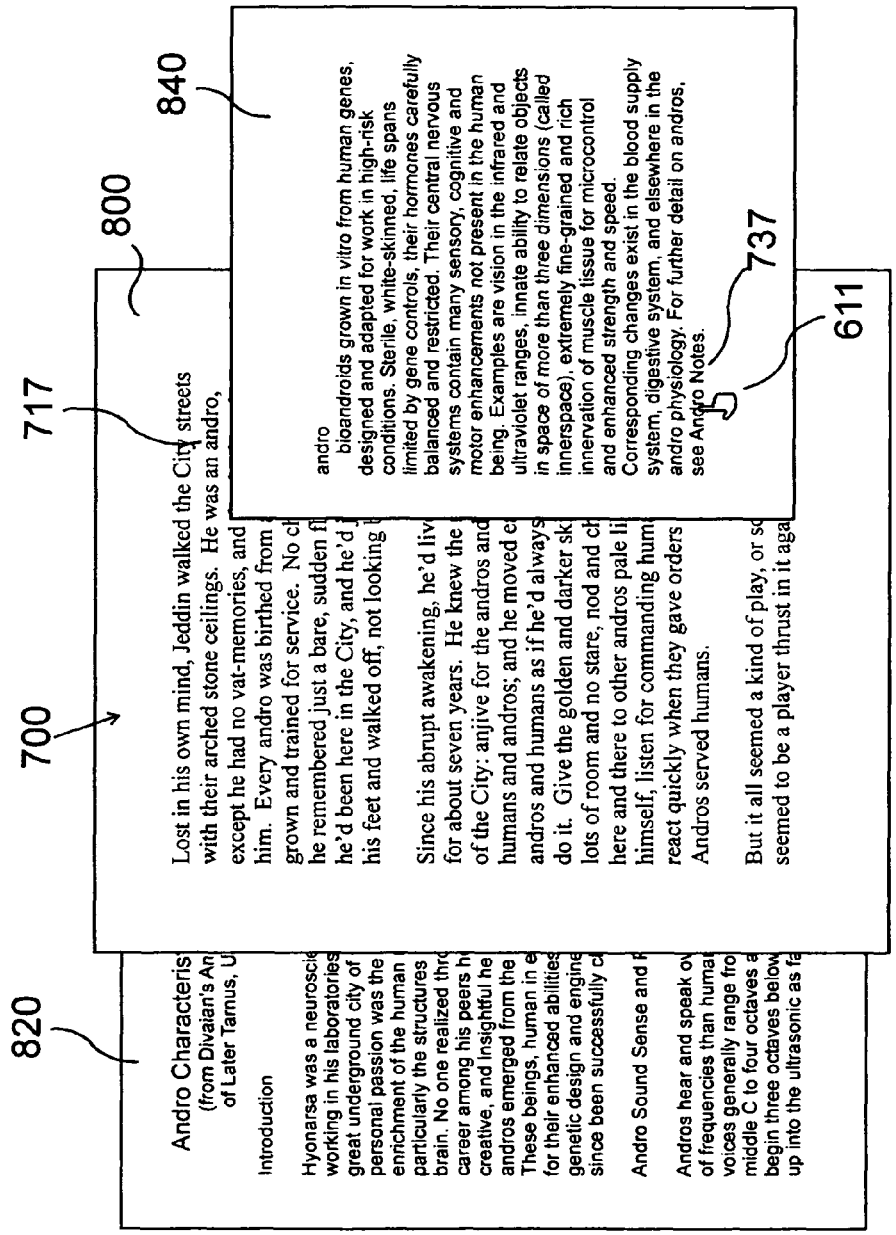
FIG. 32 shows the invention's glossary hypertext page presentation in front of a scene hypertext page for which the reader has referenced a link to the glossary hypertext page and selected the glossary hypertext page for viewing, along with a reference hypertext page containing information relevant to the contents of the glossary entry referenced.
Figure 33:
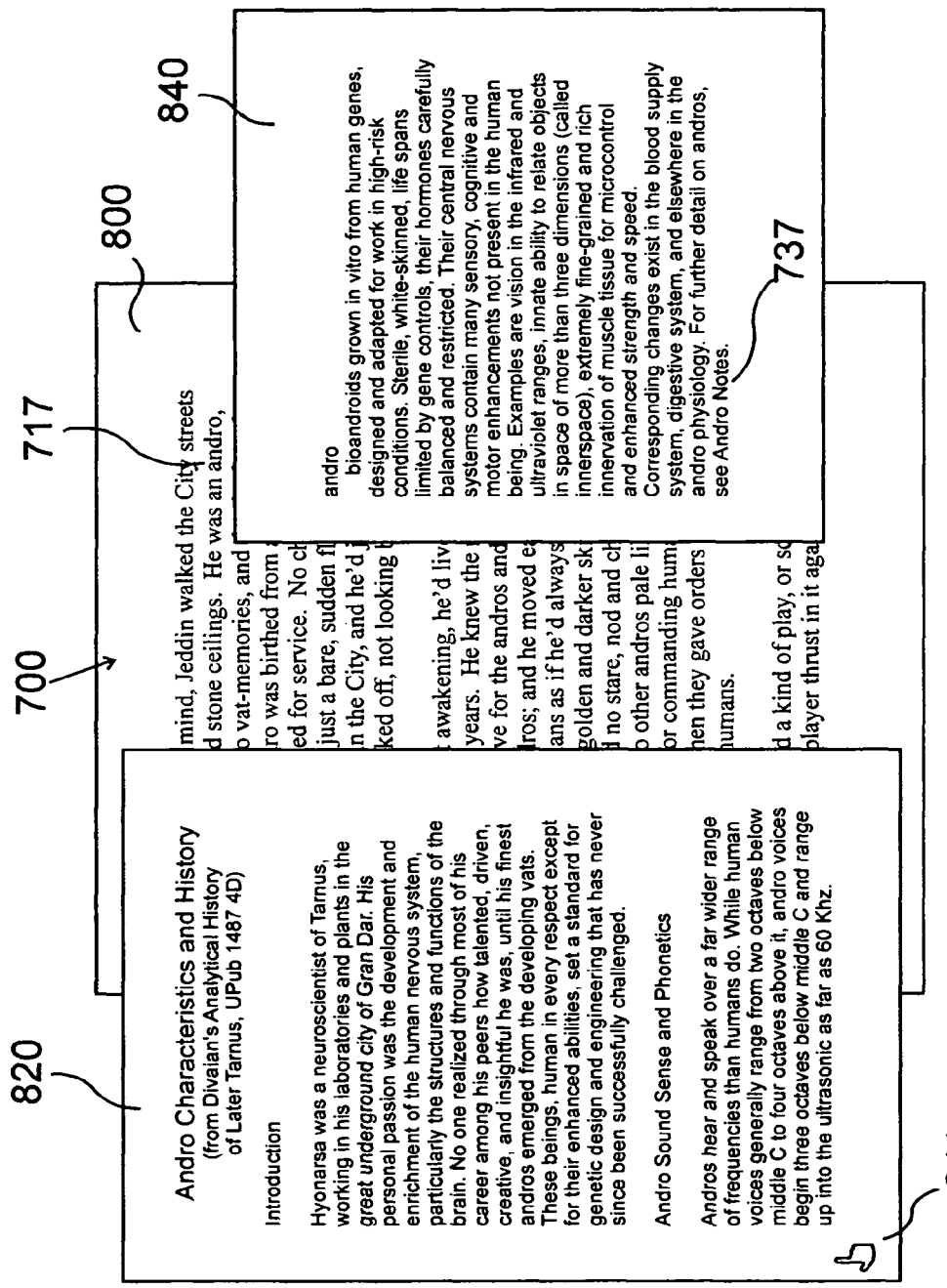
FIG. 33 shows the invention's reference hypertext page presentation in front of a scene hypertext page, along with the glossary hypertext page for which the reader has referenced a link to the reference hypertext page and then selected the reference hypertext page for viewing.

The reader may use multiple windows at once. FIG. 31 shows the display presented when a reader has first selected a link 717 in story text 700, based on the appearance of mouse pointer 611. The selection of link 717 results in the display in glossary window 840 of the glossary entry for the selected term. If the user then (FIG. 32) selects a link 737 in glossary window 840, the result is the display in reference window 820 of an article describing in further detail the subject of the previously-selected glossary entry. The reader then selects reference window 820, as shown in FIG. 33, to bring the article's text to the foreground for reading.

The reader may begin reading the macramé by selecting a single story thread or narrative thread, and following that thread easily, using the browser controls, until the thread is completed. If, however, the reader wishes to move from one thread to another in the course of reading a scene, the reader may do so simply by selecting the desired thread from the list of links at the end of each scene. If the reader wishes to backtrack and choose another thread of narrative, the browser facilitates making such a choice.

Figure 22:
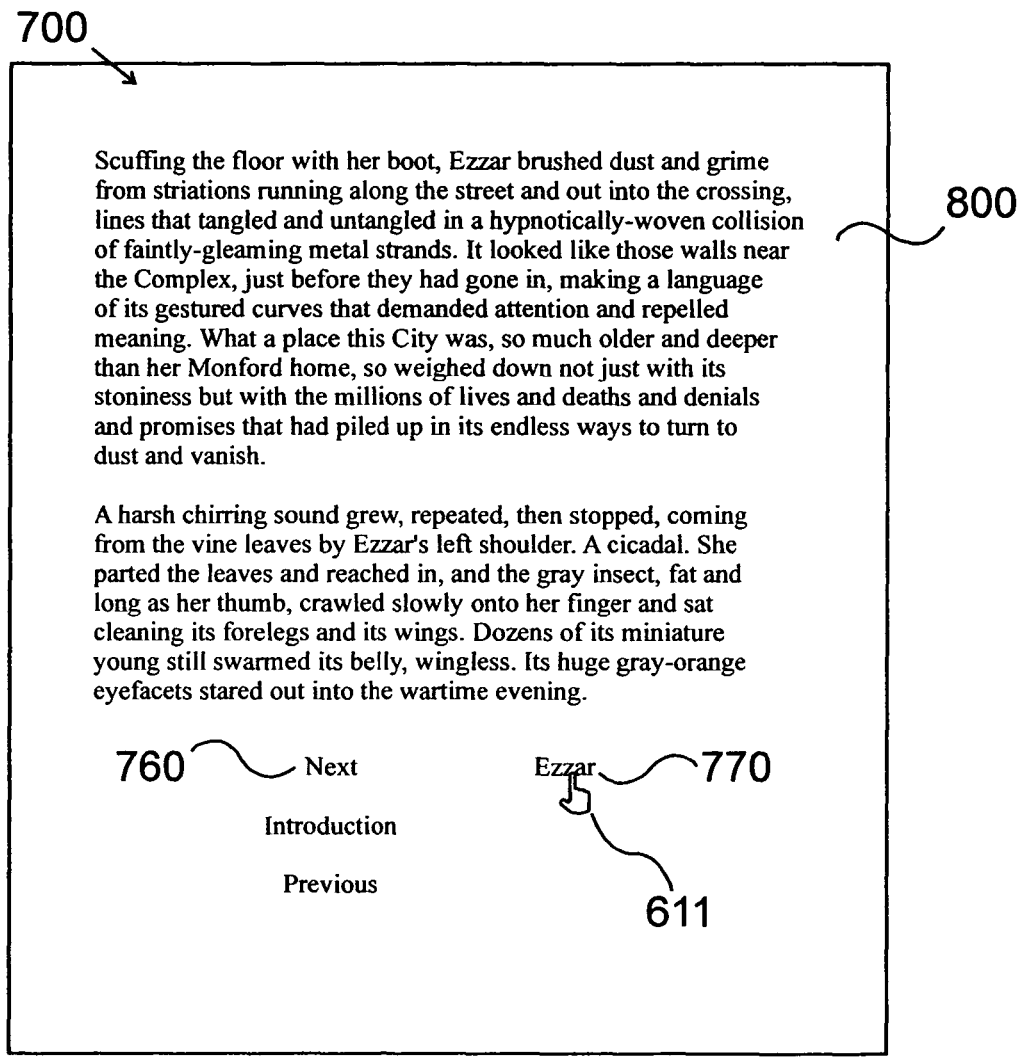
FIGS. 22 and 23 show the foot of a multithreaded scene hypertext page in which the links to the next and previous scenes in the author's primary sequence of reading are presented, along with a link to an alternate-sequence scene visible only on mouseover.
Figure 23:
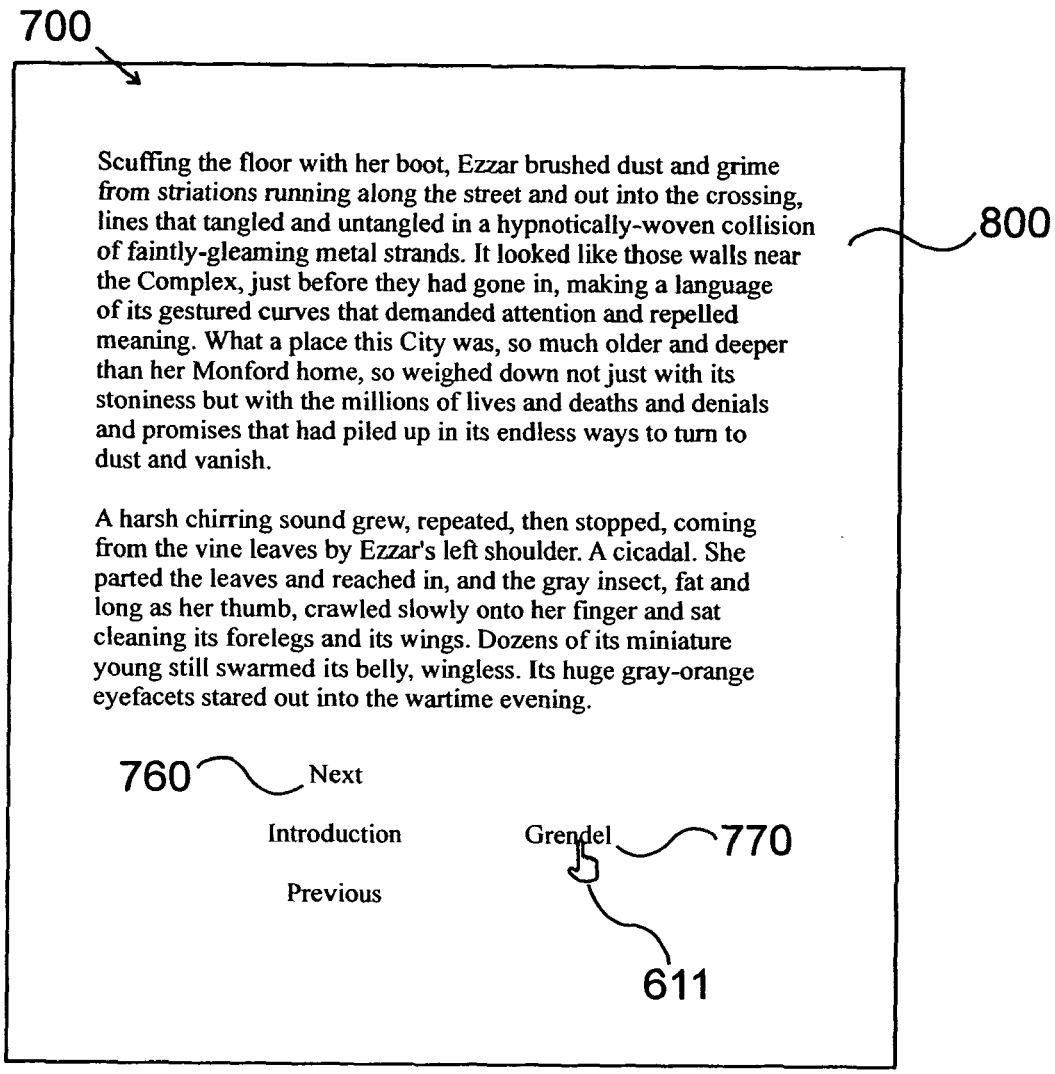

For the reader, the invention presents the basic links to the primary succeeding scene, the table of contents, and other essential points in clear display, as shown in FIG. 34. The invention presents all alternative scene selection links to the reader in a concealed form, each one visible only through motion of the mouse pointer 611 across the link display as shown in FIGS. 22 and 23, so that readers will not find the additional choices confusing in appearance or presentation.

Figure 35:
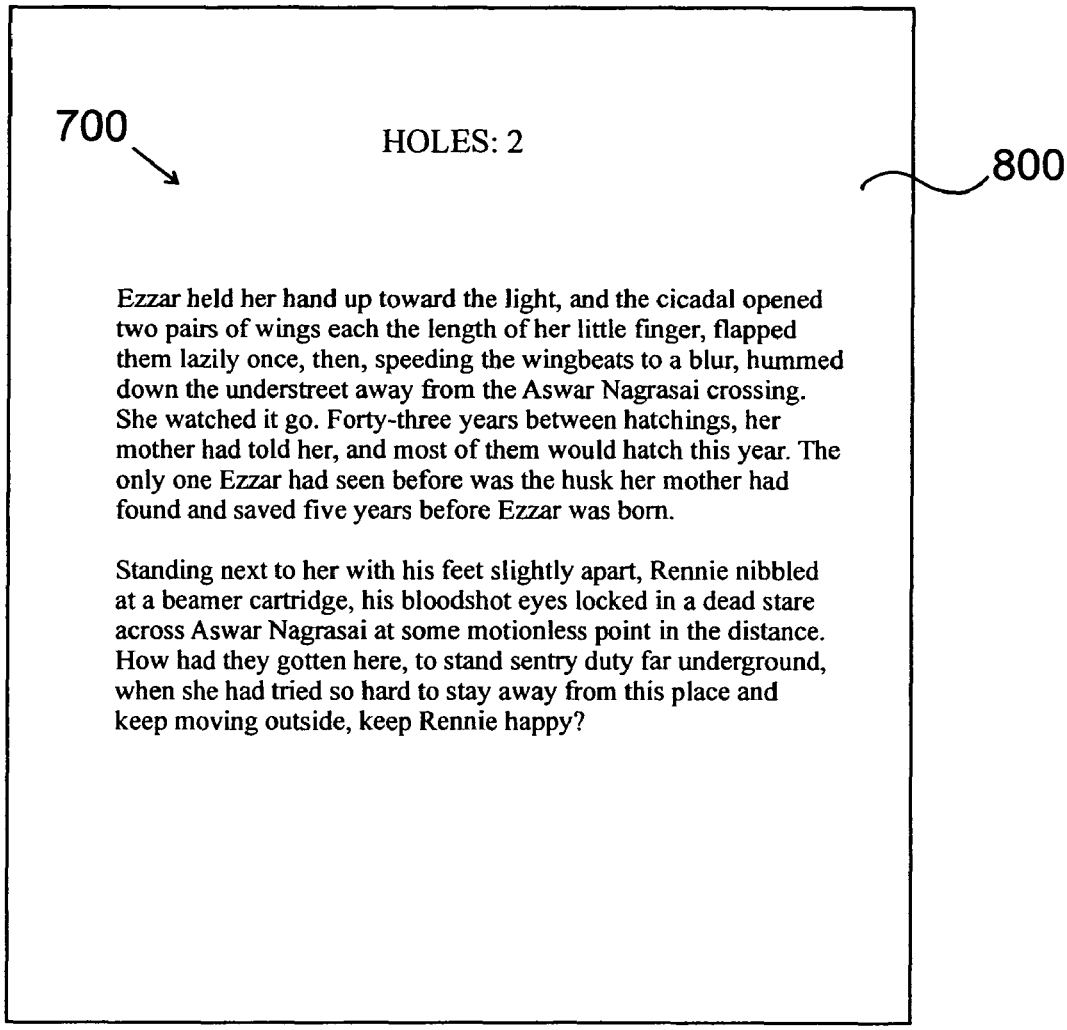
FIG. 35 shows the head of the multithreaded scene hypertext page for a scene from a literary work.

FIGS. 34 through 35 show the displays for a part of the normal reading process. In FIG. 34, story text 700 in window 800 ends with a set of explicit links 760 displayed after it. The reader may select any of the displayed links. The invention also provides a set of explicit links 770 as shown in FIG. 22, any one of which becomes visible only when the reader passes the mouse pointer 611 over a link 770. In FIG. 23, a different link 770 is shown as visible, since the mouse pointer is positioned over that link 770.

If the reader selects the link 760 labeled 'Next', the next page in the main narrative thread is displayed as shown in FIG. 35, and the reading continues in a conventional sequence.

The reader encountering linked names, terms, or phrases may summon information about them simply by clicking (selecting) them to activate their links. Each link will cause information to be displayed in the appropriate window. Some links skip to remote points in a narrative and display their target points in the story window. Some links provide displays of brief definitions in a glossary window. Some links present displays of sidebars or extended descriptions in a reference window. If the resulting window for any activated link is not in the foreground, the reader may advance the linked window for viewing and then return to the original display, or else may simply continue reading the original display.

Authors may exploit links by taking readers to unexpected displays. A sequence of links may lead in a circle, so that the reader never encounters an explicit endpoint. Such a linkage would be directly applicable to James Joyce's novel Finnegans Wake, in which the unfinished sentence at the end of the novel is continued at its beginning—the effect of the electronic form of this cycle would be quite different from that of its printed form. An author might link the end of one thread of narrative to the beginning of a different thread, leading to multiple traversals of the same scene along different paths. Such an approach would work well with a narrative such as that of the story of Rashomon—here the reader would be free to choose any of three narratives and follow them in any order, or would simply use the order the invention offers as a default. An author might offer the reader a conundrum to solve, such as the cryptogram in Edgar Allan Poe's story The Gold Bug— here the narrative might contain an active piece of computer code to let the reader interact with the text. The invention facilitates these and other forms of literary play in the making and use of the tapestries it produces.

Potential Impacts of the Invention

The author, editor, compiler, or publisher may consider the electronic literary macramé a living work. Stories and narrative orders may be added or deleted or rewritten, modes of presentation may be changed, and any other aspect of the process of deriving the macramé in its final form for the reader may be varied to produce different editions as seems appropriate. In effect, the literary macramé is a work of software that may be released many times as an author enhances or revises or corrects the contents and its presentation.

An opportunity the invention supports is the conversion of existing literary works into the macramé form. As an example, consider an interconnected set of novels such as the Skolian Empire stories written by author Catherine Asaro. Such a set of works can be converted by the author or one or more editors using the invention into a single literary macramé, electronically readable, and fully interlinked as described hereinabove. The electronic form of the works is thereby enhanced in value by the features offered via the invention, and this enhancement offers publishers a way to attract readers in the electronic realm without either the risk inherent in publishing new works or the risk arising from boring readers with verbatim electronic repetitions of already-printed works.

An additional opportunity the invention supports is the direct integration of the literary macramé with interactive components such as games, puzzles, discussion boards, and other electronic possibilities. For example, hidden or unexpected links in a narrative may lead a reader to an encrypted message that opens a new narrative, to a game for the reader to play, or to an online discussion board. The possibilities are many; the cited ones are only examples.

Finally, the invention's software framework offers publishers innovative opportunities to draw readers into repeated engagement via the purchase of new editions of the same work as the author continues to refine, extend, and improve it, in much the same way that popular software is enhanced and extended. As the pricepoint for electronic reading devices continues to decline, and as the convenience, simplicity, and compatibility of such devices continue to improve, all of the opportunities offered by the invention will gain in importance. Before the mass markets are ready for the innovative form of literature which is here termed the literary macramé, the invention will facilitate meeting the demands of that market, and will in fact have already contributed to the expansion of that demand.

The invention claimed is:

1. A method for producing an electronic literary macramé of texts from a literary work, comprising the steps of:
breaking the literary work down into scene text files and reference text files;
establishing a set of reference hypertext files derived from the reference text files;
establishing multiple sequences of reading for scenes;
establishing a set of scene hypertext files by linking among scene text files of the literary work and linking the scene hypertext files to the reference hypertext files;
converting the work into browser-compatible form;
incorporating supplementary hypertext links in each scene hypertext file;
incorporating special presentation features in one or more scene hypertext files;
linking the reference hypertext files back to the scene hypertext files of the work, and linking the reference hypertext files among and within themselves;
suppressing the conventional marking of browser links;
defining and using background, muted supporting windows to display reference hypertext files; and
generating a collection of interlinked browser-ready files comprising the literary macramé wherein the step of establishing multiple sequences of reading for scenes further comprises the steps of:
presenting the author with a means for selecting sequencing criteria for creating each sequence of scenes;
compiling the author's selections of criteria for creating each sequence of scenes into a sequence of identified scenes;
creating multiple sequences of identified scenes to create interwoven sequences of narrative.

2. A method for producing an electronic literary macramé of texts from a literary work, comprising the steps of:
breaking the literary work down into scene text files and reference text files;
establishing a set of reference hypertext files derived from the reference text files;
establishing a set of scene hypertext files by linking among scene text files of the literary work and by linking the scene hypertext files to the reference hypertext files;
linking the reference hypertext files back to the scene hypertext files of the work and linking the reference hypertext files among and within themselves;
selecting a point of view (POV) spreadsheet comprising locale, and interval of time defining each scene in the literary work;
creating a scene text file for each scene in the literary work;
creating a scene characteristics table associating each scene text file with a title, a date and time, and a list of the characters in, and other focal aspects of, the scene;
writing the scene characteristics table into the scene text file;
copying the scene characteristics table from the scene text file to the POV spreadsheet.

3. A method for producing an electronic literary macramé of texts from a literary work, comprising the steps of:
breaking the literary work down into scene text files and reference text files;
establishing a set of reference hypertext files derived from the reference text files;
establishing a set of scene hypertext files by linking among scene text files of the literary work and by linking the scene hypertext files to the reference hypertext files;
linking the reference hypertext files back to the scene hypertext files of the work and linking the reference hypertext files among and within themselves;
collecting author's terms of unique, innovative, or specialized usage in the literary work;
creating one or more text glossaries of said author's terms;

creating expository texts concerning the author's terms and contents of the literary work;
incorporating hypertext anchors to author's terms in said text glossaries and expository texts;
constructing a list of said hypertext anchors.

4. A method for producing an electronic literary macramé of texts from a literary work, comprising the steps of:
breaking the literary work down into scene text files and reference text files;
establishing a set of reference hypertext files derived from the reference text files;
establishing a set of scene hypertext files by linking among scene text files of the literary work and by linking the scene hypertext files to the reference hypertext files;
linking the reference hypertext files back to the scene hypertext files of the work and linking the reference hypertext files among and within themselves;
constructing an augmented term link list containing the author's term, the name of the anchor to which it will link, the form of the author's term to be displayed where the link is placed, the name of the file in which the anchor resides, the area in which the reference will be displayed, and any formatting information needed for the reference display
modifying the augmented term link list to eliminate unwanted references, change file names, or adjust other values and entries;
executing a generating program script of the invention to create a link installation script containing file modification editing instructions for inserting hypertext links wherever text references to items in the term link list appear;
applying the link installation script to each scene text file;
applying the link installation script to each reference file.

5. The method of claim 4 wherein the step of applying the scene link installation script to each scene text file further comprises the steps of:
scene link installation script inserting links at points within each scene text file to anchors in the files of reference materials by the use of scripts containing all author's terms for which anchors have been created in the reference files;
locating in each scene text file every occurrence of every such author's term and replace the term in the scene text file with the link to that term's anchor in a reference file, leaving the appearance of the term in the scene text file intact, and producing a linked scene text file;
locating in each reference file every occurrence of every such author's term and replace the term in the reference file with the link to that term's anchor in a reference file, leaving the appearance of the term in the reference file intact, and producing a linked reference file.

6. The method of claim 1 wherein the step of creating multiple sequences of identified scenes further comprises the steps of:
defining subset sequences of scenes to be read as a subset of the totality of scenes in the literary work;
defining a chronological sequence of scenes in the literary work;
defining a first sequence of reading of subset sequences of scenes for the reader of the literary work;
identifying shared data elements for establishing a sequence of links among scenes;
identifying subset sequences of scenes for which common elements may be used to link said scenes in a narrative sequence;
defining one or more alternative sequences of reading of subset sequences of scenes for the reader of the literary work;
identifying uniquely each alternative sequence of reading of scenes;
generating uniquely-identified hypertext links from each scene hypertext file in each alternative sequence of reading to the next scene hypertext file in said alternative sequence;
presenting unobtrusively all uniquely-identified hypertext links from each scene hypertext file in each alternative sequence of reading to the next scene hypertext file in a form allowing the reader to choose any presented alternative sequence upon finishing the reading of any scene hypertext file.

7. The method of claim 1 in which the step of creating multiple sequences of identified scenes to create interwoven sequences of narrative further comprises the steps of:
identifying common elements for establishing a sequence of links;
identifying a sequence of scenes for which common elements may be used to link said scenes in a narrative sequence; and
installing links for one or more narrative sequences in each of a series of scene text files to make each scene text file into a scene hypertext file.

8. The method of claim 1 wherein the step of presenting the author with a means for selecting sequencing criteria for creating each sequence of scenes further comprises the steps of:
presenting scenes to an author for validating the sequences of the scenes; and
altering sequences of scenes by changing scene links as directed by the author.

9. The method of claim 1 wherein the step of defining a first sequence of reading of subset sequences of scenes for the reader of the literary work further comprises the steps of:
presenting visibly each uniquely-identified hypertext link to the next scene from each scene hypertext file in the first sequence of reading;
presenting visibly the next scene's hypertext file upon the reader's selection of the next scene's hypertext link of the scene hypertext file;
presenting visibly each uniquely-identified hypertext link to the previous scene from each scene hypertext file in the first sequence of reading; and
presenting visibly the previous scene's hypertext file upon the reader's selection of the previous scene's hypertext link of the scene hypertext file.

10. The method of claim 1 wherein the step of defining one or more alternative sequences of reading of subset sequences of scenes for the reader of the literary work further comprises the steps of:
defining one or more alternative sequences of reading of scenes based on a single character's point of view in common among said scene text files;
defining one or more alternative sequences of reading of scenes based on a single locale in common among said scene text files;
defining one or more alternative sequences of reading of scenes based on one or more keywords appearing in common among said scene text files;
defining one or more alternative sequences of reading of scenes based on alternative chronological sequencing of scene text files;

defining one or more alternative sequences of reading of scenes based on the author's desired effects upon the reader's awareness of the content of the literary work;

defining one or more alternative sequences of reading of scenes based on combined sequencing criteria drawn from the scene characteristics table of each scene;

defining one or more alternative sequences of reading of scenes based on the author's manual selection of a succession of scenes.

11. The method of claim 10 wherein the step of defining one or more alternative sequences of reading of scenes based on alternative chronological sequencing of scene text files further comprises the steps of:

defining one or more alternative sequences of reading of scenes based on reverse chronological sequencing of scene text files;

defining one or more alternative sequences of reading of scenes based on mixed reverse and forward chronological sequencing of scene text files;

defining one or more alternative sequences of reading of scenes based on mixed reverse and forward chronological sequencing of sequences of scene text files.

12. The method of claim 1 wherein the step of presenting unobtrusively all uniquely-identified hypertext links from each scene hypertext file in each alternative sequence of reading to the next scene hypertext file in a form allowing the reader to choose any presented alternative sequence upon finishing the reading of any scene hypertext file further comprises the steps of:

presenting invisibly each uniquely-identified hypertext links from each scene hypertext file in each alternative sequence of reading upon initial presentation to the reader;

presenting visibly each uniquely-identified hypertext links from each scene hypertext file in each alternative sequence of reading upon the reader's selection of a defined region of the display of the scene hypertext file;

presenting visibly the linked scene hypertext file upon the reader's further selection of a defined region of the display of the scene hypertext file.

13. The method of claim 1 wherein the step of converting the work into browser-compatible form further comprises the steps of:

converting each scene text file to a scene hypertext file.

14. The method of claim 13 wherein the step of converting each scene text file to a scene hypertext file further comprises the steps of:

removing unnecessary control information from the scene text file;

constructing a hypertext header for the scene text file;

constructing a hypertext body for the scene text file;

placing the scene text file in the hypertext body for the scene hypertext file;

adding hypertext links to the scene hypertext file.

15. The method of claim 1 wherein the step of incorporating supplementary hypertext links in each scene hypertext file further comprises the steps of:

incorporating supplementary hypertext links to hypertext anchors in reference hypertext files in each scene hypertext file;

incorporating supplementary hypertext links to hypertext anchors in scene hypertext files in each scene hypertext file.

16. The method of claim 1 wherein the step of incorporating special presentation features in one or more scene hypertext files further comprises the steps of:

encrypting one or more portions of one or more scene hypertext files or reference hypertext files;

incorporating style features for displaying one or more portions of one or more scene hypertext files or reference hypertext files in one or more alternate typefaces;

incorporating software transformations for displaying one or more portions of one or more scene hypertext files or reference hypertext files as one or more graphical images or texts;

incorporating software components for displaying one or more portions of one or more scene hypertext files or reference hypertext files as successions of different images or texts; and referencing one or more stylesheets to alter the presentation of one or more portions of one or more scene hypertext files or reference hypertext files.

17. The method of claim 1 in which the step of suppressing the conventional marking of browser links further comprises the steps of:

creating a literary macramé stylesheet definition suppressing distinctions of appearance between plain text and linked text;

leaving in place the distinction that causes the mouse pointer to change its appearance when positioned over a link; and applying the use of the literary macramé stylesheet to each scene hypertext file in the work.

18. The method of claim 1 wherein the step of defining and using background, muted supporting windows to display reference hypertext files further comprises the steps of:

reducing the level of text-to-background contrast in each background, muted window;

positioning a portion of each background, muted window behind the window containing the main narrative; and suppressing the overlapping of the main narrative window by a backgroup, muted window unless such overlapping is explicitly directed by a user.

19. The method of claim 1 wherein the step of generating a collection of interlinked browser-ready files comprising the literary macramé further comprises the steps of:

listing all scene hypertext files to be included in the work;

generating a scene compilation control script for each scene included in the work;

generating a master compilation script to execute the collection of scene compilation control scripts;

compiling the scene hypertext files using the master compilation script and the collection of scene compilation control scripts to produce scene text files and reference files in browser-compatible form with linking capabilities;

storing the compiled scene hypertext files and reference hypertext files in an interlinked set of directories for the reader's use.

20. The method of claim 19 in which the step of compiling the scene hypertext files using the master compilation script and the collection of scene compilation control scripts to produce scene text files and reference files in browser-compatible form with linking capabilities further comprises the steps of:

prepending a Web page header to each scene hypertext file;

appending a set of Web page links to each scene hypertext file; and appending a Web page trailer to each scene hypertext file.

21. An apparatus for producing an electronic literary macramé of texts from a literary work, comprising:

a computer,
input means for the computer;
display means for the computer;
information storage and retrieval means for holding data and instructions for the computer;
a repository for information connected to the computer;
a set of files residing in the repository for information;
a database program or spreadsheet program operating within the computer;
a database supported by the database program or spreadsheet program for holding information concerning the characteristics of one or more scenes presented in the literary work;
a set of processing control files residing in the repository for information, for linking the scenes of the literary work;
a set of scene text files residing in the repository for information and containing the literary work;
a set of reference text files residing in the repository for information and containing information supportive of the literary work;
a set of link records residing in the repository for information and containing link information interconnecting the contents of the scene text files and reference text files;
a set of utility programs and scripts operating within the computer for converting the set of scene text files into a set of scene hypertext files linking among scene text files of the literary work and linking to reference hypertext files and for converting the set of reference text files to reference hypertext files derived from the reference text files and linked among themselves and linked to the scene hypertext;
a browser program operating within the computer for displaying interlinked hypertext files; and
a set of display processing programs operating within the computer for adapting the presentation of interlinked hypertext files, wherein the database contains one or more data elements comprising attributes of each scene of a story and wherein the one or more data elements comprise for each scene:
    a scene title;
    a scene locale;
    a scene designator or identifier;
    the point of view from which the scene is rendered;
    the date and time of the scene within the narrative text;
    the copyright year of the writing of the scene;
    one or more keywords characterizing the scene;
    a designator of the chapter in which the scene appears;
    a designator of the section of the chapter in which the scene appears;
    the source file from which the scene text file is taken;
    the style of presentation required for the scene text; and
    the location or window of presentation required for the scene text file.

22. The apparatus of claim 21 wherein the repository for information comprises one or more of any combination of the following:
    one or more hard disk drives;
    one or more main random access memory (RAM) units;
    one or more removable flash memory units; and
    one or more removable disk units.

23. The apparatus of claim 21 wherein the input means comprises a keyboard and a pointing device with one or more buttons for signaling selection.

24. The apparatus of claim 21 wherein the display means comprises a display screen.

25. The apparatus of claim 21 wherein the set of files further comprises:
    one or more source text files containing one or more works of literature;
    one or more scene text files each containing a component of a source text file; and
    one or more reference text files each containing reference information; and
    one or more hypertext files each containing one or more links to points within itself and one or more links to points in other hypertext files.

26. The apparatus of claim 21 wherein each hypertext file further comprises a scene hypertext file containing scene text.

27. The apparatus of claim 21 wherein a sequence of linked hypertext files comprises a narrative story sequence.

28. The apparatus of claim 21 wherein each hypertext file further comprises a reference hypertext file containing reference text.

29. The apparatus of claim 21 wherein the database program or spreadsheet program comprises a computer program of a type selected from the following:
    an electronic spreadsheet program;
    an electronic database management program.

30. The apparatus of claim 21 wherein the database comprises a repository of one or more types selected from a list consisting of the following:
    the contents of an electronic spreadsheet;
    one or more electronic files;
    the contents of a relational database.

31. The apparatus of claim 21 wherein the one or more data elements comprise for each scene:
    a generated common scene identifier
    a scene text file name;
    a generated scene HTML file name;
    a generated scene processing control file name;
    a previous scene entry number;
    a generated previous scene HTML file name;
    a next scene entry number;
    a generated next scene HTML file name;
    a link class;
    a next scene source file name;
    a generated scene character list; and
    a scene primary sequence number.

32. The apparatus of claim 21 wherein the one or more data elements comprise for each scene:
    a scene file control record;
    a scene content control record;
    a scene source data control record;
    scene base link control record;
    scene keyword control record;
    scene main link control record; and
    one or more scene added link control records.

33. The apparatus of claim 21 wherein the one or more data elements comprise one or more alternative narrative order links for each scene, each alternative narrative order link further comprising:
    linked scene entry number;
    next alternate scene HTML file name;
    scene link title; and scene link class.

34. The apparatus of claim 21 wherein the one or more data elements comprise for each scene for each character in the work:
    a character identifier;
    an indicator of the character's presence in the scene; and
    an indicator of the use of the character's point of view in the scene.

35. The apparatus of claim 21 wherein the set of processing control files residing in the repository for information resides in the database.

36. The apparatus of claim 21 wherein the set of processing control files residing in the repository for information further comprises:
- one or more glossary link creation control files for identifying glossary anchor points and link points for inserting hypertext glossary links in a hypertext file;
- one or more scene attribute files for identifying characteristics of each scene in a literary work;
- one or more link order control files each for establishing a narrative sequence of scenes in a literary work; and
- one or more scene processing control files each for directing the linking of a scene in multiple sequences of narrative.

37. The apparatus of claim 36 wherein a narrative sequence of a subset of the scenes in the literary work is defined by criteria selected from a set consisting of the following elements:
- the chronological order of the narrative;
- one or more character points of view;
- one or more narrator points of view;
- the locale within the narrative;
- multiple points of view within the same scene;
- reverse chronological order of the narrative;
- one or more narrative orders defined by the author; and
- one or more common thematic elements shared by different scenes.

38. The apparatus of claim 21 wherein the set of utility programs and scripts operating within the computer for converting the set of text files to hypertext files further comprises:
- one or more link determination programs for constructing a set of terms and objects for which hypertext links are to be installed in a text file;
- a link installation program for inserting hypertext links into a text file to convert it to a hypertext file;
- a Web page creation program for converting a hypertext file to a Web page;
- one or more literary macramé compilation scripts for invoking the link installation program and the Web page creation program for all text files to construct a complete linked literary macramé; and
- one or more manual scene link establishment scripts for enabling a user to link two scenes together using hypertext links.

39. The apparatus of claim 38 wherein one or more of the set of utility programs is written in a computer programming language selected from the set consisting of the following:
- Visual Basic for Applications language,
- awk script language,
- sed script language,
- Perl language,
- Python language,
- bash shell script language,
- electronic spreadsheet formulas.

40. The apparatus of claim 38 wherein the set of terms and objects for which hypertext links are to be installed in a text file comprises one or more records each further comprising:
- a glossary or reference term to be linked from a referring location in the text file;
- a file reference identifying the glossary or reference in which the glossary term appears;
- a glossary term anchor identifier specifying the location in the glossary at which the glossary term appears;
- a term corresponding to the glossary or reference term to be displayed in the referring location;
- a target window in which the glossary or reference term appears when linked; and
- a class of reference defining the appearance of the reference in the referring location.

41. An apparatus for constructing a literary macramé, comprising a scene text file further comprising:
- scene narrative text; and
- an array or list of identified attributes characterizing said scene narrative text;
- a single hypertext link displayed prominently for reader selection to display to the reader the next scene in a narrative in a first sequence of reading;
- a single hypertext link displayed prominently for reader selection to display to the reader the previous scene in a narrative in a first sequence of reading; and
- one or more hypertext links displayed only when selected by a pointing device, for reader selection to display to the reader a next scene in a narrative in an alternative sequence of reading;
- a scene title identified as such;
- a scene locale identified as such;
- a scene designator or identifier, identified as such;
- the point of view from which the scene is rendered, identified as such;
- the date and time of the scene within the narrative text, identified as such;
- the copyright year of the writing of the scene, identified as such;
- one or more keywords characterizing the scene, identified as such; and
- a format of presentation for links from the scene to other scenes, identified as such.

42. An apparatus for constructing a literary macramé, comprising a scene text file further comprising:
- scene narrative text; and
- an array or list of identified attributes characterizing said scene narrative text;
- a single hypertext link displayed prominently for reader selection to display to the reader the next scene in a narrative in a first sequence of reading;
- a single hypertext link displayed prominently for reader selection to display to the reader the previous scene in a narrative in a first sequence of reading; and
- one or more hypertext links displayed only when selected by a pointing device, for reader selection to display to the reader a next scene in a narrative in an alternative sequence of reading;
- a designator of the chapter in which the scene appears, identified as such;
- a designator of the section of the chapter in which the scene appears, identified as such;
- the source file from which the scene text file is taken, identified as such;
- the style of presentation required for the scene text, identified as such; and
- the location or window of presentation required for the scene text file, identified as such.

* * * * *